US012562979B2

(12) United States Patent
Lu et al.

(10) Patent No.: US 12,562,979 B2
(45) Date of Patent: Feb. 24, 2026

(54) SERVICE CHAIN FAULT PROTECTION METHOD, APPARATUS, DEVICE AND SYSTEM, AND STORAGE MEDIUM

(71) Applicant: Huawei Technologies Co., Ltd., Shenzhen (CN)

(72) Inventors: Jun Lu, Beijing (CN); Naiwen Wei, Beijing (CN); Qing Miao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 803 days.

(21) Appl. No.: 17/810,376

(22) Filed: Jul. 1, 2022

(65) Prior Publication Data

US 2022/0337514 A1 Oct. 20, 2022

Related U.S. Application Data

(63) Continuation of application No. PCT/CN2020/116612, filed on Sep. 21, 2020.

(30) Foreign Application Priority Data

Jan. 3, 2020 (CN) .......................... 202010004825.6

(51) Int. Cl.
*H04L 45/28* (2022.01)
*H04L 45/00* (2022.01)
*H04L 45/74* (2022.01)

(52) U.S. Cl.
CPC .............. *H04L 45/28* (2013.01); *H04L 45/34* (2013.01); *H04L 45/74* (2013.01)

(58) Field of Classification Search
CPC .......... H04L 45/28; H04L 45/34; H04L 45/74
See application file for complete search history.

(56) References Cited

U.S. PATENT DOCUMENTS 7,920,532 B2 * 4/2011 Zhang ................... H04W 40/00
455/445
9,686,181 B2 * 6/2017 Akiya ..................... H04L 45/28
(Continued)

FOREIGN PATENT DOCUMENTS

CN 103595599 A 2/2014
CN 109873760 A 6/2019

OTHER PUBLICATIONS

Clad, F. et al., "Segment Routing for Service Chaining", draft-xuclad-spring-sr-service-chaining-01, Mar. 5, 2018, 36 pages.
(Continued)

*Primary Examiner* — Parth Patel
(74) *Attorney, Agent, or Firm* — Slater Matsil, LLP

(57) ABSTRACT

This application provides a service chain fault protection method, an apparatus, a device, a service chain fault protection system, and a storage medium, and relates to the field of communications technologies. In this application, in an SRV6 static service chain scenario, when a link between an SF network element and an SFF accessed by the SF network element is faulty, a secondary SID is introduced to update a destination address field of a packet header of a packet to the secondary SID, so that the packet is bypassed, based on the secondary SID, to another SFF accessed by the SF network element, thereby implementing fault protection in the link between the SFF and the SF network element.

20 Claims, 25 Drawing Sheets

(56) References Cited

U.S. PATENT DOCUMENTS

| | | | | |
|---|---|---|---|---|
| 9,967,136 | B2 * | 5/2018 | Krishnan | H04L 49/70 |
| 10,355,983 | B2 * | 7/2019 | Penno | H04L 67/63 |
| 10,374,833 | B2 * | 8/2019 | Bottorff | H04L 12/6418 |
| 10,461,958 | B2 * | 10/2019 | Ao | H04L 12/46 |
| 10,547,563 | B2 * | 1/2020 | Zhang | H04L 41/12 |
| 10,812,393 | B2 * | 10/2020 | Fedyk | H04L 41/5041 |
| 10,819,573 | B2 * | 10/2020 | Maes | H04L 41/0859 |
| 12,224,939 | B2 * | 2/2025 | Wang | H04L 45/306 |
| 2015/0043328 | A1 * | 2/2015 | Gan | H04Q 11/0478 |
| | | | | 370/218 |
| 2015/0092551 | A1 * | 4/2015 | Moisand | H04L 67/146 |
| | | | | 370/235 |
| 2016/0173366 | A1 * | 6/2016 | Saad | H04L 45/22 |
| | | | | 370/389 |
| 2016/0352629 | A1 * | 12/2016 | Wang | H04L 45/38 |
| 2017/0005920 | A1 * | 1/2017 | Previdi | H04L 12/4633 |
| 2017/0012799 | A1 * | 1/2017 | Jiang | H04L 12/6418 |
| 2017/0026417 | A1 * | 1/2017 | Ermagan | H04L 63/0428 |
| 2017/0085477 | A1 * | 3/2017 | Li | H04L 69/18 |
| 2017/0134538 | A1 * | 5/2017 | Mahkonen | H04L 69/22 |
| 2017/0180824 | A1 * | 6/2017 | Casey | H04N 21/47208 |
| 2017/0214627 | A1 * | 7/2017 | Zhang | H04L 67/1023 |
| 2017/0237656 | A1 * | 8/2017 | Gage | H04L 61/2521 |
| | | | | 370/392 |
| 2017/0244631 | A1 * | 8/2017 | Guichard | H04L 45/306 |
| 2017/0279938 | A1 * | 9/2017 | You | H04L 45/74 |
| 2017/0288998 | A1 * | 10/2017 | Kim | H04L 43/50 |
| 2017/0331741 | A1 * | 11/2017 | Fedyk | H04L 67/1001 |
| 2018/0077051 | A1 * | 3/2018 | Nainar | H04L 45/745 |
| 2018/0198643 | A1 * | 7/2018 | Ao | H04L 12/4641 |
| 2018/0198705 | A1 * | 7/2018 | Wang | H04L 45/50 |
| 2018/0248713 | A1 * | 8/2018 | Zanier | H04L 12/4633 |
| 2018/0295053 | A1 * | 10/2018 | Leung | H04L 67/59 |
| 2018/0359255 | A1 * | 12/2018 | Stair | G06F 21/31 |
| 2018/0375968 | A1 * | 12/2018 | Bashandy | H04L 69/324 |
| 2019/0036818 | A1 * | 1/2019 | Nainar | H04L 45/34 |
| 2019/0068470 | A1 * | 2/2019 | Mirsky | H04L 41/5009 |
| 2019/0097908 | A1 * | 3/2019 | Mirsky | H04L 43/50 |
| 2019/0173778 | A1 * | 6/2019 | K | H04L 45/64 |
| 2019/0230005 | A1 * | 7/2019 | Ao | H04L 61/30 |
| 2019/0306051 | A1 * | 10/2019 | Seetharaman | H04L 43/0882 |
| 2019/0394211 | A1 * | 12/2019 | Filsfils | H04L 45/7453 |
| 2020/0120025 | A1 * | 4/2020 | Voit | H04L 45/74 |
| 2020/0145331 | A1 * | 5/2020 | Bhandari | H04L 69/161 |
| 2020/0145453 | A1 * | 5/2020 | Lin | H04L 63/1466 |
| 2020/0389401 | A1 * | 12/2020 | Enguehard | H04L 45/741 |
| 2020/0404020 | A1 * | 12/2020 | Lin | H04L 63/1466 |
| 2021/0119696 | A1 * | 4/2021 | Shah | H04W 88/16 |
| 2021/0126831 | A1 * | 4/2021 | Filsfils | H04L 45/64 |
| 2022/0337514 | A1 * | 10/2022 | Lu | H04L 45/28 |

OTHER PUBLICATIONS

Mayer, A. et al., "An Efficient Linux Kernel Implementation of Service Function Chaining for legacy VNFs based on IPv6 Segment Routing", 2019 IEEE Conference on Network Softwarization (NetSoft), Jun. 24, 2019, 9 pages.

Sarkar, P. et al., "Anycast Segmentsin MPLS based Segment Routing draft-ietf-spring-mpls-anycast-segments-02", SPRING Working Group, Internet-Draft, Jan. 2018, 19 Pages.

* cited by examiner

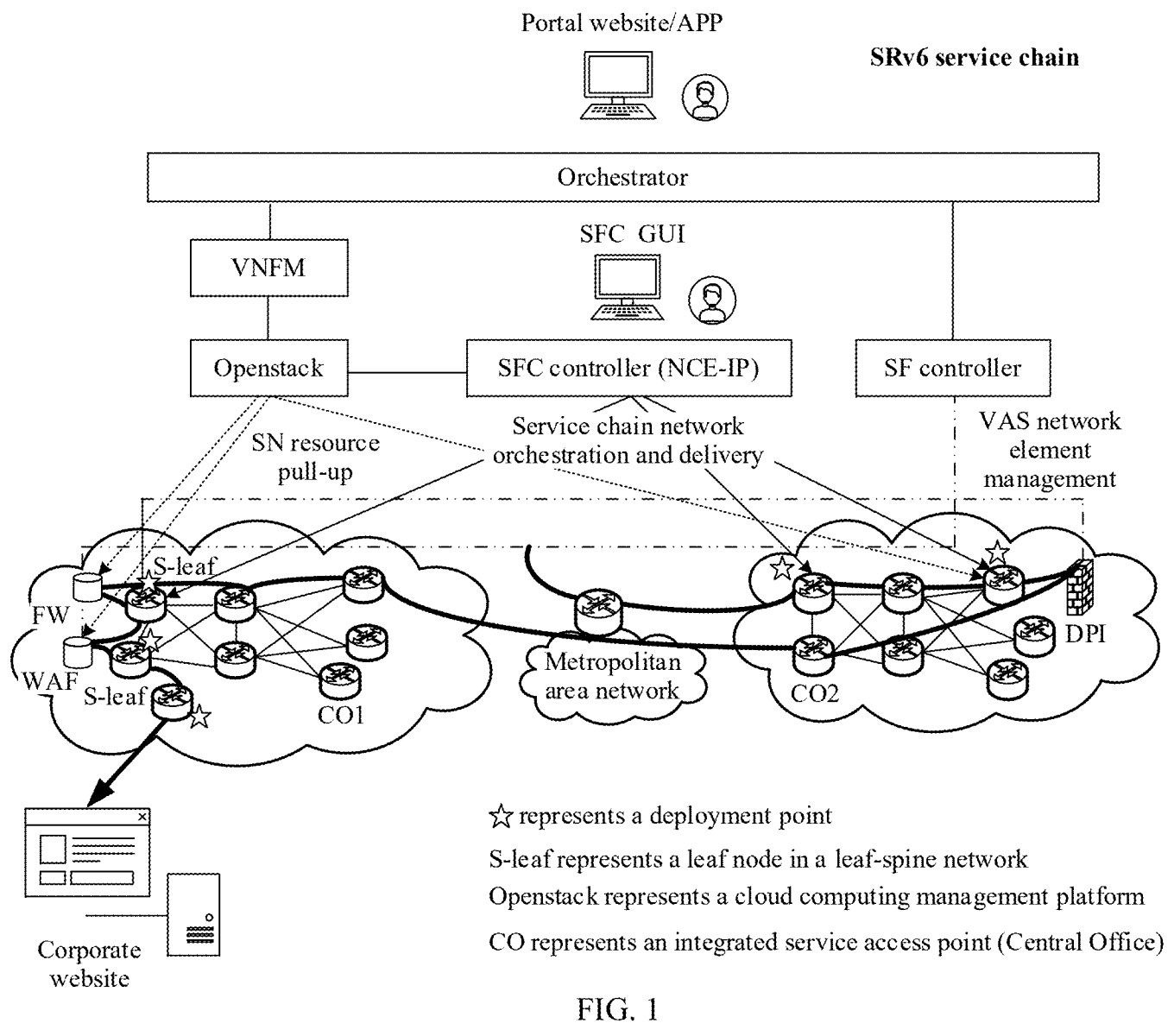

SRv6 service chain

Portal website/APP

Orchestrator

SFC GUI

SFC controller (NCE-IP)

VNFM

Openstack

SF controller

VAS network element management

Service chain network orchestration and delivery

SN resource pull-up

S-leaf

FW

WAF  S-leaf

CO1

Metropolitan area network

CO2

DPI

Corporate website

☆ represents a deployment point

S-leaf represents a leaf node in a leaf-spine network

Openstack represents a cloud computing management platform

CO represents an integrated service access point (Central Office)

FIG. 1

Access leaf represents a leaf node
at an access layer
Proxy SID represents a proxy SID
Active SID represents a current
working SID, and is a destination
address of a packet secondary SID represents a secondary SID
Anycast SID represents an anycast SID secondary SID represents a secondary SID
Anycast SID represents an anycast SID Anycast SID represents an anycast SID
secondary SID represents a secondary SID Anycast SID represents an anycast SID
secondary SID represents a secondary SID
bypass sid represents a bypass SID

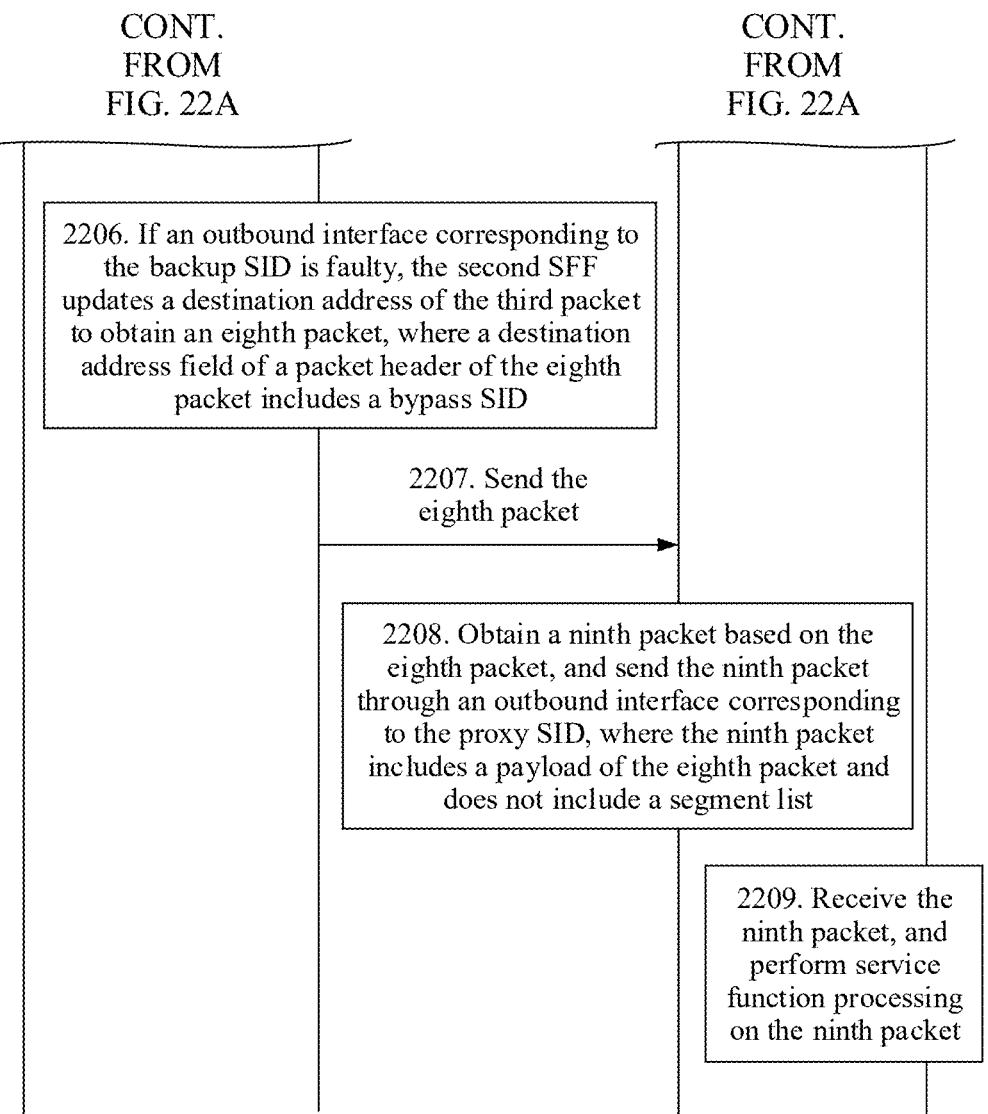

CONT.
FROM
FIG. 22A

CONT.
FROM
FIG. 22A

2206. If an outbound interface corresponding to the backup SID is faulty, the second SFF updates a destination address of the third packet to obtain an eighth packet, where a destination address field of a packet header of the eighth packet includes a bypass SID 2207. Send the eighth packet 2208. Obtain a ninth packet based on the eighth packet, and send the ninth packet through an outbound interface corresponding to the proxy SID, where the ninth packet includes a payload of the eighth packet and does not include a segment list 2209. Receive the ninth packet, and perform service function processing on the ninth packet

FIG. 22B

SERVICE CHAIN FAULT PROTECTION METHOD, APPARATUS, DEVICE AND SYSTEM, AND STORAGE MEDIUM

CROSS-REFERENCE TO RELATED APPLICATIONS

This application is a continuation of International Application No. PCT/CN2020/116612, filed on Sep. 21, 2020, which claims priority to Chinese Patent Application No. 202010004825.6, filed on Jan. 3, 2020. The disclosures of the aforementioned applications are hereby incorporated by reference in their entireties.

TECHNICAL FIELD

This application relates to the field of communications technologies, and in particular, to a service chain fault protection method, apparatus, device and system, and a storage medium.

BACKGROUND

A service function chain (SFC for short, also referred to as a service function chain) is a technology that provides ordered services for an application layer. The SFC carries service chain path information in a packet, and indicates, by using the service chain path information, a path through which the packet is to pass, so that the packet passes through devices in sequence based on the specified path. In this way, services provided by the devices may be connected at a logical level, to form an ordered service combination.

An architecture of the SFC includes nodes such as a service classifier (CF), a service function (SF), an SFC proxy, and a service function forwarder (SFF). The SFF is configured to forward, based on the service chain path information carried in the packet, the packet received from a network to several SFs associated with the SFF. The SF is configured to: receive the packet from the SFF, perform service function processing on the packet, and return a processed packet to the same SFF. Logically, the SFC proxy is located between the SFF and the several associated SFs thereof that are unaware of the service chain path information. The SFC proxy may receive the packet from the SFF on behalf of the SF, delete the service chain path information, and forward the packet to the SF. Physically, the SFF and the SFC proxy are usually integrated on a same device.

Nowadays, with continuous evolution of segment routing (SR), service chain path information in an SFC technology is usually implemented based on a segment identifier (SID) in an SR technology. Specifically, when a packet in the SFC is transmitted by using the SR technology, the packet includes a segment list, and the segment list includes SIDs arranged in order. A node or a link through which the packet needs to pass may be indicated by using the SID, and a path sequence of a service chain may be indicated by using an arrangement sequence of the SIDs. When the Internet Protocol version 6 (IPv6) is used as a forwarding plane for the SR, a form of each SID in the segment list is an IPv6 address, and the segment list is carried by using a segment routing header (SRH) in the packet. When multi-protocol label switching (MPLS) is used as a forwarding plane for the SR, the segment list is a label stack in the MPLS.

In many scenarios, the SF in the service chain is a device that does not support SR (SR-unaware). In other words, the SF itself may not be able to identify the segment list. In consideration of this case, if the SFF receives a packet to be sent to the SF, the SFF may play a function of the SFC proxy to perform a proxy operation for the SF. Specifically, the SFF deletes a segment list from the received packet, caches the segment list in a cache, and then forwards, to the SF by using a link between the SFF and the SF, the packet that does not include the segment list. When the SF receives the packet, even if the SF is an SR-unaware device, the SF can identify the packet and perform service function processing because the packet received by the SF does not include the SRH.

In the current service chain technology, when the SFF receives the packet to be sent to the SF, if the link between the SFF and the SF is faulty, the packet cannot reach the SF, causing traffic interruption.

SUMMARY

Embodiments of this application provide a service chain fault protection method, apparatus, device and system, and a storage medium, so as to prevent service traffic from being interrupted due to a fault, and improve service chain reliability. The technical solutions are as follows:

According to a first aspect, a service chain fault protection method is provided. In the method, a first service function forwarder SFF in a service chain receives a first packet, where a destination address field of a packet header of the first packet includes a proxy segment identifier SID corresponding to a first service function SF network element in the service chain, and the first SFF is an SFF accessed by the first SF network element; if a link between the first SFF and the first SF network element is faulty, the first SFF updates the destination address field of the first packet to obtain a second packet, where a destination address field of the second packet includes a first secondary SID, the first secondary SID is a local SID of a second SFF in the service chain, the second SFF is an SFF other than the first SFF in a protection group, the protection group includes a plurality of SFFs accessed by the first SF network element, and the second packet includes a payload of the first packet; and the first SFF sends the second packet.

In the method, in an SRV6 static service chain scenario, when a link between an SF network element and one SFF accessed by the SF network element is faulty, a secondary SID (secondary SID) is introduced to update a destination address field of a packet header of a packet to the secondary SID, so that the packet is bypassed, based on the secondary SID, to another SFF accessed by the SF network element, thereby implementing protection for a fault in the link between the SFF and the SF network element, to prevent traffic from being interrupted due to a single-point link fault, and improve service chain reliability.

Optionally, a type of the first secondary SID is an endpoint End type.

Compared with a manner of selecting an End.X-type SID as the first secondary SID, selecting an End-type SID as the first secondary SID may avoid an operation of specifying a next hop and an outbound interface when an End.X SID is configured, thereby avoiding a case in which a large number of secondary SIDs, instead of a globally unique secondary SID, need to be configured on the first SFF because the End.X SID replaces a role of an original proxy SID (proxy SID) since the End.X SID has both bypass and outbound interface specifying functions. In addition, because the first secondary SID is an End-type SID, a relatively severe constraint on subsequent planning of a backup SID is avoided.

Optionally, the method further includes: The first SFF replaces the proxy SID in the first packet with a backup SID, where the backup SID is used to indicate the second SFF not to update the destination address field of the second packet to a second secondary SID, and the second secondary SID is a local SID of the first SFF.

In this optional manner, in an SRV6 static service chain scenario, even if links between an SF network element and two SFFs accessed in a dual-homed manner are both faulty, a backup SID is introduced to replace, with the backup SID, a proxy SID originally included in a packet, so that the packet can be bypassed, by using a secondary SID, to another SFF accessed by the SF network element, and another SFF can be indicated, by using the backup SID, to perform forwarding to the SF network element, without entering a secondary SID procedure any more. Therefore, a traffic loop caused after the another SFF enters the secondary SID procedure is avoided. Therefore, a traffic loop caused by a dual-point fault can be prevented by using a backup SID mechanism.

Optionally, the protection group is an anycast group, and proxy SIDs issued by different SFFs in the anycast group are anycast SIDs.

According to a second aspect, a service chain fault protection method is provided. In the method, a second SFF in a service chain receives a second packet, where a destination address field of a packet header of the second packet includes a first secondary SID, and the first secondary SID is a local SID of the second SFF; the second SFF performs local forwarding processing on the second packet based on the first secondary SID to obtain a third packet; the second SFF obtains a fourth packet based on the third packet, where the fourth packet includes a payload of the third packet and does not include a segment list; and the second SFF sends the fourth packet to a first SF network element in the service chain.

In the method, in an SRV6 static service chain scenario, when a link between an SF network element and one SFF accessed by the SF network element is faulty, a secondary SID is introduced to update a destination address field of a packet header of a packet to the secondary SID, so that the packet is bypassed, based on the secondary SID, to another SFF accessed by the SF network element, thereby implementing protection for a fault in the link between the SFF and the SF network element, to prevent traffic from being interrupted due to a single-point link fault, and improve service chain reliability.

Optionally, a type of the first secondary SID is an endpoint End type.

Compared with a manner of selecting an End.X-type SID as the first secondary SID, selecting an End-type SID as the first secondary SID may avoid an operation of specifying a next hop and an outbound interface when an End.X SID is configured, thereby avoiding a case in which a large number of secondary SIDs, instead of a globally unique secondary SID, need to be configured on the first SFF because the End.X SID replaces a role of an original proxy SID since the End.X SID has both bypass and outbound interface specifying functions. In addition, because the first secondary SID is an End-type SID, a relatively severe constraint on subsequent planning of a backup SID is avoided.

Optionally, a destination address field of a packet header of the third packet includes a proxy SID corresponding to the first SF network element, and that the second SFF sends the fourth packet to the first SF network element includes: The second SFF sends the fourth packet to the first SF network element through an outbound interface corresponding to the proxy SID.

Optionally, a destination address field of a packet header of the third packet includes a backup SID, the backup SID is used to indicate the second SFF not to update the destination address field of the second packet to a second secondary SID, the second secondary SID is a local SID of the first SFF, and that the second SFF sends the fourth packet to the first SF network element includes: The second SFF sends the fourth packet to the first SF network element through an outbound interface corresponding to the backup SID.

In this optional manner, in an SRV6 static service chain scenario, even if links between an SF network element and two SFFs accessed in a dual-homed manner are both faulty, a backup SID is introduced to replace, with the backup SID, a proxy SID originally included in a packet, so that the packet can be bypassed, by using a secondary SID, to another SFF accessed by the SF network element, and another SFF can be indicated, by using the backup SID, to perform forwarding to the SF network element, without entering a secondary SID procedure any more. Therefore, a traffic loop caused after the another SFF enters the secondary SID procedure is avoided. Therefore, a traffic loop caused by a dual-point fault can be prevented by using a backup SID mechanism.

Optionally, a type of the second secondary SID is an End type.

Optionally, the destination address field of the packet header of the third packet includes the backup SID, and the method further includes: If the outbound interface corresponding to the backup SID is faulty, the second SFF updates the destination address field of the third packet to obtain an eighth packet, where a destination address field of a packet header of the eighth packet includes a bypass SID, and the bypass SID is a local SID of a third SFF. The second SFF sends the eighth packet.

In this optional manner, in an SRV6 static service chain scenario, when an SF network element is faulty, a bypass SID is introduced to update a destination address field of a packet header of a packet to the bypass SID, so that the packet is bypassed to another SF network element by using the bypass SID, for example, to a backup SF network element outside an original path or a next SF network element within the original path, thereby performing service protection by using the another network element, and normally forwarding service traffic, to prevent the traffic from being interrupted due to a single-node fault, and improve service chain reliability.

Optionally, the method further includes: If the outbound interface corresponding to the backup SID is faulty, and a local SID table of the second SFF does not include the bypass SID, the second SFF discards the third packet.

According to a third aspect, a service chain fault protection method is provided. In the method, a fourth service function forwarder SFF in a service chain receives a fifth packet, where a destination address of a packet header of the fifth packet includes a proxy segment identifier SID corresponding to a second SF network element in the service chain, and the fourth SFF is an SFF accessed by the second SF; if the second SF network element is in a faulty state, the fourth SFF updates the destination address field of the fifth packet to obtain a sixth packet, where the destination address of a packet header of the sixth packet includes a bypass SID, the bypass SID is a local SID of a fifth SFF, the fifth SFF is an SFF accessed by a third SF network element, the third SF network element is an SF network element other than the second SF network element, and the sixth packet includes a payload of the fifth packet; and the fourth SFF sends the sixth packet.

In an SRV6 static service chain scenario, when an SF network element is faulty, a bypass SID is introduced to update a destination address field of a packet header of a packet to the bypass SID, so that the packet is bypassed to another SF network element by using the bypass SID, for example, to a backup SF network element outside an original path or a next SF network element within the original path, thereby performing service protection by using the another network element, and normally forwarding service traffic, to prevent the traffic from being interrupted due to a single-node fault, and improve service chain reliability.

Optionally, the bypass SID is an End-type SID; or the bypass SID is a proxy SID corresponding to the third SF network element.

Optionally, the method further includes: If an outbound interface corresponding to the proxy SID is in an up state, and each virtual machine on which the second SF network element is located is unreachable, the fourth SFF detects that the second SF network element is in the faulty state, where the proxy SID is used to indicate to perform a proxy operation for the second SF network element. If a link fault occurs on at least one of an outbound interface corresponding to a backup SID or an outbound interface corresponding to the proxy SID, the fourth SFF detects that the second SF network element is in the faulty state, where the backup SID is used to indicate the fourth SFF not to update the destination address field of the second packet to a third secondary SID, the third secondary SID is a local SID of the fifth SFF, the fifth SFF is an SFF other than the fourth SFF in a protection group, and the protection group includes a plurality of SFFs accessed by the second SF network element.

Optionally, the third secondary SID is an End-type SID.

Optionally, the third SF network element is a backup SF network element of the second SF network element; or the third SF network element is a next SF network element of the second SF network element in the service chain.

According to a fourth aspect, a service chain fault protection method is provided. In the method, a fifth service function forwarder SFF in a service chain receives a sixth packet, where a destination address field of a packet header of the sixth packet includes a bypass SID, the bypass SID is a local SID of the fifth SFF, and the fifth SFF is an SFF accessed by a third service function SF network element; the fifth SFF obtains a seventh packet based on the sixth packet, where the seventh packet includes a payload of the sixth packet and does not include a segment list; and the fifth SFF sends the seventh packet to the third SF network element.

In an SRV6 static service chain scenario, when an SF network element is faulty, a bypass SID is introduced to update a destination address field of a packet header of a packet to the bypass SID, so that the packet is bypassed to another SF network element by using the bypass SID, for example, to a backup SF network element outside an original path or a next SF network element within the original path, thereby performing service protection by using the another network element, and normally forwarding service traffic, to prevent the traffic from being interrupted due to a single-node fault, and improve service chain reliability.

Optionally, the bypass SID is an End-type SID; or the bypass SID is a proxy SID corresponding to the third SF network element.

Optionally, that the fifth SFF obtains a seventh packet based on the sixth packet includes: The fifth SFF performs local forwarding processing on the sixth packet based on the bypass SID to obtain an eighth packet, where a destination address field of a packet header of the eighth packet includes a proxy SID corresponding to the third SF network element, and the eighth packet includes the payload of the sixth packet. The fifth SFF obtains the seventh packet based on the eighth packet.

Optionally, the third SF network element is a backup SF network element of a second SF network element, where the second SF network element is an SF network element in a faulty state; or the third SF network element is a next SF network element of the second SF network element in the service chain.

According to a fifth aspect, an SFF is provided, and the SFF has a function of implementing service chain fault protection in any one of the first aspect or the optional manners of the first aspect. The SFF includes at least one module, and the at least one module is configured to implement the service chain fault protection method provided in any one of the first aspect or the optional manners of the first aspect.

Optionally, a type of the first secondary SID is an endpoint End type.

Optionally, the protection group is an anycast group, and proxy SIDs issued by different SFFs in the anycast group are anycast SIDs.

For specific details of the SFF provided in the fifth aspect, refer to any one of the first aspect or the optional manners of the first aspect. Details are not described herein again.

According to a sixth aspect, an SFF is provided, and the SFF has a function of implementing service chain fault protection in any one of the second aspect or the optional manners of the second aspect. The SFF includes at least one module, and the at least one module is configured to implement the service chain fault protection method provided in any one of the second aspect or the optional manners of the second aspect.

Optionally, a type of the first secondary SID is an End type.

Optionally, the SFF further includes a discarding module, configured to: if an outbound interface corresponding to the backup SID is faulty and a local SID table does not include the bypass SID, discard the third packet.

For specific details of the SFF provided in the sixth aspect, refer to any one of the second aspect or the optional manners of the second aspect. Details are not described herein again.

According to a seventh aspect, an SFF is provided, and the SFF has a function of implementing service chain fault protection in any one of the third aspect or the optional manners of the third aspect. The SFF includes at least one module, and the at least one module is configured to implement the service chain fault protection method provided in any one of the third aspect or the optional manners of the third aspect.

Optionally, the bypass SID is an SID of an endpoint End type; or the bypass SID is a proxy SID corresponding to the third SF network element.

Optionally, the third SF network element is a backup SF network element of the second SF network element; or the third SF network element is a next SF network element of the second SF network element in the service chain.

For specific details of the SFF provided in the seventh aspect, refer to any one of the third aspect or the optional manners of the third aspect. Details are not described herein again.

According to an eighth aspect, an SFF is provided, and the SFF has a function of implementing service chain fault protection in any one of the fourth aspect or the optional manners of the fourth aspect. The SFF includes at least one module, and the at least one module is configured to implement the service chain fault protection method provided in any one of the fourth aspect or the optional manners of the fourth aspect.

Optionally, the bypass SID is an SID of an endpoint End type; or the bypass SID is a proxy SID corresponding to the third SF network element.

Optionally, the third SF network element is a backup SF network element of a second SF network element, where the second SF network element is an SF network element in a faulty state; or the third SF network element is a next SF network element of the second SF network element in the service chain.

For specific details of the SFF provided in the eighth aspect, refer to any one of the fourth aspect or the optional manners of the fourth aspect. Details are not described herein again.

According to a ninth aspect, an SFF is provided, the SFF includes a processor, and the processor is configured to execute instructions, so that the SFF performs the service chain fault protection method provided in any one of the first aspect or the optional manners of the first aspect. For specific details of the SFF provided in the ninth aspect, refer to any one of the first aspect or the optional manners of the first aspect. Details are not described herein again.

According to a tenth aspect, an SFF is provided, the SFF includes a processor, and the processor is configured to execute instructions, so that the SFF performs the service chain fault protection method provided in any one of the second aspect or the optional manners of the second aspect. For specific details of the SFF provided in the tenth aspect, refer to any one of the second aspect or the optional manners of the second aspect. Details are not described herein again.

According to an eleventh aspect, an SFF is provided, the SFF includes a processor, and the processor is configured to execute instructions, so that the SFF performs the service chain fault protection method provided in any one of the third aspect or the optional manners of the third aspect. For specific details of the SFF provided in the eleventh aspect, refer to any one of the third aspect or the optional manners of the third aspect. Details are not described herein again.

According to a twelfth aspect, an SFF is provided, the SFF includes a processor, and the processor is configured to execute instructions, so that the SFF performs the service chain fault protection method provided in any one of the fourth aspect or the optional manners of the fourth aspect. For specific details of the SFF provided in the twelfth aspect, refer to any one of the fourth aspect or the optional manners of the fourth aspect. Details are not described herein again.

According to a thirteenth aspect, a computer-readable storage medium is provided, the storage medium stores at least one instruction, and the instruction is read by a processor, so that an SFF performs the service chain fault protection method provided in any one of the first aspect or the optional manners of the first aspect.

According to a fourteenth aspect, a computer-readable storage medium is provided, the storage medium stores at least one instruction, and the instruction is read by a processor, so that an SFF performs the service chain fault protection method provided in any one of the second aspect or the optional manners of the second aspect.

According to a fifteenth aspect, a computer-readable storage medium is provided, the storage medium stores at least one instruction, and the instruction is read by a processor, so that an SFF performs the service chain fault protection method provided in any one of the third aspect or the optional manners of the third aspect.

According to a sixteenth aspect, a computer-readable storage medium is provided, the storage medium stores at least one instruction, and the instruction is read by a processor, so that an SFF performs the service chain fault protection method provided in any one of the fourth aspect or the optional manners of the fourth aspect.

According to a seventeenth aspect, a computer program product is provided, and when the computer program product runs on an SFF, the SFF is enabled to perform the service chain fault protection method provided in any one of the first aspect or the optional manners of the first aspect.

According to an eighteenth aspect, a computer program product is provided, and when the computer program product runs on an SFF, the SFF is enabled to perform the service chain fault protection method provided in any one of the second aspect or the optional manners of the second aspect.

According to a nineteenth aspect, a computer program product is provided, and when the computer program product runs on an SFF, the SFF is enabled to perform the service chain fault protection method provided in any one of the third aspect or the optional manners of the third aspect.

According to a twentieth aspect, a computer program product is provided, and when the computer program product runs on an SFF, the SFF is enabled to perform the service chain fault protection method provided in any one of the fourth aspect or the optional manners of the fourth aspect.

According to a twenty-first aspect, a service chain fault protection system is provided, the service chain fault protection system includes the SFF provided in any one of the fifth aspect or the optional manners of the fifth aspect, and the service chain fault protection system further includes the SFF provided in any one of the sixth aspect or the optional manners of the sixth aspect.

According to a twenty-second aspect, a service chain fault protection system is provided, the service chain fault protection system includes the SFF provided in any one of the seventh aspect or the optional manners of the seventh aspect, and the service chain fault protection system further includes the SFF provided in any one of the eighth aspect or the optional manners of the eighth aspect.

BRIEF DESCRIPTION OF THE DRAWINGS

FIG. 1 is an architectural diagram of an SFC system according to an embodiment of this application;

FIG. 22A and FIG. 22B are a flowchart of a service chain fault protection method according to an embodiment of this application;

FIG. 3*o* is a schematic structural diagram of a computing device according to an embodiment of this application.

DETAILED DESCRIPTION OF ILLUSTRATIVE EMBODIMENTS

Figure 2:
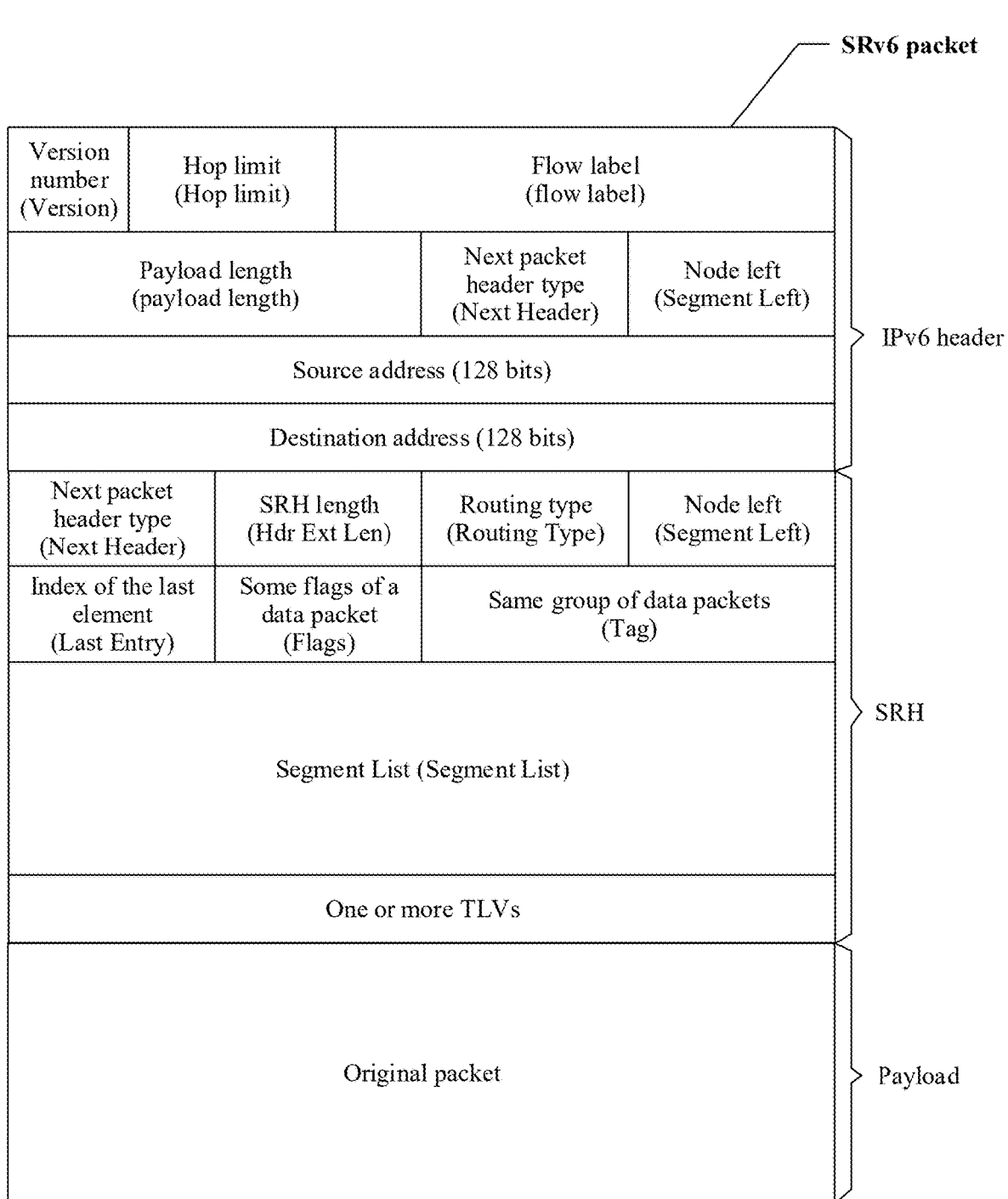
FIG. 2 is a schematic diagram of an SRv6 packet according to an embodiment of this application.

To make the objectives, technical solutions, and advantages of this application clearer, the following further describes the implementations of this application in detail with reference to the accompanying drawings.

In this application, terms "first", "second", and the like are used to distinguish between same items or similar items whose roles and functions are basically the same. It should be understood that there is no logical or time sequence dependency between "first", "second", and "n$^{th}$", and no limitation is imposed on a quantity and an execution sequence. It should also be understood that although the following description uses the terms first, second, and the like to describe various elements, these elements should not be limited by the terms. These terms are merely used to distinguish one element from another. For example, a first image may be referred to as a second image, and similarly the second image may be referred to as the first image, without departing from the scope of various examples. Both the first image and the second image may be images, and may be separate and different images in some cases.

A term "at least one" in this application means one or more, and a term "a plurality of" in this application means two or more. For example, a plurality of second packets means two or more second packets. The terms "system" and "network" are often used interchangeably in this specification.

It should be understood that the terms used in the description of various examples in this specification are merely intended to describe particular examples, and are not intended to impose limitations. As used in the description of the various examples and in the appended claims, singular forms "a", "an" and "the" are intended to include plural forms as well, unless the context otherwise expressly indicates.

It should also be understood that the term "and/or" used in this specification refers to and covers any and all possible combinations of one or more of the associated listed items. The term "and/or" describes an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

It should further be understood that determining A based on B does not mean that B is determined based on A only; that is, B may also be determined based on A and/or other information.

It should also be understood that when used in this specification, a term "include" (also referred to as "includes", "including", "comprises", and/or "comprising") specifies the presence of stated features, integers, steps, operations, elements, and/or components, with presence or addition of one or more other features, integers, steps, operations, elements, components, and/or their combinations not excluded.

It should also be understood that the term "and/or" used in this specification refers to and covers any and all possible combinations of one or more of the associated listed items. The term "and/or" describes an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

It should also be understood that a term "if" may be interpreted as a meaning of "when" ("when" or "upon") or "in response to determining" or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

It should be understood that "one embodiment", "an embodiment", and "a possible implementation" mentioned in the entire specification mean that particular features, structures, or characteristics related to the embodiment or implementation are included in at least one embodiment of this application. Therefore, "in one embodiment" or "in an embodiment" and "a possible implementation" appearing throughout the specification do not necessarily refer to a same embodiment. In addition, these particular features, structures, or characteristics may be combined in one or more embodiments by using any appropriate manner.

First, some technical terms related to this application are described.

Service chain of a conventional telecommunications network: when transmitted in the network, a data packet often needs to pass through various service nodes, to ensure that the network can provide a user with a safe, fast, and stable service based on an advance plan. These service nodes include but are not limited to a fire wall (FW), a load balancer (LB), an intrusion prevention system (IPS), and the like. Network traffic needs to pass through these service nodes in a specified sequence required by service logic, to implement a required service. In the service chain of the conventional telecommunications network, complex command lines are entered on hardware devices to implement policy-based bypass, which is difficult to operate, maintain and change. In addition, deployment and physical locations of VAS servers are severely constrained. A service function chain (SFC, also referred to as a service chain) emerges to effectively resolve a problem of the service chain in the conventional telecommunications network.

The SFC is a technology that provides ordered services for an application layer. The SFC is used to connect services on network devices at a logical level to form an ordered service combination. The SFC adds service chain path information to an original packet, so that the packet passes through service devices in sequence based on a specified path. In a conventional network architecture, the SFC technology uses a virtual network to better integrate a service business, to solve the foregoing problem better: For a problem of inflexible service deployment due to high coupling between network devices, the SFC is independent of network planning based on an overlay technology, deployment and activation of a service node are not affected when an underlying physical network topology changes, and a virtual service chain can be mapped to a physical service node as long as a bearer network route is reachable. For a problem of low forwarding efficiency, the SFC performs network service header (NSH) encapsulation on a packet, so that nodes on a service chain path can transmit information to each other. With the information, the entire service chain can perform dynamic and flexible policy processing on data. For a problem that a service device cannot be shared, a forwarding plane and a service plane in the SFC are separated from each other, a user may classify the service device into a resource pool, and all data traffic is classified and then bypassed to a plurality of service devices by using a service chain. In this way, data traffic after bypass reduces a performance requirement on a capability of the service device to process peak traffic, and service device resource sharing is implemented.

The following describes network elements in an SFC with reference to FIG. 1.

Service Classifier (SC): is located at a border ingress of an SFC domain. Traffic classification is first performed after a packet enters the SFC domain. A classification granularity is determined by a classifier capability and an SFC policy, and a classification rule may be rough or detailed. For example, in a rough case, if all packets on a port meet an SFC rule, the packets are transmitted along a service chain path 1. In a detailed case, only a packet that meets a quintuple requirement can meet an SFC rule, the packet is transmitted along a service chain path 2.

Service function (SF for short) network element: is configured to perform service processing on a packet. For example, the SF network element may be but is not limited to a fire wall, a load balancer, an application accelerator, lawful intercept (LI), network address translation (NAT), bandwidth control, virus detection, cloud storage, deep packet inspection (DPI), intrusion detection, intrusion prevention, or the like. A physical entity of the SF network element may be a computing device, and the computing device may be but is not limited to a server, a host, a personal computer, a network device, or a terminal device. In some possible embodiments, the SF network element may be implemented in such a manner: A virtual machine or a container runs on a general server of an X86 architecture, an application program runs in the virtual machine or the container, and the application program may be used to perform service function processing. Based on whether an SF can be aware of NSH encapsulation, the SF is classified into an NSH-encapsulation-aware SF (NSH-aware SF) and an NSH-encapsulation-unaware SF (NSH-unaware SF). The NSH-aware SF can identify and process a received NSH packet. The NSH-unaware SF does not identify an NSH packet and discards it after receiving it.

Service function forwarder (SFF): is configured to forward a packet received from a network to several SFs associated with the SFF, where a forwarding basis is NSH encapsulation information. After processing, the SF returns the packet to the same SFF. The SFF finally determines whether to send the packet back to the network. A physical entity of the SFF may be a network device, for example, may be a router or a switch.

SFC proxy: is located between an SFF and several associated NSH-unaware SFs thereof, receives a packet from the SFF on behalf of the SF, deletes NSH encapsulation information, sends the packet to the NSH-unaware SF by using a local logic component, receives the packet sent back from the NSH-unaware SF, re-adds NSH encapsulation information to the packet, and then sends the packet to the SFF for processing. From the perspective of the SFF, the SFC proxy is equivalent to an NSH-aware SF. Generally, the SFC proxy and the SFF are integrated on a same hardware device.

With evolution of a segment routing (SR) technology, a service chain solution based on Internet Protocol version 6 for Segment Routing (SRv6) becomes an excellent solution for implementing a service chain. For ease of understanding, an SRV6 technology is first described before an SRv6 service chain technology is described.

Segment routing (SR) is a technology designed based on a source routing concept to forward a packet in a network. Segment routing is to divide a network path into segments, and allocate segment identifiers (SID) to these segments and forwarding nodes in the network. A segment list can be obtained by arranging the SIDs in an ordered manner, and the segment list may be used to indicate a packet forwarding path. The SR technology may be used to specify a node and a path through which a packet carrying a segment list pass, so as to meet requirements of traffic adjustment and optimization. To make an analogy, a packet may be compared to a baggage, and SR may be compared to a label attached to the baggage. If the baggage needs to be sent from an area A to an area D via an area B and an area C, a label "Go to the area B first, then to the area C, and finally to the area D" may be attached to the baggage in the origin area A. In this way, in each area, it is only necessary to identify the label on the baggage and forward the baggage from one area to another based on the label of the baggage. In the SR technology, a source node adds a label to a packet, and an intermediate node forwards the packet to a next node based on the label until the packet reaches a destination node. For example, if <SID1, SID2, SID3> are pushed into a packet header of the packet, the packet is first forwarded to a node corresponding to the SID1, then forwarded to a node corresponding to the SID2, and then forwarded to a node corresponding to the SID3.

SR domain (Segment Routing Domain): is a set of SR nodes. In the SR domain, there may be nodes (such as a service provider network) connected to a same physical architecture or may be remotely interconnected nodes (such as an enterprise virtual private network or an overlay).

An SR tunnel is a tunnel for encapsulating a segment list into a packet header on a head node, and may be manually created by an administrator, or may be automatically created by a controller through an interface protocol such as a network configuration (NETCONF) or a path computation element communication protocol (PCEP). An SR tunnel may be used not only for a traffic engineering (TE) application, but also for purposes such as operation administration and maintenance (OAM) and fast reroute (FRR).

Segment list: is an ordered segment list used to represent a packet forwarding path. In SR MPLS, the segment list is a label stack. In SRv6, the segment list is an IPv6 address list, and is carried in a segment routing header (SRH) of an IPv6 packet.

A segment may be any instruction to instruct a device to process a packet, for example, forward the packet to a destination based on a shortest path, forward the packet by using a specified interface, or forward the packet to a specified application/service instance. The segment may include a global segment and a local segment.

Global segment: all SR nodes in an SR domain can identify an instruction related to the global segment. In SR MPLS, the global segment is a globally unique index, and a label on each device is [SRGB+index]. In SRv6, the global segment is a globally unique IPv6 address.

Local segment: is a related instruction identified by only a node that generates the local segment. In SR MPLS, the local segment is a local label outside an SRGB block. In SRv6, the local segment is any IPv6 address whose reachability has not been advertised by any routing protocol.

A segment identifier (SID) is an identifier of a segment and is used to identify a unique segment. On an SR MPLS forwarding plane, the SID may be mapped to an MPLS label. On an SRv6 forwarding plane, the SID may be mapped to an IPv6 address. The SID can essentially represent a topology, an instruction, or a service.

Current working SID: is a current to-be-processed segment in the segment list, and may also be referred to as an active SID, an active segment, a current to-be-processed SID, or a current working SID. When receiving a packet, an SR node processes an active segment. In SR MPLS, the active segment is an outermost-layer label of a label stack. In SRv6, the active segment is a destination address of an IPv6 packet carrying an SRH. In addition, the active segment may be indicated by using a value of an SL field. For example, if the segment list includes five SIDs which are respectively an SID0, an SID1, an SID2, an SID3, and an SID4, and a value of an SL is 2, it indicates that there are two unprocessed SIDs in the segment list, which are respectively the SID0 and the SID1; a current to-be-processed SID in the segment list is the SID2; and there are two processed SIDs in the segment list, which are respectively the SID3 and the SID4.

The SID may include a plurality of types. In SR MPLS, the SID may include a node SID, a prefix SID, and an adjacency SID. The prefix SID may be an offset value within an SRGB range issued by a source end. A receive end calculates an actual label value based on an SRGB of the receive end to generate an MPLS forwarding entry. In SRv6, the SID includes types such as an End SID, an End.X SID, an End.DT4 SID, and an End.OTP SID.

Segment actions: may include push, next, continue, and the like. PUSH indicates that a segment is pushed at the top of a segment list. In SR MPLS, the top of the segment list refers to an outermost-layer label of a label stack. In SRv6, the top of the segment list refers to the first IPv6 address in an SRH header. NEXT indicates that a next segment becomes an active segment when processing on a current active segment is completed. CONTINUE: processing on a current active segment has not been completed yet, and the segment continues remaining in an active state. In SR MPLS, a CONTINUE operation is equivalent to a swap (SWAP) operation. In SRv6, a CONTINUE operation is an operation of forwarding an IPv6 packet based on an IPv6 destination address.

The SR technology includes a segment routing multiprotocol label switching (SR MPLS) technology and an SRv6 technology. The following describes the SRv6 technology in detail.

The SRv6 technology is to apply the SR technology to an IPv6 network. An SRv6 SID is encoded by using an IPv6 address (128 bits), and is encapsulated in an SRv6 extension header (SRH). When forwarding a packet, an SRv6-capable node queries a local SID table (local SID table) based on a destination address (DA) of a packet header in the packet; when the destination address of the packet header of the packet matches any SID in the local SID table, determines that the destination address hits the local SID table, and then performs a corresponding operation based on a topology, an instruction, or a service corresponding to the SID; or if the destination address of the packet does not match any SID in the local SID table, queries IPv6 routing and forwarding tables based on the destination address, and forwards the packet based on a routing and forwarding table hit by the destination address in the routing and forwarding tables.

The local SID table is a table maintained by the SRv6-enabled node. The local SID table includes an SRv6 SID generated by the node. An SRv6 forwarding table FIB may be generated based on the local SID table. There are three main functions of the local SID table. First, define locally generated SIDs, such as an End.X SID. Second, specify instructions bound to these SIDs. Third, store forwarding information related to these instructions, for example, an outbound interface and a next hop. In some embodiments, after a command display segment-routing ipv6 local-sid is entered, an SRv6 local SID table configured on a device can be viewed. The command may carry an argument end to specify viewing a local SID table of an SRv6 End. The command may carry an argument End.X to specify viewing a local SID table of an SRv6 End.X. The command may carry an argument end-dt4 to specify viewing a local SID table of an SRv6 end-dt4.

In SRv6, an SRH is added to an IPv6 packet, to record segment-related information by using the SRH, thus smoothly integrating with an original IPv6 forwarding plane in such a manner of adding an extension header. FIG. 2 is a schematic diagram of an SRv6 packet according to an embodiment of this application. The SRv6 packet may include an IPv6 header, an SRH, and a payload. The following describes each part of the SRv6 packet by using (1) to (3).

(1) IPv6 Header in the SRv6 Packet

The IPv6 header in the SRv6 packet may include a source address (source address, SA) and a destination address (destination address, DA). In a common IPv6 packet, an IPv6 DA is changeless. In SRv6, the IPv6 DA identifies a next node for a current packet. In an SR tunnel, an SR node may update the destination address continuously to implement hop-by-hop forwarding. An SID carried in the destination address in the IPv6 header may be referred to as an active SID.

(2) SRH in the SRv6 Packet

Figure 3:
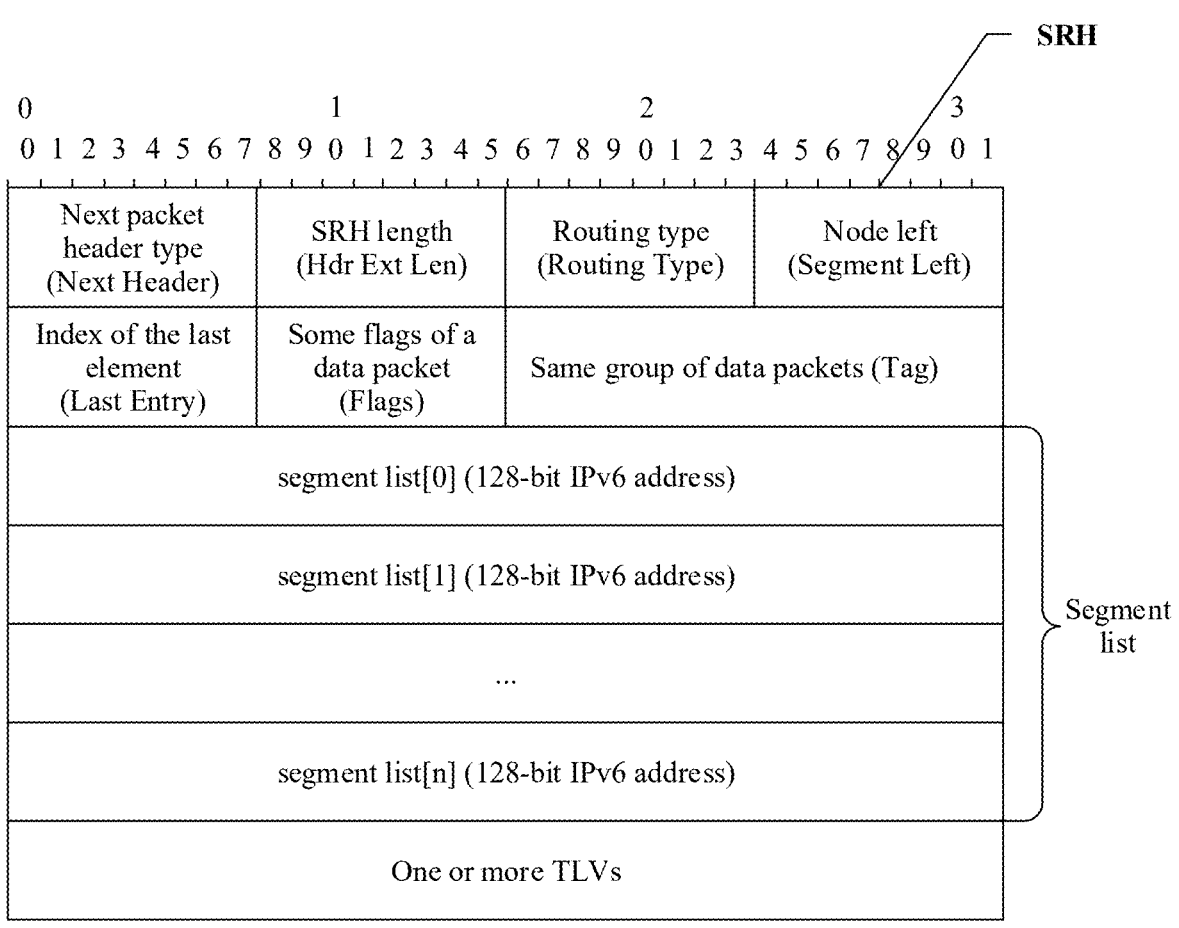
FIG. 3 is a schematic diagram of an SRH according to an embodiment of this application.

The SRH is an IPv6 extension header. The SRH is used to implement SRv6 based on an IPv6 forwarding plane. FIG. 3 is a schematic diagram of an SRH according to an embodiment of this application. The SRH may include the following pails (2.1) to (2.9).

(2.1) Segment List

The segment list may include one or more SIDs, and each SID may be in a form of an IPv6 address. Therefore, the segment list may also be understood as an explicit IPv6 address stack. The segment list may be abstracted into the following format:

SRH(SL=n)

<Segment List [0], Segment List [1], Segment List [2], . . . , Segment List [n]>.

<Segment List [0], Segment List [1], Segment List [2], . . . , Segment List [n]> are segment lists of an SRv6 packet, are similar to MPLS label stack information in SR MPLS, and are generated at an ingress node. Segment List [0] is the first segment list that needs to be processed on an SRv6 path, Segment List [1] is the second, Segment List [2] is the third, . . . , and Segment List [n] is an $(n+1)^{th}$. Herein, n is a positive integer or 0.

It should be noted that when the SRH in the IPv6 packet is expressed, the SRH may be expressed in a reverse-order form, to be specific, in a form of (Segment List [2], Segment List [1], Segment List [0]).

In SRv6, each time a packet passes through one SRv6 node, a value of an SL field decreases by 1, and IPv6 DA information changes once. The SL field and a segment list field together determine the IPv6 DA information.

If an SL value is n (n–0), an IPv6 DA value is a value of Segments List [0].

If an SL value is n–1, an IPv6 DA value is a value of Segments List [1].

If an SL value is n–2, an IPv6 DA value is a value of Segments List [2].

By analogy, if an SL value is 0 (n–n=0), an IPv6 DA value is a value of Segments List [n].

(2.2) SL

The SL may indicate an active SID in the segment list. In an SR tunnel, an SR node updates the active SID by performing an operation of offsetting an address stack. The SL is a field used to indicate a quantity of segment end nodes (Segment Left, SL) that should be further accessed to reach the current node, and the field may also be referred to as a node left field. For example, if the segment list includes five SIDs which are respectively an SID0, an SID1, an SID2, an SID3, and an SID4, and a value of the SL is 2, it indicates that there are two unprocessed SIDs in the segment list, which are respectively the SID0 and the SID1; a current to-be-processed SID in the segment list is the SID2; and there are two processed SIDs in the segment list, which are respectively the SID3 and the SID4.

(2.3) One or More TLVs

The TLV is an encoding format. The TLV includes a type, a length, and a value. The SRH may include one TLV or may include a plurality of TLVs. Different TLVs in the SRH may have a parallel relationship, or may have a nested relationship.

In addition, as shown in FIG. 3, the SRH may further include the following fields.

(2.4) Next packet header type: The SRv6 packet may further include one or more extension headers or one or more higher layer headers after an extension header, and the next header is used to indicate a type of the extension header or higher layer header after the extension header in the packet. A length of the next header may be 1 byte.

(2.5) Header extended length (Hdr Ext Len): is used to indicate a length of the extension header. The length indicated by the Hdr Ext Len may not include the first eight bytes of the extension header.

(2.6) Field used to indicate a routing type.

(2.7) Field used to indicate an index (Last Entry) of the last element.

(2.8) Field used to indicate some flags of a data packet.

(2.9) Field used to indicate a same group of data packets.

(3) Payload in the SRv6 packet

The payload in the SRv6 packet may be an original packet. The original packet may be an IPv4 packet, an IPv6 packet, or an Ethernet frame.

The foregoing describes a structure of the SRv6 packet, and the following describes an SRv6 SID.

Figure 4:
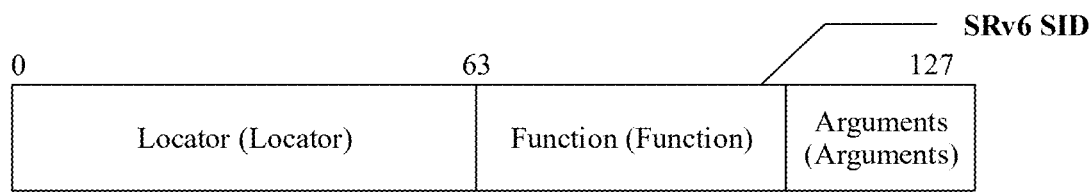
FIG. 4 is a schematic diagram of an SRv6 SID according to an embodiment of this application.

The SRv6 SID may include 128 bits. The SRv6 SID may be in a hexadecimal data form. A format of the SRv6 SID may be X:X:X:X:X:X:X:X. FIG. 4, FIG. 4 is a schematic diagram of an SRv6 SID according to an embodiment of this application.

The SID may include locating information and function information, and a format of the SID is locator:function. Optionally, the SID may further include argument information, and a format of the SID is locator:function:Arguments.

The locator occupies high bits of the SID. A locator field corresponds to an ipv6-prefix ipv6-address argument, and a length is determined by a prefix-length argument. The locator itself is an IPv6 network segment, and all IPv6 addresses in the network segment may be allocated as SRv6 SIDs. After a locator is configured on a node, a system generates a locator network segment route. The node can be located by using the locator network segment route, and all SIDs issued by the node can reach by using the locator network segment route. An SRv6 locator may be issued by using an SRv6 locator TLV. After receiving the TLV, another SRv6-capable IS-IS device delivers a corresponding locator to a forwarding table of the device, while an SRv6-incapable IS-IS device does not deliver a locator to a forwarding table.

The function occupies low bits of the SID. A function field is also referred to as an operate code (opcode), which may be dynamically allocated by using the IGP protocol or may be statically configured by using an opcode command. In SRv6, an action corresponding to each segment may be defined by using the function.

Arguments are optional in the SRv6 SID, and are configured and determined by commands.

After the SRv6 SID is generated, the SRv6 SID is added to the local SID table of the device on the one hand, and may be issued to the outside by using a routing protocol on the other hand. In actual forwarding, a locator part in the SRv6 SID is used to help another node in a network to perform routing and addressing to find a node where the SRv6 SID is generated, and forward the SRv6 packet to the node; and a function part is used to indicate, to perform a corresponding function operation, the node generating the SRv6 SID.

The foregoing describes the SRv6 SID. The SRv6 SID may include types such as an End SID, an End.X SID, an End.DT4 SID, and an End.OTP SID. The following describes an SRv6 SID-based forwarding procedure with reference to a specific type of the SRv6 SID.

Figures 5, 6:
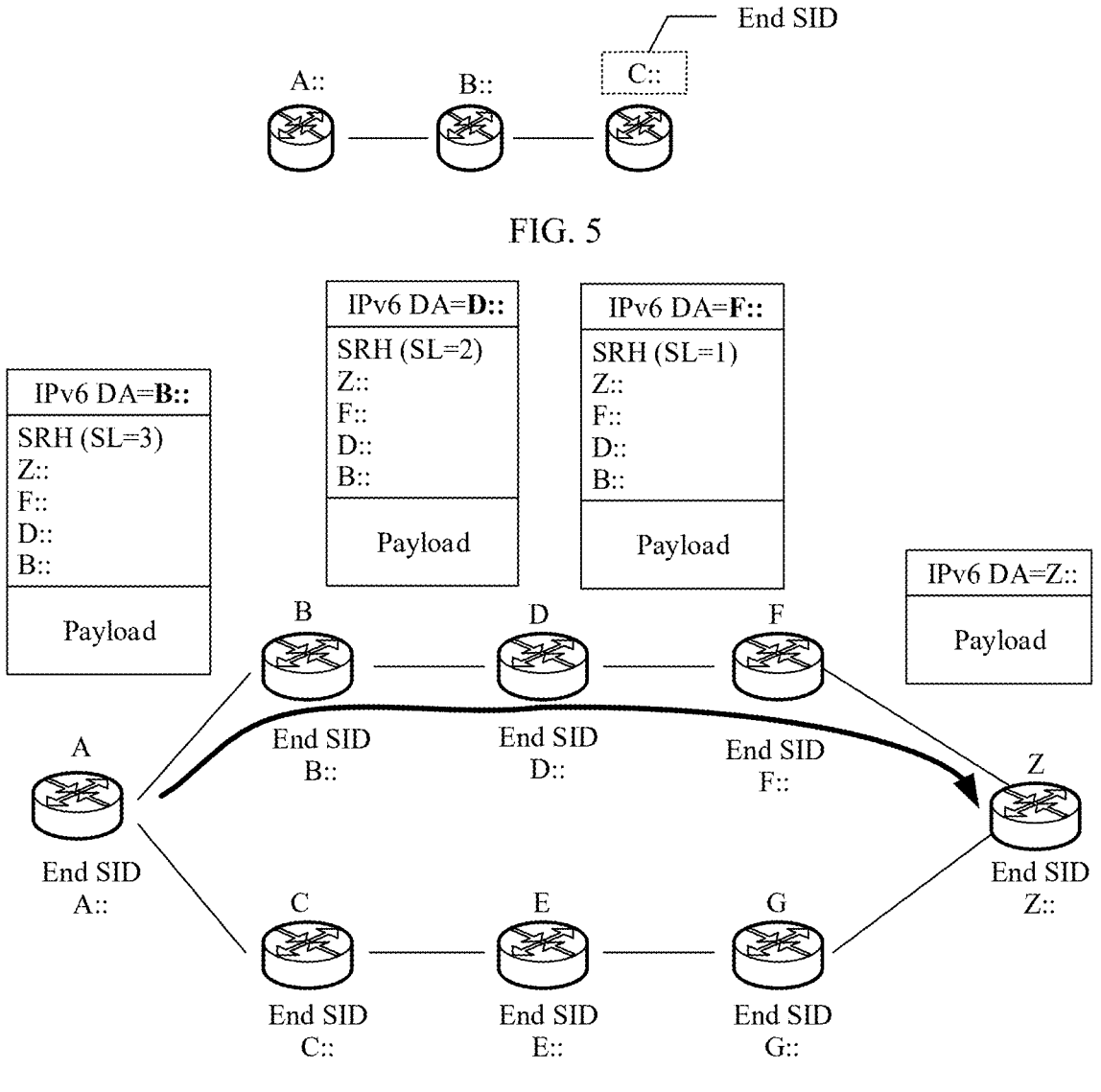
FIG. 5 is a schematic diagram of an End SID according to an embodiment of this application.
FIG. 6 is a schematic diagram of an End SID-based forwarding procedure according to an embodiment of this application.

End in an End SID represents endpoint. The End SID is an Endpoint SID. The End SID is used to identify a destination address prefix (Prefix) in a network. The End SID in SRv6 is similar to a prefix SID in SR MPLS. The SRv6 End SID may be issued by using an SRv6 End SID sub-TLV. The SRv6 End SID may be spread to another network element based on the IGP protocol. The SRv6 End SID sub-TLV is a sub-TLV used to issue an SRv6 End SID with an endpoint function. For example, FIG. 5 is a schematic diagram of an End SID according to an embodiment of this application. An End SID of a node A may be A::. An End SID of a node B may be B::. An End SID of a node C may be C::.

An End SID-based forwarding operation may include the following step 1 to step 5.

Step 1: An SR node receives a packet.

Step 2: The SR node queries a local SID table based on a destination address in an IPv6 header of the packet.

Step 3: The SR node determines, based on the local SID table, that a type (FuncType) of an active SID is an End type.

Step 4. The SR node continues to query an IPv6 FIB table.

Step 5. Forward the packet based on an outbound interface and a next hop that are found in the IPv6 routing and forwarding table.

For example, Table 1 is a schematic representation of the local SID table. If an IPv6 DA of an SRv6 packet is 10:1::1:0/128, when receiving the packet, the SR node queries Table 1 based on the IPv6 DA of the SRv6 packet, determines that FuncType of 10:1::1:0/128 is End, then continues to query the IPv6 routing and forwarding table based on 10:1::1:0/128, and forwards the packet based on an outbound interface and a next hop that are hit by 10:1::1:0/128 in the IPv6 routing and forwarding table.

TABLE 1

| My Local-SID End Forwarding Table | | | | |
|---|---|---|---|---|
| SID | FuncType | Flaver | locator Name | locator ID |
| 10:1::1:0/128 | End | PSP | a | 1 |
| 20:1::1:0/128 | End | PSP | b | 2 |
| 30:1::1:0/128 | End | PSP | c | 3 |

The table header My Local-SID End Forwarding Table of Table 1 represents a local SID table of an SRv6 End. FuncType represents a function type. Flavor represents a feature, for example, may be penultimate segment POP of the SRH (PSP). The locator ID represents an identity (ID) allocated to a locator.

FIG. 6 is a schematic diagram of an End SID-based forwarding procedure according to an embodiment of this application. The forwarding procedure includes: An SRH is pressed into a packet on a node A, where path information in the SRH is <Z::, F::, D::, B::>, and a destination address in an IPv6 header of the packet is B::. Each time the packet passes through one intermediate node, such as a node B and a node D, the intermediate node queries a local SID table based on the IPv6 DA of the packet. If the intermediate node determines that an active SID is of an End type, the intermediate node continues to query an IPv6 FIB table, and forwards the packet based on an outbound interface and a next hop that are found in the IPv6 FIB table. In addition, an SL decreases by 1, and the IPv6 DA changes once. When the packet reaches a node F, the node F queries a local SID table based on the destination address of the IPv6 header in the packet, determines that an active SID is of an End type, then continues to query an IPv6 FIB table, and forwards the packet based on an outbound interface found in the IPv6 FIB table. In addition, the SL decreases to 0, and the IPv6 DA changes to Z::. In this case, the path information <Z::, F::, D::, B::> is of no actual value. Therefore, the node F removes the SRH by using a PSP feature, and then forwards, to a node Z, the packet from which the SRH is removed.

The foregoing describes the End SID and the procedure for forwarding the packet in the SR tunnel based on the End SID. The following describes an End.X SID and an End.X SID-based forwarding procedure.

Figure 7:
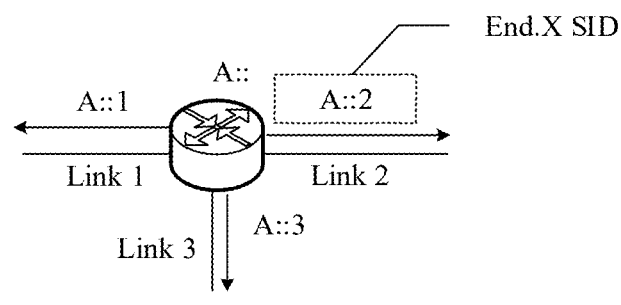
FIG. 7 is a schematic diagram of an End.X SID according to an embodiment of this application.

X in the End.X SID represents crossing. The End.X SID represents an endpoint SID of a Layer 3 cross-connection. Each End.X SID of an SR node is used to identify an IP-layer link directly connected to the SR node. The End.X SID in SRv6 is similar to an adjacency SID in SR MPLS. The SRv6 End.X SID may be spread to another network element based on the IGP protocol. For example, FIG. 7 is a schematic diagram of an End.X SID according to an embodiment of this application. An End SID of a node A may be A::. In addition, the node A includes three End.X SIDs. An End.X SID corresponding to a direct link 1 on the node A is A::1, an End.X SID corresponding to a direct link 2 on the node A is A::2, and an End.X SID corresponding to a direct link 3 on the node A is A::3.

An End X SID-based forwarding operation may include the following step 1 to step 4.

Step 1: An SR node receives a packet.

Step 2: The SR node queries a local SID table based on a destination address in an IPv6 header of the packet.

Step 3: The SR node determines, based on the local SID table, that an active SID is an End.X SID.

Step 4: The SR node directly forwards the packet based on an outbound interface and a next hop that are bound to the End X SID in the local SID table.

For example, Table 2 is a schematic representation of the local SID table. If an IPv6 DA of an SRv6 packet is 222::4:101:0:1/128, when receiving the SRv6 packet, the SR node queries Table 2 based on the IPv6 DA, determines that FuncType of 222::4:101:0:1/128 is End.X, and determines that an outbound interface hit by 222::4:101:0:1/128 in Table 2 is GE2/0/0, and that a next hop hit by 222::4:101: 0:1/128 in Table 2 is FE80::3A00:10FF:FE03:1; and then the SR node forwards the packet based on GE2/0/0 and FE80::3A00:10FF:FE03:1.

TABLE 2

| My Local-SID End.X Forwarding Table | | | | | |
| --- | --- | --- | --- | --- | --- |
| SID | FuncType | Flaver | NextHop | Interface | ExitIndex |
| 222::4:101:0:1/128 | End.X | — | FE80::3A00:10FF:FE03:1 | GE2/0/0 | 0x0000000a |
| 123:ABC::4:101:0:2/128 | End.X | PSP | FE80::3A00:10FF:FE03:0 | GE1/0/0 | 0x00000009 |

The table header My Local-SID End.X Forwarding Table of Table 2 represents a local SID table of an SRv6 End.X. FuncType represents a function type. Flavor represents a feature, for example, may be penultimate segment POP of the SRH (PSP). NextHop represents a next-hop address. Interface represents an outbound interface. Exit Index represents an index of the outbound interface.

Figure 8:
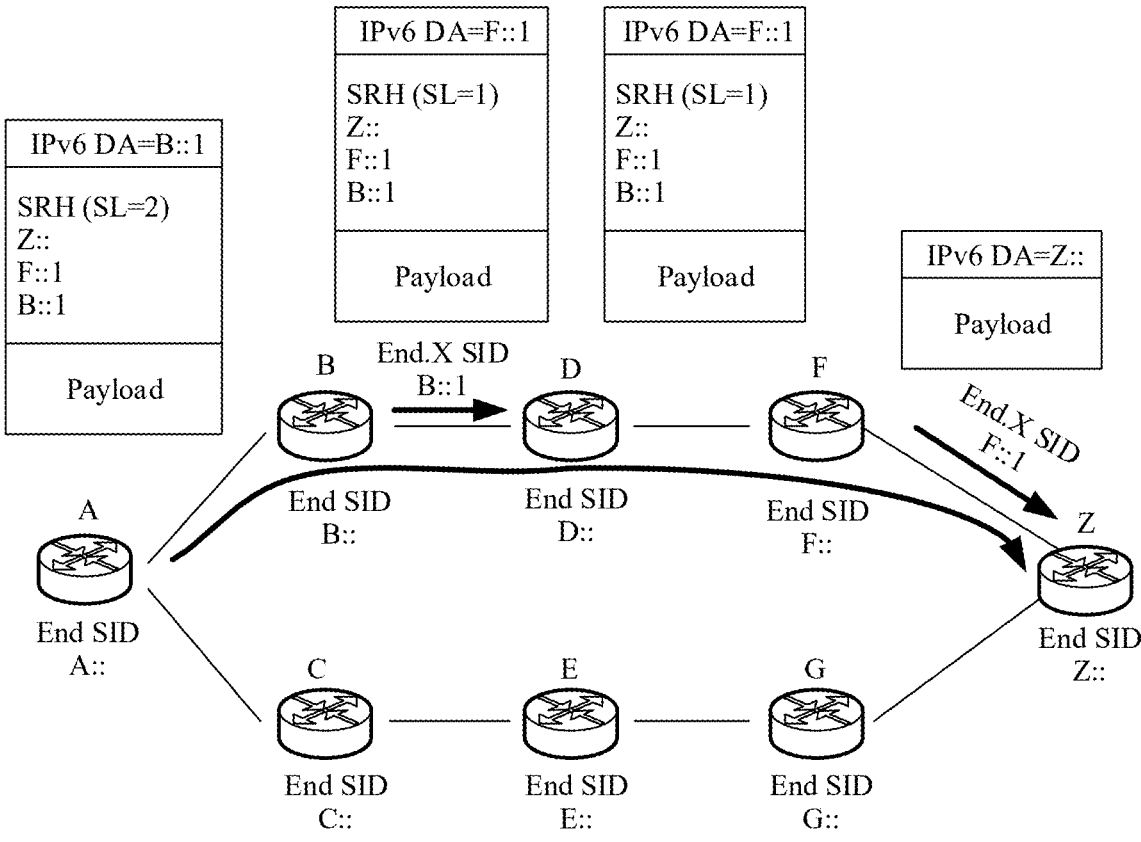
FIG. 8 is a schematic diagram of an End.X SID-based forwarding procedure according to an embodiment of this application.

FIG. 8 is a schematic diagram of an End.X SID-based forwarding procedure according to an embodiment of this application. The forwarding procedure includes: An SRH is pressed into a packet on a node A, where path information in the SRH is <Z::, F::1, B::1>, and a destination address in an IPv6 header of the packet is B::1. When the packet reaches an intermediate node B, the intermediate node B queries a local SID table based on the IPv6 DA, determines that an active SID is of an End.X type, and forwards the packet based on a next hop and an outbound interface corresponding to the End.X SID in the local SID table. In addition, an SL decreases by 1, and the IPv6 DA changes to F::1. When the packet reaches a node D, the node D queries a local SID table based on the IPv6 DA information F::1; if no matched SID is found, continues to use F::1 to query and match an IPv6 FIB table; and then forwards the packet to F based on forwarding information in the IPv6 FIB table. When the packet reaches the tail node F, the tail node F queries a local SID table based on the IPv6 DA, and determines that an active SID is of an End.X type, so that the tail node F directly forwards the packet based on a next hop and an outbound interface corresponding to the End.X SID in the local SID table. In addition, the SL decreases to 0, and the IPv6 DA changes to Z::. In this case, the SRH carrying the path information <Z::, F::1, B::1> is of no actual value. Therefore, the tail node F removes the SRH by using a PSP feature, and then forwards, to a node Z, the packet from which the SRH is removed. In this case, the packet flows out of an SR tunnel.

In the SRv6 technology, two or more SR nodes may form an anycast group by issuing anycast SIDs. The following describes anycast and the anycast SID.

Anycast is an IPv6 communication manner, and means that a group of nodes that provide same or corresponding services are identified by using a same address.

The anycast SID is used to identify a group of SR nodes. These SR nodes issue anycast SIDs, and the anycast SIDs issued by the SR nodes are the same. These SR nodes may be referred to as an anycast group. A same locator may be configured on each device in a same anycast group, to ensure that when one of the nodes is faulty, a service can be quickly switched to another node in an anycast fast re-route (FRR) manner. When forwarding is performed based on the anycast SID, a shortest path may be selected from paths to the SR nodes in the anycast group, to perform forwarding based on the shortest path.

The foregoing describes the SRv6 technology. The following describes an SRV6 service chain technology.

Figure 9:
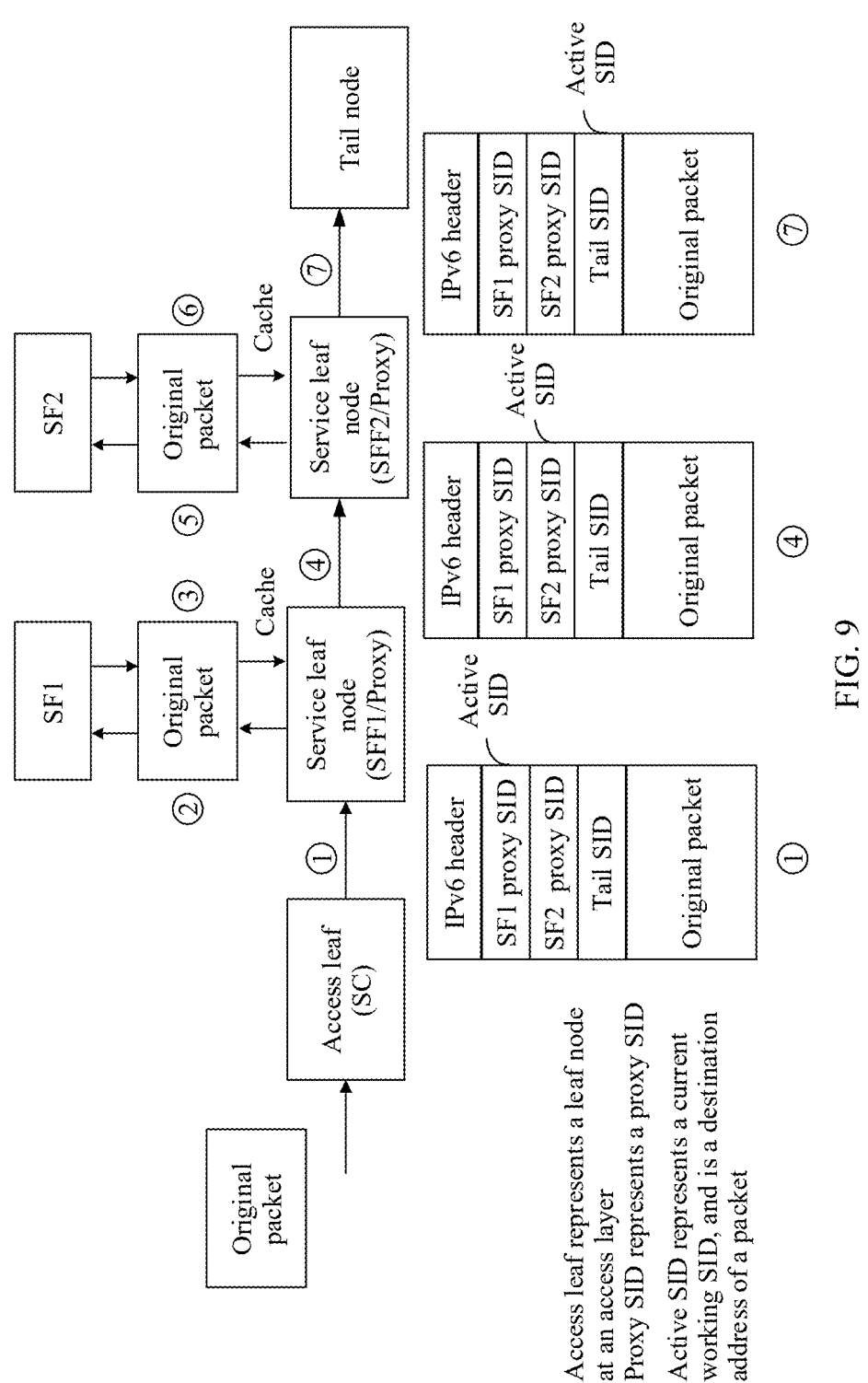
FIG. 9 is a schematic diagram of a forwarding procedure for an SRv6 service chain according to an embodiment of this application.

An SRV6 service chain may use an SRV6 adjustment and optimization capability and an SDN global network management capability to orchestrate SRV6 SID paths globally by using a controller. Refer to FIG. 9. The following provides supplementary description of a function of each network element in the SRV6 service chain.

An SC may be a head node of an SRv6 tunnel, and the SC is configured to complete packet encapsulation based on an SR label stack delivered by the controller. An SRH may be pressed into an original packet at the SC, and a segment list in the SRH indicates a forwarding path of the packet in the service chain. The controller may be a management node in network function virtualization (NFV), for example, a network function virtualization manager (VNFM). The controller may be an SDN controller in a software defined network (SDN). The SR label stack may be a segment list.

For an SF network element that does not support SR, an SFF (Proxy) accessed by the SF network element may process the SRH for the SF network element as a proxy.

Specifically, after receiving an SRv6 packet, the SFF may obtain an outbound interface and a corresponding behavior based on an SID in a label stack; and if it is determined that the behavior is popping from the label stack, removes an SRH of the packet, for example, performs a pop operation in SR to pop the SRH from the packet, and sends a packet that does not include the SRH to the SF. In addition, the SFF may store cache information of the service chain, and re-completes SR packet encapsulation in the service chain when the SF returns the packet. After the SF network element returns the packet to the proxy, the proxy may find the SRH from a cache based on an inbound interface, and use the SRH to complete SR encapsulation of the packet.

SF network element: performs service processing based on the original packet to obtain a processed packet. The SF network element may query routes to forward the packet to the proxy. Alternatively, the SF network element may send the packet to the proxy by using a default outbound interface. In addition, if the SF network element accesses two proxies in a dual-homed manner, load sharing may be formed based on IGP routing.

SRV6 static service chain: refers to a manner in which the SFF obtains a cache list through static configuration.

SRV6 dynamic service chain: refers to a manner in which the SFF dynamically learns a cache list based on traffic.

Nowadays, how to provide fault protection in a service chain has become a key to the service chain technology.

Figure 10:
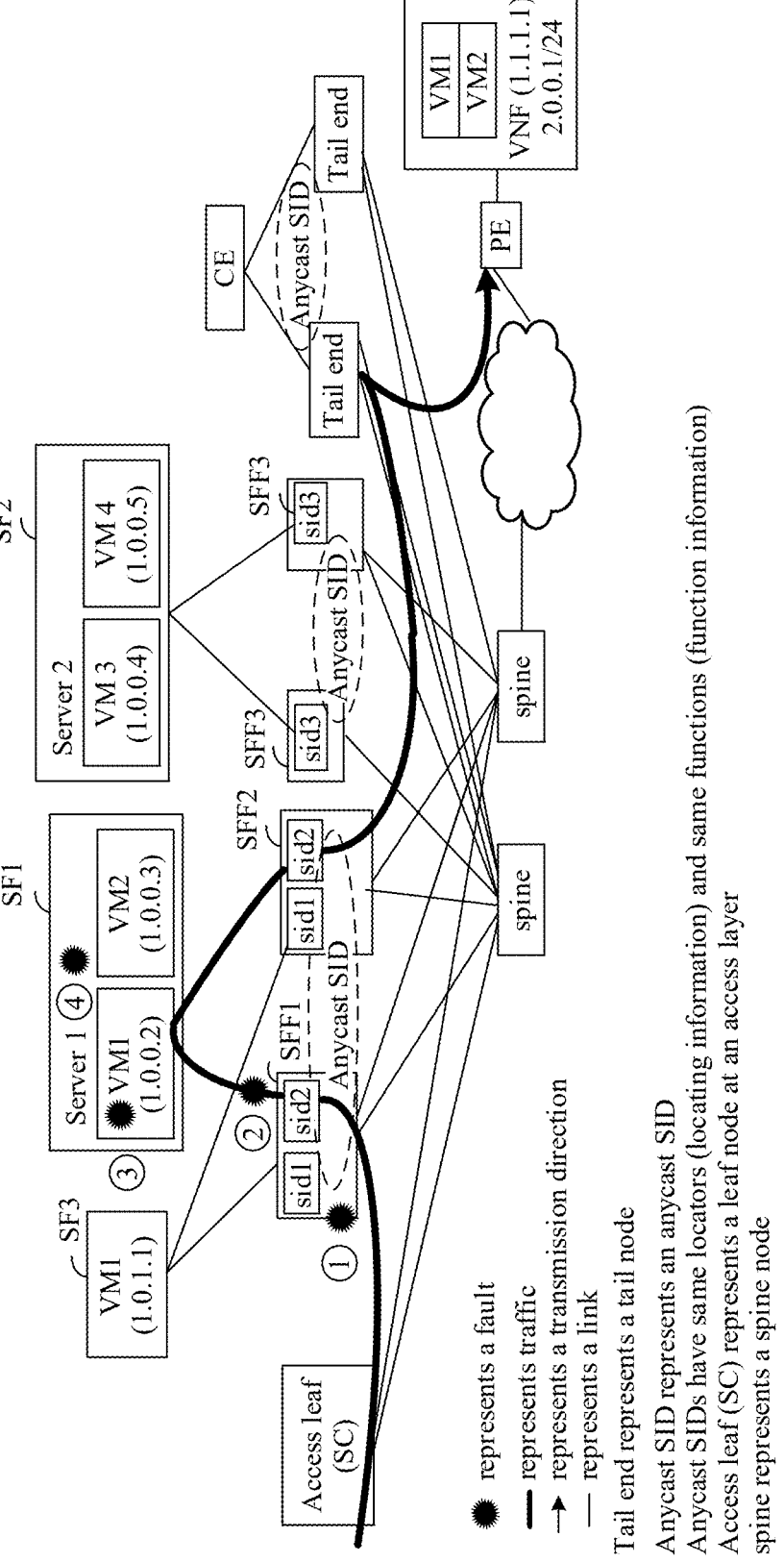
FIG. 10 is a schematic diagram of a service chain fault scenario according to an embodiment of this application.

Refer FIG. 10. A service chain fault scenario may specifically include a plurality of scenarios, for example, a scenario 1 to a scenario 4.

Scenario 1. An SFF is faulty.

For example, refer ① in FIG. 10. An SFF1 may be faulty.

Scenario 2. A link between the SFF and an SF network element is faulty.

For example, refer ② in FIG. 10. A link from the SFF1 to an SF1 may be faulty.

Scenario 3. AVM is faulty.

For example, refer ③ in FIG. 10. A VM1 on which the SF1 is located may be faulty.

Scenario 4. An SF network element is faulty.

For example, refer $\sqrt{4}$ in FIG. 10. The SF1 may be faulty.

Facing the foregoing scenarios, this embodiment provides a fault protection solution in an SRV6 service chain scenario, so that effective protection can be provided in a plurality of fault scenarios.

Specifically, in this embodiment of this application, many new SIDs are defined, including but not limited to a secondary SID, a backup SID, a bypass SID, and the like. These new SIDs may be used to normally forward traffic in a service chain fault scenario. In the following method embodiments, description is provided by using an example in which the secondary SID is referred to as a secondary SID, the backup SID is referred to as a backup SID, and the bypass SID is referred to as a bypass SID. In addition, a proxy SID is referred to as a proxy SID.

It should be understood that names of these SIDs are merely examples, and these SIDs may also have other names. For example, these SIDs may have different names in different scenarios. For example, different vendors use different names, or different names are used in different standards. The naming of the SIDs is not intended to limit the protection scope of this application.

In addition, the SID provided in this embodiment of this application may be configured on a plurality of nodes. Functions of SIDs configured on different nodes may be the same, or functions of SIDs configured on different nodes may be different. In some possible embodiments, a same SID may be configured on different nodes that have an anycast relationship in a service chain, to perform load sharing. For distinguishing description, words such as "first" and "second" are used to distinguish between SIDs configured on different nodes. For example, a secondary SID configured on a first SFF is referred to as a first secondary SID, and a secondary SID configured on a second SFF is referred to as a second secondary SID. It should be understood that there is no logical or time sequence dependency between the words such as "first" and "second", and neither a quantity of SIDs nor a working sequence of the SIDs are limited. For example, for two SIDs respectively referred to as a first SID and a second SID, the first SID is not necessarily the SID that works first, and the second SID is not necessarily the SID that works later. A working sequence of the first SID and the second SID may be determined based on a sequence of arranging the two SIDs in a segment list in an SRH.

In addition, the SID provided in this embodiment of this application is an SID used to identify a segment in an SR technology. For example, the SID provided in this embodiment of this application may be but is not limited to an SRv6 SID, and a format of the SID provided in this embodiment of this application may be shown in FIG. 4. It should be understood that an SID described in the following embodiments may implement a function of the SID described above.

In addition, a packet carrying the SID and provided in this embodiment of this application may be an SR packet transmitted in an SR network. For example, the packet provided in this embodiment of this application may be but is not limited to an SRv6 packet. Illustratively, a format of the packet provided in this embodiment of this application may be shown in FIG. 2. It should be understood that a packet described in the following embodiments may implement a function of the SRv6 packet described above.

In addition, the SID provided in this embodiment of this application may be carried in an SRH and a destination address of an IPv6 header of the packet. Illustratively, a format of the SRH in the packet provided in this embodiment of this application may be shown in FIG. 3. For details about the IPv6 header and the SRH, refer to the foregoing description.

In addition, a packet carrying the SID and provided in this embodiment of this application may be an SR packet transmitted in an SR network. For example, the packet provided in this embodiment of this application may be but is not limited to an SRv6 packet. Illustratively, a format of the packet provided in this embodiment of this application may be shown in FIG. 2. For details of the packet, refer to the foregoing description of the SRv6 packet. The packet provided in this embodiment of this application may include an IPv6 header, an SRH, and a payload, and the SID is carried by using a destination address of the IPv6 header and the SRH. A format of the SRH may be shown in FIG. 3. For details about the IPv6 header and the SRH, refer to the foregoing description.

In addition, for a basic principle of a method for forwarding a packet by using an SID, refer to FIG. 6, FIG. 8, and the foregoing related descriptions. In the following method embodiments, a difference from the foregoing description is focused on. For steps similar to those in the foregoing description, refer to FIG. 6, FIG. 8, and the foregoing related descriptions. For brevity of description, details are not described in the following method embodiments.

In addition, each node (for example, an SFF, an SF network element, or an SC) in the embodiments of this application may be a node in a service chain (SFC). For a function and a physical entity of each node, refer to the foregoing related descriptions. For brevity of description, details are not described in the following method embodiments.

The embodiments of this application may be applied to a plurality of service chain fault protection scenarios, including but not limited to: providing protection in a scenario in which a link between an SFF and an SF network element is faulty, preventing a loop in a dual-link fault scenario, and providing protection in a scenario in which an SF network element is faulty.

The following first describes a method embodiment of providing protection in a scenario in which a link between an SFF and an SF network element is faulty. In this method embodiment, description is provided by using an example in which a link between a first SFF and a first SF network element is faulty.

Figure 11:
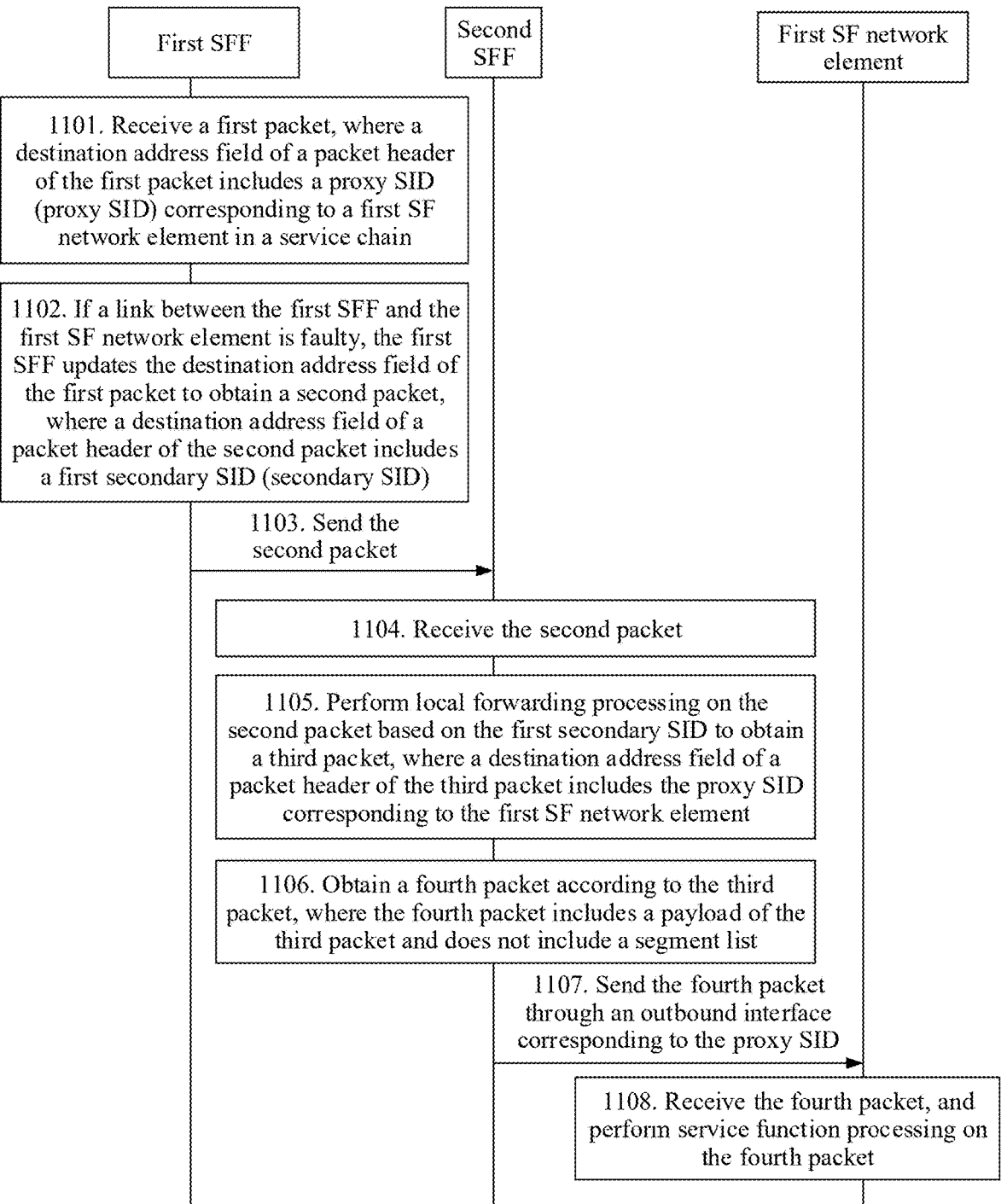
FIG. 11 is a flowchart of a service chain fault protection method according to an embodiment of this application.

Refer to FIG. 11. The method may include the following step 1101 to step 1108.

Step 1101: A first SFF in a service chain receives a first packet, where a destination address field of a packet header of the first packet includes a proxy SID corresponding to a first SF network element in the service chain.

Figure 12:
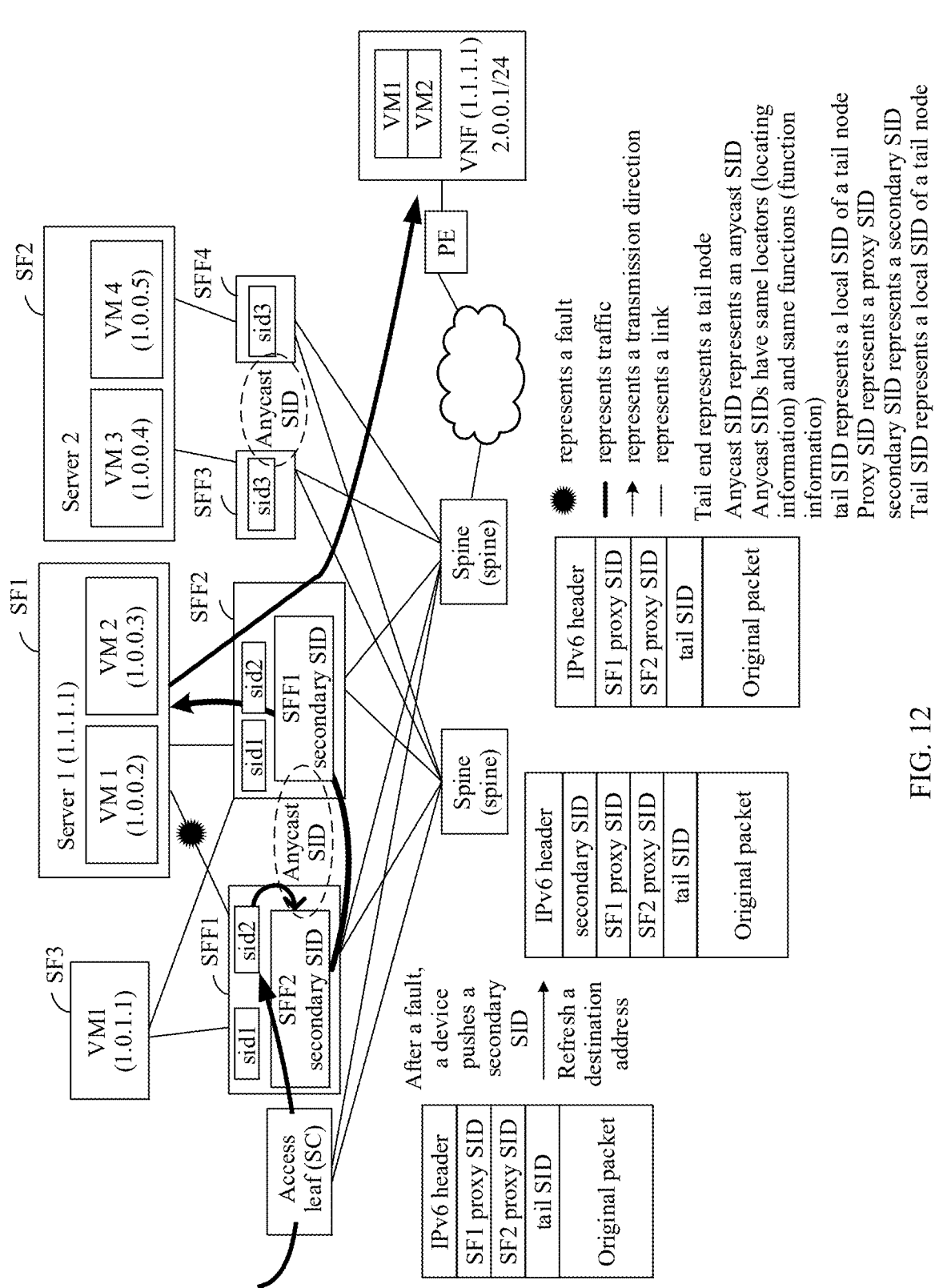
FIG. 12 is a schematic diagram of forwarding a packet in a scenario in which a link between an SFF and an SF in a service chain is faulty according to an embodiment of this application.

The first SFF may be an SRv6-enabled SFF in the service chain. For example, FIG. 12 is a schematic diagram of forwarding a packet in a scenario in which a link between an SFF and an SF in a service chain is faulty according to an embodiment of this application. The first SFF may be an SFF1 in FIG. 12.

The first SF network element is an SF network element accessed by the first SFF in the service chain. For example, refer to FIG. 12. The first SF network element may be an SF1 accessed by the SFF1 in FIG. 12.

The first packet may include an IPv6 header, an SRH, and a payload. The payload in the first packet may be an original packet to be processed by using an SF network element. The IPv6 header in the first packet includes a DA field, and a value of the DA field is the proxy SID corresponding to the first SF network element. The SRH in the first packet includes a segment list and an SL. The segment list includes the proxy SID corresponding to the first SF network element and another SID. A value of the SL may indicate that a current working SID in the segment list is the proxy SID corresponding to the first SF network element.

The proxy SID is an SID with a proxy function. The proxy SID corresponding to the first SF network element is used to indicate to perform a proxy operation for the first SF network element. The proxy SID is an SRv6 SID, and may be specifically an End.X SID.

The proxy SID included in the destination address field of the first packet may be an SID of the first SFF. The proxy SID may be preconfigured on the first SFF. The proxy SID may be pre-stored in a local SID table of the first SFF. The first SFF may pre-issue the proxy SID. A locator of the proxy SID is a locator configured on the first SFF. The locator of the proxy SID is used to locate the first SFF. A function of the proxy SID is used to indicate to perform a proxy operation for the first SF network element. In the local SID table on the first SFF, a next hop bound to the proxy SID may be the first SF network element, and an outbound interface bound to the proxy SID may be configured to establish a link with the first SF network element.

In addition, in some embodiments, the SF may access the first SFF and a second SFF in a dual-homed manner, and a local SID table of the second SFF also includes the proxy SID, so as to form load sharing based on an anycast relationship.

Figure 13:
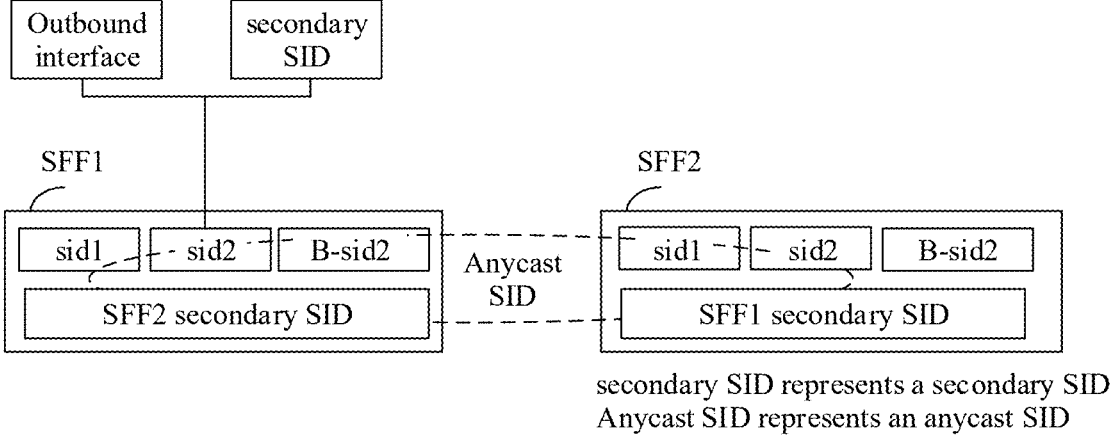
FIG. 13 is a schematic diagram of an SID of an SFF according to an embodiment of this application.

For example, refer to FIG. 12 and FIG. 13. An sid2 is preconfigured on the SFF1, and an sid2 is also preconfigured on the SFF2. The sid2 on the SFF1 is a proxy SID corresponding to the SF1, and the sid2 on the SFF2 is also the proxy SID corresponding to the SF1. An anycast SID relationship is formed between the sid2 of the SFF1 and the sid2 of the SFF2.

The first packet may be from an SC. The SC may be a head node of an SR tunnel. The SC may press the SRH into the original packet to obtain the first packet that carries the SRH, and send the first packet. The first packet may be routed and forwarded to the first SFF by using the locator of the proxy SID, and the first SFF receives the first packet. For example, refer to FIG. 12, traffic enters the SC, the SC sends a packet, the packet is bypassed to the SFF1 based on the SF1 proxy SID, and the SFF1 receives the packet. A destination address field of the packet received by an inbound interface of the SFF 1 includes the SF1 proxy SID.

Step 1102: If a link between the first SFF and the first SF network element is faulty, the first SFF updates the destination address field of the first packet to obtain a second packet, where a destination address field of the second packet includes a first secondary SID.

The second packet is a packet obtained after the first SFF processes the first packet based on the first secondary SID. The second packet may include an IPv6 header, an SRH, and a payload. The IPv6 header in the second packet includes a DA field, and a value of the DA field is the first secondary SID. The SRH in the second packet includes a segment list and an SL. The segment list includes the first secondary SID and another SID. Optionally, the segment list may include the proxy SID corresponding to the first SF network element. A value of the SL may indicate that a current working SID in the segment list is the first secondary SID. The payload in the second packet may be an original packet to be processed by using an SF network element. The second packet may include the payload of the first packet. For example, the payload in the second packet may be the same as the payload in the first packet.

A secondary SID and a proxy SID may form a primary/secondary backup protection relationship. Specifically, if a current working SID is a proxy SID, when a link fault occurs on an outbound interface corresponding to the proxy SID, an SFF may push a secondary SID into a packet, to update a destination address of the packet from the proxy SID to the secondary SID, so as to switch the packet from a tunnel corresponding to the proxy SID to a tunnel corresponding to the secondary SID, to bypass the packet to another SFF in a same protection groups. In addition, in some embodiments, it may be planned that a locator of the secondary SID and a locator of the proxy SID are not duplicated.

The first secondary SID may be a secondary SID configured on the first SFF. The first secondary SID may be a local SID of the second SFF. The first secondary SID may be pre-stored in the local SID table of the second SFF. A locator of the first secondary SID is used for routing to the second SFF. The locator of the first secondary SID may be a locator pre-issued by the second SFF.

For example, refer to FIG. 12 and FIG. 13. The SFF1 includes an SFF2 secondary SID. The SFF2 secondary SID is a local SID of the SFF2, and a locator of the SFF2 secondary SID may be located to the SFF2. The SFF2 secondary SID is configured on the SFF1, so that when a link from the SFF1 to the SF1 is faulty, the SFF1 pushes the SFF2 secondary SID into the packet, refreshes the destination address field of a packet header, and bypasses the packet to the SFF2 by using a locator route corresponding to the SFF2 secondary SID. In this way, the SFF1 switches traffic to a secondary SID tunnel.

The first SFF can update the destination address field of the packet header from the proxy SID to the first secondary SID by performing an operation of updating the destination address field, to make the current working SID in the second packet the first secondary SID, so that when receiving the second packet, after querying the local SID table by using a destination address, the second SFF performs an operation corresponding to the first secondary SID. It should be understood that the first packet may be in a form similar to that of an IP in IP (mobile IP data encapsulation and tunneling) packet, including an outer-layer IPv6 header and an inner-layer original packet. The updating the destination address field mentioned herein may be updating a destination address field of the outer-layer IPv6 header instead of updating a destination address field of the inner-layer original packet. For example, if the original packet itself is an IPv6 packet, an outer layer of the first packet is an IPv6 header, and an inner layer is an IPv6 packet. Then in this step, the first SFF may update the DA field of the outer-layer IPv6 header.

In some embodiments, a type of the first secondary SID may be an endpoint (End) type. For example, in the local SID table of the second SFF, a value of Func Type of the first secondary SID may be End.

Compared with a manner of selecting an End.X-type SID as the first secondary SID, selecting an End-type SID as the first secondary SID may avoid an operation of specifying a next hop and an outbound interface when an End.X SID is configured, thereby avoiding a case in which a large number of secondary SIDs, instead of a globally unique secondary SID, need to be configured on the first SFF because the End.X SID replaces a role of an original proxy SID since the End.X SID has both bypass and outbound interface specifying functions. In addition, because the first secondary SID is an End-type SID, a relatively severe constraint on subsequent planning of a backup SID is avoided.

The second SFF is an SFF other than the first SFF in a protection group. The protection group includes a plurality of SFFs accessed by the first SF network element. For example, the protection group may include two SFF nodes, and the two SFF nodes are two nodes accessed by the SF in a dual-homed manner. Alternatively, the protection group may include three or more SFF nodes, and these SFF nodes are nodes accessed by the SF in a multi-homed manner. For example, refer to FIG. 12. The SF1 accesses the SFF1 and the SFF2 in a dual-homed manner. If the first SFF is the SFF1, the second SFF may be the SFF2.

The protection group may be implemented based on a redundancy protection technology. In some embodiments, the protection group is an anycast group, and proxy SIDs issued by different SFFs in the anycast group are anycast SIDs. On an SF side, the SFFs in the protection group may assume roles of equivalent gateways. On a network side, the SFFs in the protection group may issue same proxy SIDs. Each SFF in the protection group may be understood as an equivalent node for load sharing. In a physical topology, there may be a direct link reachable by IP routing between different SFFs in a same protection group for bypass protection. The second SFF may be a bypass SFF of the first SFF. For example, refer to FIG. 12. If the first SFF is the SFF1, and the SFF1 and the SFF2 form an anycast relationship by using an anycast SID, the second SFF is the SFF2, and the first secondary SID is a local End SID of the SFF2. There may be a direct link reachable by IP routing between the SFF1 and the SFF2. The SFF2 is the bypass SFF of the SFF1.

In some embodiments, a secondary SID may be configured on each SFF belonging to the same protection group. Functions of the secondary SIDs configured on the SFFs may be the same. For a same pair of SFFs, a secondary SID configured on one SFF is a local End-type SID of the other SFF. For example, refer to FIG. 12. The SFF1 and the SFF2 form a pair of protection groups, and SFF fault protection is implemented by using an anycast SID. A secondary SID configured on the SFF1 is a local End-type SID of the SFF2. A locator of the secondary SID configured on the SFF1 is used for routing to the SFF2. Similarly, a locator of the secondary SID configured on the SFF2 is used for routing to the SFF1, and the secondary SID configured on the SFF2 is a local End SID on the SFF1. A function of the secondary SID configured on the SFF1 is the same as that of the secondary SID configured on the SFF2. Therefore, an action performed by the SFF1 based on the local secondary SID and an action performed by the SFF2 based on the local secondary SID are symmetrical actions.

In addition, the first SFF may push the first secondary SID into the SRH of the first packet, and update the SL in the SRH of the first packet, so that the SL points to the first secondary SID, thereby indicating that the first secondary SID is a current working SID in the SRH. By performing the step of updating the SL, the SL of the second packet generated by the first SFF is greater than the SL of the received first packet. In an SRv6 network, an SL in an SRH of an SRv6 packet is usually used to identify a quantity of to-be-processed SIDs. In this case, the value of the SL can be modified to indicate that the SRH includes more to-be-processed SIDs in the second packet sent by the first SFF compared with the first packet received by the first SFF, and the first SFF performs an action of pushing the SID into the SRH.

Step 1104: The first SFF sends the second packet.

The destination address field of a packet header of the second packet includes the first secondary SID, and a locator route for the first secondary SID is a locator route for the second SFF. Therefore, after being sent from the first SFF, the second packet is bypassed to the second SFF by using the first secondary SID. For example, refer to a bold black line at the bottom of a block diagram of the SFF1 in FIG. 12, after the SFF1 pushes the SFF2 secondary SID into traffic, the traffic is routed to the SFF2 by using the SFF2 secondary SID.

Step 1104: A second SFF in the service chain receives the second packet, where the destination address field of the second packet includes the first secondary SID.

Step 1105: The second SFF performs local forwarding processing on the second packet based on the first secondary SID to obtain a third packet, where a destination address field of a packet header of the third packet includes the proxy SID corresponding to the first SF network element.

The third packet is a packet obtained after local forwarding processing is performed on the second packet based on the first secondary SID.

The first secondary SID configured on the second SFF may be understood as a local forwarding identifier. After receiving the packet, the second SFF may query the local SID table based on the destination address of the packet header of the second packet, the second SFF determines that a type (Func Type) of the first secondary SID is End, and then the second SFF performs local forwarding processing on the second packet based on a secondary SID behavior.

The second SFF may update the destination address field of the packet header of the second packet, to update the destination address field of the packet header of the second packet from the first secondary SID to the proxy SID, so that the current working SID is updated from the first secondary SID to the proxy SID. In addition, the second SFF may pop the first secondary SID from the SRH of the second packet. In addition, the second SFF may update the SL in the SRH of the second packet, so that the SL points to the proxy SID corresponding to the first SF network element, thereby indicating that the proxy SID is a current working SID in the SRH.

Step 1106: The second SFF obtains a fourth packet based on the third packet, where the fourth packet includes a payload of the third packet and does not include a segment list.

After processing the packet based on the secondary SID behavior, the second SFF may continue to process the packet based on a proxy SID behavior, to remove an SRH of the third packet to obtain the fourth packet.

Step 1107: The second SFF sends the fourth packet to the first SF network element in the service chain through an outbound interface corresponding to the proxy SID.

The outbound interface corresponding to the proxy SID is an outbound interface that has a binding relationship with the proxy SID and that points to the SF. After the fourth packet is sent through the outbound interface, the fourth packet reaches the first SF network element.

Step 1108: The first SF network element receives the fourth packet, and performs service function processing on the fourth packet.

Because the packet received by the first SF network element does not include the SRH, the first SF network element can process the packet even if the first SF network element is an SR-unaware node.

Nowadays, in an SRv6 service chain-related technology, a protection solution in a scenario in which a link between an SF network element and an SFF is faulty has not been defined yet. Service traffic is interrupted once the link between the SF network element and the SFF is faulty.

In the method provided in this embodiment, in an SRV6 static service chain scenario, when a link between an SF network element and one SFF accessed by the SF network element is faulty, a secondary SID is introduced to update a destination address field of a packet header of a packet to the secondary SID, so that the packet is bypassed, based on the secondary SID, to another SFF accessed by the SF network element, thereby implementing protection for a fault in the link between the SFF and the SF network element, to prevent traffic from being interrupted due to a single-point link fault, and improve service chain reliability.

The foregoing describes the method for providing protection in the scenario in which the link between the SFF and the SF network element is faulty. In extension of the foregoing embodiment, the following describes a method for preventing a loop in an SRv6 service chain in a dual-link fault scenario.

For ease of understanding, a case in which a loop occurs in the dual-link fault scenario is first described.

Figure 14:
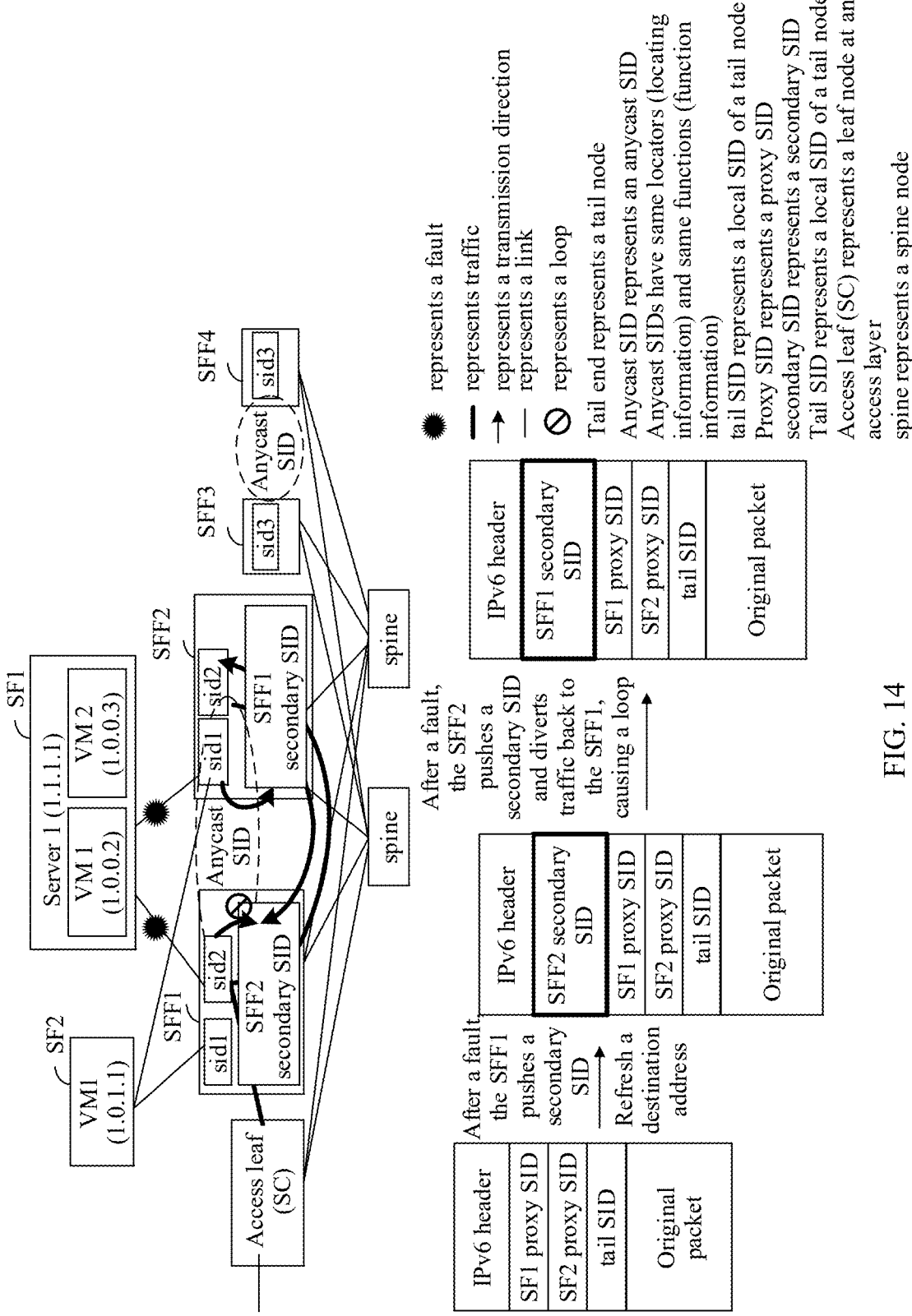
FIG. 14 is a schematic diagram in which a loop occurs in a service chain in a dual-link fault scenario according to an embodiment of this application.
Figure 15:
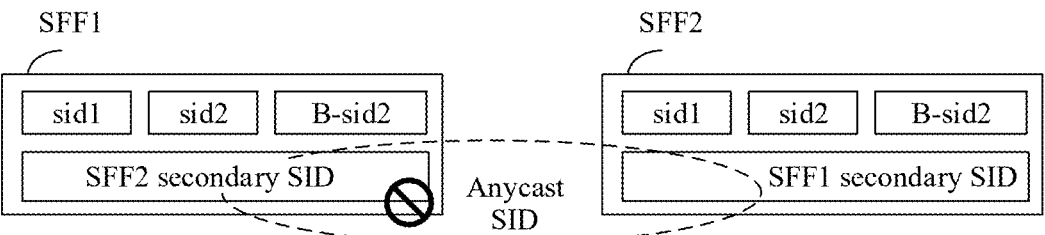
FIG. 15 is a schematic diagram of an SID of an SFF according to an embodiment of this application.

A dual-point fault may occur on a pair of leaf nodes (leaf node) in a service chain, to be specific, a link fault occurs on each leaf in a pair of leaf nodes. For example, refer to FIG. 14 and FIG. 15. A link between an SFF1 and an SF1 is faulty, and a link between an SFF2 and the SF1 is also faulty. In this scenario, the SFF1 pushes an SFF2 secondary SID into traffic. Then, the traffic is bypassed to the SFF2 by using the SFF2 secondary SID. When receiving the traffic, the SFF2 pushes an SFF1 secondary SID into the traffic because the SFF2 is aware of a link fault. Then, the traffic is bypassed back to the SFF1 by using the SFF1 secondary SID, causing the traffic to loop between the SFF1 and the SFF2. The leaf node is a term in a leaf-spine topology network, and the leaf node is configured to serve as an access layer of a network. The leaf node may be connected to a host and a spine node. The spine node is configured to serve as an aggregation layer of the network. A physical entity of the leaf node may be but is not limited to a switch of a data center.

In view of this, this embodiment provides a method for preventing a loop in a scenario in which a dual-link fault occurs in a service chain. The following describes the method by using an embodiment in FIG. 16. In the embodiment in FIG. 16, description is provided by using an example of a scenario in which a link between a first SFF and a first SF network element is faulty and a link between a second SFF and the first SF network element is also faulty. It should be understood that the embodiment in FIG. 16 focuses on the description of a difference from the embodiment in FIG. 11. For steps similar to those in the embodiment in FIG. 11, refer to the embodiment in FIG. 11. Details are not described again in the embodiment in FIG. 16.

Figure 16:
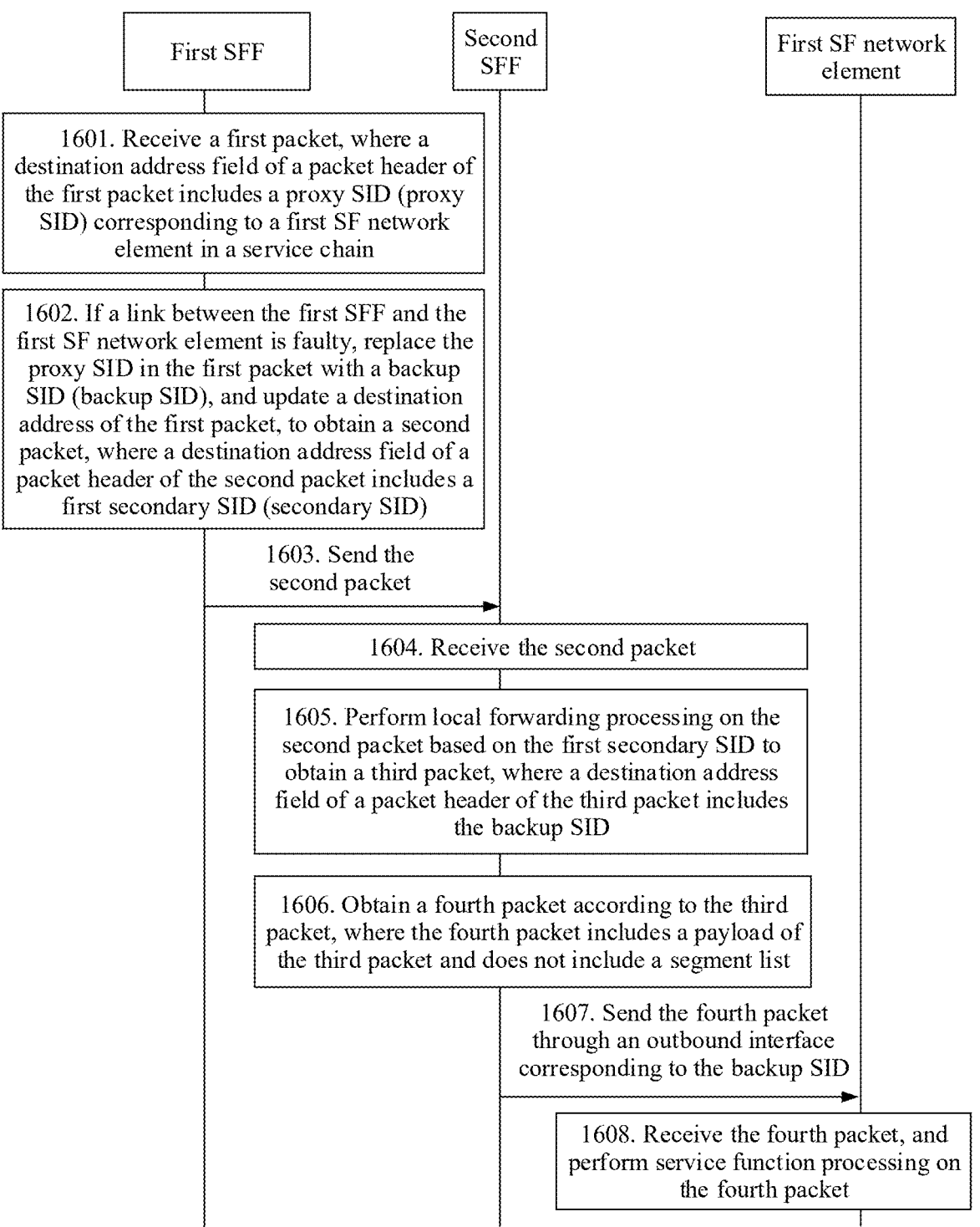
FIG. 16 is a flowchart of a service chain fault protection method according to an embodiment of this application.

Refer to FIG. 16. The method may include the following step 1601 to step 1608.

Step 1601: A first SFF in a service chain receives a first packet, where a destination address field of the first packet includes a proxy SID corresponding to a first service function SF network element in the service chain.

Step 1602: If a link between the first SFF and the first SF network element is faulty, the first SFF replaces the proxy SID in the first packet with a backup SID, and the first SFF updates the destination address field of a packet header of the first packet, to obtain a second packet, where a destination address field of the second packet includes a first secondary SID.

In this embodiment, the second packet is a packet obtained after the first SFF processes the first packet based on the first secondary SID and the backup SID. An SRH in the second packet includes a segment list and an SL. The segment list includes the first secondary SID and the backup SID, and the segment list does not include the original proxy SID, of the first packet, corresponding to the first SF network element. A value of the SL in the second packet may indicate that a current working SID in the segment list is the first secondary SID.

The backup SID may be a backup of the proxy SID corresponding to the first SF network element on the first SFF. For example, refer to FIG. 17 and FIG. 18. The backup SID may be a B-sid2 included in an SFF1. In the SFF1, the B-sid2 is a backup of an side, and the side is a proxy SID corresponding to an SF1. In the SFF1, an outbound interface and a next hop that are bound to the sid2 are configured to go to the SF1. In addition, the proxy SID of the first SFF and a proxy SID of a second SFF may be in an anycast SID relationship, and the backup SID may also be a backup of the proxy SID corresponding to the first SF network element on the second SFF. For example, refer to FIG. 17 and FIG. 18. The backup SID may also be a B-sid2 included in an SFF2. In the SFF2, the B-sid2 is a backup of an side, and the sid2 is the proxy SID corresponding to the SF1. In the SFF2, an outbound interface and a next hop that are bound to the sid2 are also configured to go to the SF1. The backup SID may be an End.X-type SID, or may be an End-type SID. This is not limited in this embodiment.

The backup SID is used to indicate the second SFF not to use a second secondary SID to forward the second packet. In a possible implementation, the second SFF may be preconfigured, so that if the current working SID is the backup SID, the second SFF performs forwarding to the first SF network element, and does not enter a secondary SID procedure. For example, refer to FIG. 17. The SFF2 includes the "B-side". If a current working SID in a packet is the B-side, the SFF2 may not use an SFF1 secondary SID to enter a secondary SID procedure, but perform forwarding to the SF1.

The second secondary SID may be a secondary SID configured on the second SFF. The second secondary SID may be a local SID of the first SFF. The second secondary SID may be pre-stored in a local SID table of the first SFF. A locator of the second secondary SID is used for routing to the first SFF. The locator of the second secondary SID may be a locator pre-issued by the first SFF. For example, refer to FIG. 17 and FIG. 18. The SFF2 includes the "SFF1 secondary SID". The SFF1 secondary SID is a local SID of the SFF1, and a locator of the SFF1 secondary SID may be located to the SFF1.

In some embodiments, a type of the second secondary SID may be an End type. For example, in the local SID table of the first SFF, a value of Func Type of the second secondary SID may be End.

In some embodiments, a binding relationship between a backup SID and an outbound interface may be established on the second SFF, the outbound interface corresponding to the backup SID is configured to establish a link between the second SFF and the first SF network element, and the outbound interface corresponding to the backup SID may be different from an outbound interface corresponding to a proxy SID.

In addition, a function of the backup SID may be the same as that of the proxy SID. In addition, a function of the backup SID configured on the first SFF may be the same as a function of the backup SID configured on the second SFF.

It should be understood that a time sequence of the two steps of updating the destination address and replacing the proxy SID is not limited in this embodiment. In some embodiments, updating the destination address and replacing the proxy SID may be performed sequentially. For example, updating the destination address may be first performed, and replacing the proxy SID is then performed; or replacing the proxy SID is first performed, and updating the destination address is then performed. In some other embodiments, updating the destination address and replacing the proxy SID may also be performed in parallel, in other words, updating the destination address and replacing the proxy SID may be performed simultaneously.

Step 1603: The first SFF sends the second packet.

After the second packet is sent from an outbound interface of the first SFF, the second packet is bypassed to the second SFF by using the first secondary SID. For example, refer to FIG. 17. When a link between the SFF1 and the SF2 (a link corresponding to the sid2) is faulty, when traffic enters an SFF2 secondary SID tunnel, the SFF1 first replaces an original SF1 proxy SID in the traffic with a backup proxy SID, and then the SFF1 presses an SFF2 secondary SID into the traffic, so that the traffic is bypassed to the SFF2 by using the SFF2 secondary SID.

Step 1604: A second SFF in the service chain receives the second packet, where a destination address of a packet header of the second packet includes the first secondary SID, and the first secondary SID is a local SID of the second SFF, for example, the first secondary SID is an End-type SID.

Step 1605: The second SFF performs local forwarding processing on the second packet based on the first secondary SID to obtain a third packet, where a destination address of a packet header of the third packet includes the backup SID.

The third packet may be a packet obtained after local forwarding processing is performed on the second packet based on the first secondary SID.

Step 1606: The second SFF obtains a fourth packet based on the third packet, where the fourth packet includes a payload of the third packet and does not include a segment list.

This step may include: The second SFF queries a local SID table based on a destination address field of the packet header of the third packet, determines that the destination address of the third packet matches the backup SID, and then executes an instruction corresponding to the backup SID, to obtain the fourth packet. A process of executing the instruction corresponding to the backup SID may be referred to as a backup SID behavior. The fourth packet may be a packet obtained after the third packet is processed based on the backup SID.

Figure 17:
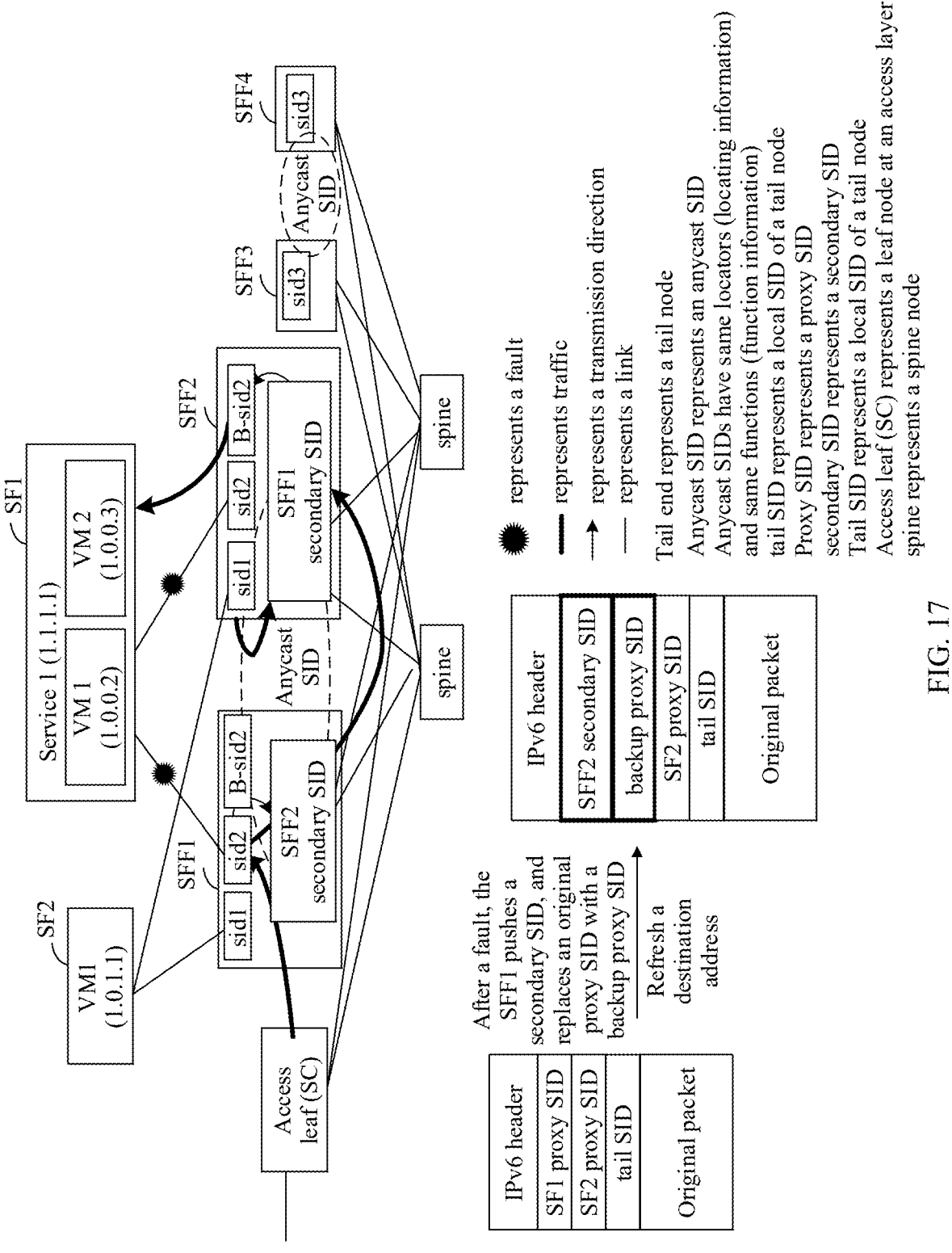
FIG. 17 is a schematic diagram of forwarding a packet in a service chain in a dual-link fault scenario according to an embodiment of this application.
Figure 18:
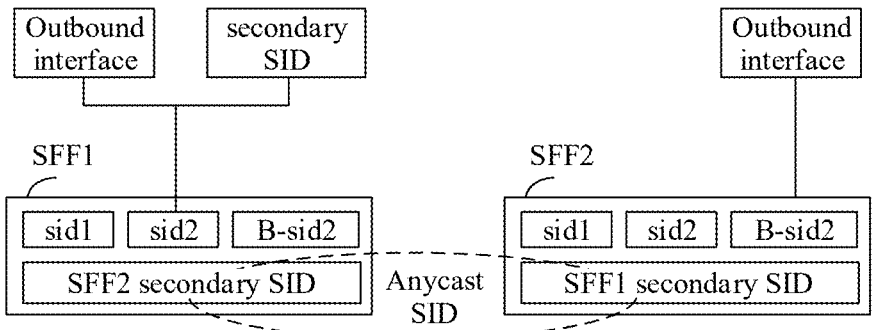
FIG. 18 is a schematic diagram of an SID of an SFF according to an embodiment of this application.

For example, refer to FIG. 17 and FIG. 18. After the SFF2 receives the packet, because the SFF1 secondary SID is at an outer layer and the backup SID is at an inner layer, the SFF2 first processes the packet based on a secondary SID behavior, and then continues to process the packet based on a backup SID behavior. For example, refer to an arrow inside the SFF2 in FIG. 17. The arrow points from the SFF1 secondary SID to the B-side, and then points from the B-sid2 to a VM2 on which the SF1 is located, meaning that the packet is first processed based on an SFF1 secondary SID behavior, the packet is then processed based on a B-sid2 behavior, and then the packet is forwarded to the VM2 on which the SF1 is located.

In addition, because the function of the backup SID is the same as that of the proxy SID, the second SFF performs the function of the proxy SID based on the backup SID, and removes an SRH of the third packet to obtain the fourth packet.

Step 1607: The second SFF sends the fourth packet to the first SF network element in the service chain through an outbound interface corresponding to the backup SID.

Step 1608: The first SF network element receives the fourth packet, and performs service function processing on the fourth packet.

If the link between the second SFF and the first SF network element is faulty, and the packet still carries the proxy SID but does not carry the backup SID, the second SFF pushes the second secondary SID into the packet, refreshes the destination address field of the packet header, and bypasses the packet back to the first SFF by using a locator route corresponding to the second secondary SID, causing a loop. The proxy SID in the packet is replaced with the backup SID. Because the backup SID indicates the second SFF not to use the second secondary SID to forward the second packet, the second SFF does not enter the secondary SID procedure, but only performs forwarding to the first SF network element, thereby breaking the loop.

In conclusion, in the method provided in this embodiment, in an SRV6 static service chain scenario, even if links between an SF network element and two SFFs accessed in a dual-homed manner are both faulty, a backup SID is introduced to replace, with the backup SID, a proxy SID originally included in a packet, so that the packet can be bypassed, by using a secondary SID, to another SFF accessed by the SF network element, and another SFF can be indicated, by using the backup SID, to perform forwarding to the SF network element, without entering a secondary SID procedure any more. Therefore, a traffic loop caused after the another SFF enters the secondary SID procedure is avoided. Therefore, a traffic loop caused by a dual-point fault can be prevented by using a backup SID mechanism.

The foregoing describes the method for providing protection and the method for preventing a traffic loop in the scenario in which the link between the SFF and the SF network element is faulty. In addition to the link fault scenarios described in the foregoing embodiments, an SRV6 static service chain fault scenario also includes a node fault scenario, for example, an entire SF network element is faulty. In view of this, this embodiment provides a method for providing protection in a scenario in which an SF network element in a service chain is faulty. The following describes the method by using an embodiment in FIG. 19. In the embodiment in FIG. 19, description is provided by using an example in which a second SF network element is faulty. It should be understood that the embodiment in FIG. 19 focuses on the description of a difference from the foregoing embodiments. For steps similar to those in the foregoing embodiments, refer to the foregoing embodiments. Details are not described again in the embodiment in FIG. 19.

Figure 19:
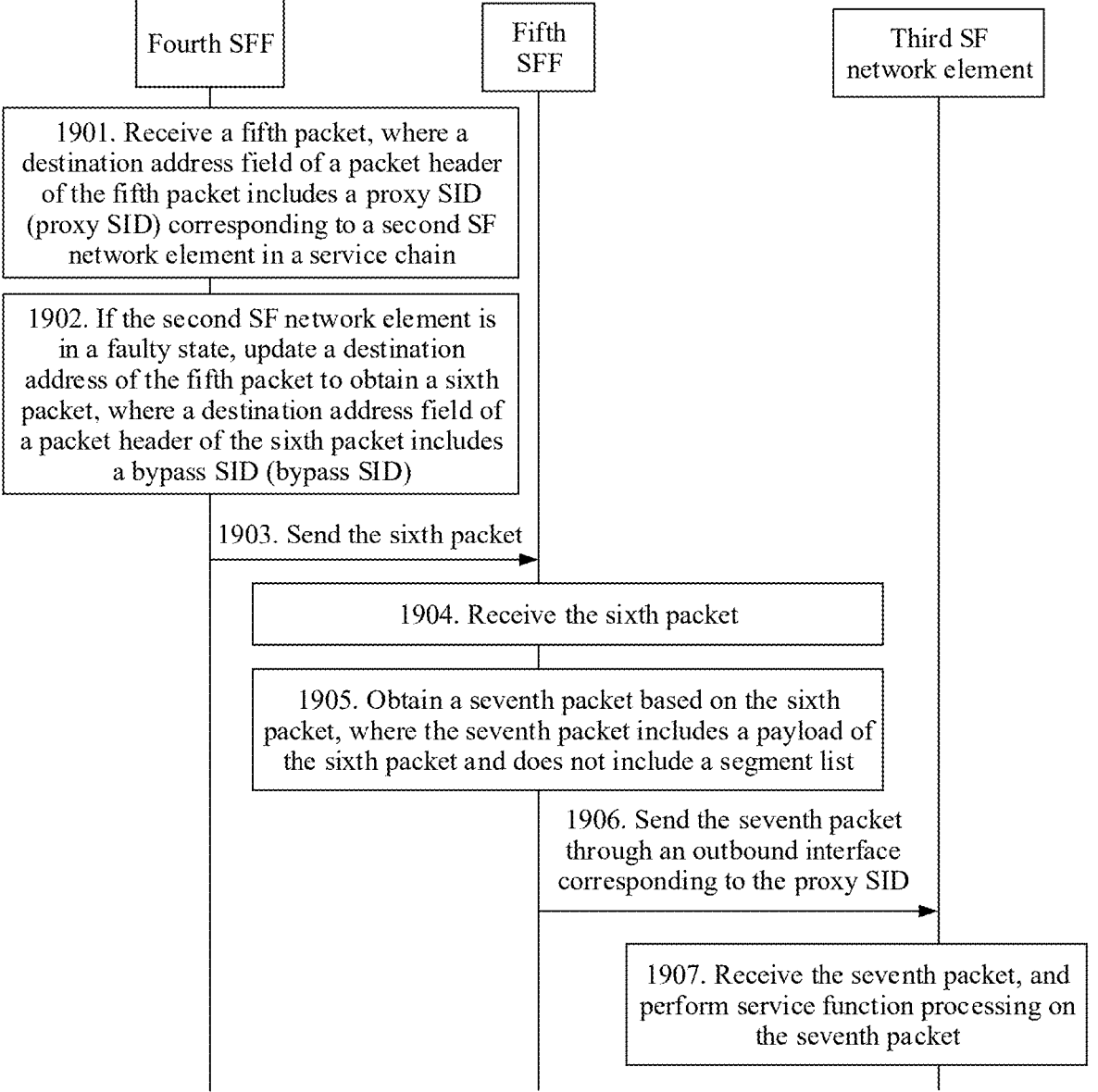
FIG. 19 is a flowchart of a service chain fault protection method according to an embodiment of this application.

Refer to FIG. 19. The method may include the following step 1901 to step 1907.

Step 1901: A fourth SFF in a service chain receives a fifth packet, where a destination address field of a packet header of the fifth packet includes a proxy SID corresponding to a second SF network element in the service chain.

The fourth SFF may be the first SFF in the embodiment in FIG. 11. Alternatively, the fourth SFF may be the second SFF in the embodiment in FIG. 11. Alternatively, the fourth SFF may not be the first SFF or the second SFF, but is another SFF in the service chain. This is not limited in this embodiment. The second SF network element is an SF network element accessed by the fourth SFF in the service chain. For example, if the fourth SFF is the first SFF or the second SFF in the embodiment in FIG. 11, the second SF network element may be the first SF network element in the embodiment in FIG. 11.

Step 1902: If the second SF network element is in a faulty state, the fourth SFF updates the destination address field of the packet header of the fifth packet to obtain a sixth packet, where a destination address field of the sixth packet includes a bypass SID.

The sixth packet is a packet obtained after the fourth SFF processes the fifth packet based on the bypass SID. An IPv6 header in the sixth packet includes a DA field, and a value of the DA field is the bypass SID. An SRH in the sixth packet includes a segment list and an SL. The segment list includes the bypass SID and another SID. A value of the SL may indicate that a current working SID in the segment list is the bypass SID. A payload in the sixth packet may be an original packet to be processed by using an SF network element. The sixth packet may include a payload of the fifth packet. For example, the payload in the sixth packet may be the same as the payload in the fifth packet.

The bypass SID is used to bypass to an SF network element other than an SF network element in a faulty state, to normally forward service traffic. In this embodiment, such a scenario is used as an example for description: The second SF network element is faulty, the service chain further includes a third SF network element in addition to the second SF network element, and the third SF network element accesses a fifth SFF. In this scenario, the bypass SID may be an SID configured on the fifth SFF. The bypass SID may be a local SID of the fifth SFF. The bypass SID may be pre-stored in a local SID table of the fifth SFF. A locator of the bypass SID is used for routing to the fifth SFF. The locator of the bypass SID may be a locator pre-issued by the fifth SFF. For example, refer to FIG. 20 and FIG. 21. An SFF2 includes a "Bypass SID". The bypass SID is a local sid3 of an SFF3, and a locator of the bypass SID may be located to the SFF3.

In some embodiments, a type of the bypass SID may be an End type. For example, in the local SID table of the fifth SFF, a value of Func Type of the bypass SID may be End.

The bypass SID specifically includes a plurality of implementations. Actions of the fourth SFF may be different when the bypass SID is implemented in different manners. The following uses a manner 1 and a manner 2 as examples for description.

Manner 1: The bypass SID may be separately defined.

The bypass SID may be an End-type SID separately defined on the fifth SFF. In this manner, the fourth SFF may further push the bypass SID into an SRH of the fifth packet, and update the destination address field of the packet header of the fifth packet, to obtain the sixth packet.

Manner 2: The bypass SID is a proxy SID corresponding to the third SF network element.

Alternatively, the bypass SID may use, in a multiplexing manner, a proxy SID corresponding to an SF network element to which traffic is to hop, to be specific, the proxy SID corresponding to the third SF network element. In this manner, because an SRH of the fifth packet already includes the proxy SID corresponding to the third SF network element, the third SF network element may not push the bypass SID into the SRH of the fifth packet, but update a value of an SL field in the SRH to directly offset a current working SID to the proxy SID corresponding to the third SF network element, and update the destination address field of the packet header of the fifth packet, to perform forwarding.

The third SF network element is an SF network element other than the second SF network element. The third SF network element may be a specified SF network element to which traffic is to hop after the second SF network element is faulty. The third SF network element specifically includes a plurality of cases. The following uses a case (1) and a case (2) as examples for description.

Case (1) The third SF network element is a backup SF network element of the second SF network element.

A backup SF network element is configured to serve as a backup of the third SF network element. The backup SF network element is a service network element. A service function provided by the backup SF network element may be the same as a service function provided by the third SF network element. For example, in a possible implementation, the backup SF network element and the third SF network element may be in a dual-machine hot standby relationship, the third SF network element is a primary machine, and the backup SF network element is a secondary machine. After the third SF network element is faulty, the backup SF network element may replace the third SF network element to perform service function processing.

Case (2) The third SF network element is a next SF network element of the second SF network element in the service chain.

For example, refer to FIG. 12. If the second SF network element is an SF1, the third SF network element may be an SF2.

If the third SF network element is in the case (2), because proxy SIDs corresponding to two adjacent SF network elements may be adjacent in a segment list of an SRH, the proxy SID corresponding to the third SF network element may be a next proxy SID of the proxy SID corresponding to the second SF network element. In this case, the third SF network element may offset a current working SID in the fifth packet to the next proxy SID, for example, decrease a value of an SL field by 1, then update the destination address field of the packet header of the fifth packet to obtain the sixth packet, and forward the sixth packet.

There may be a plurality of manners for determining that an SF network element is in a faulty state. The following uses a manner 1 and a manner 2 as examples for description.

Manner 1: If an outbound interface corresponding to the proxy SID is in an up (UP) state, and each VM on which the second SF network element is located is unreachable, the fourth SFF detects that the second SF network element is in the faulty state.

Figure 20:
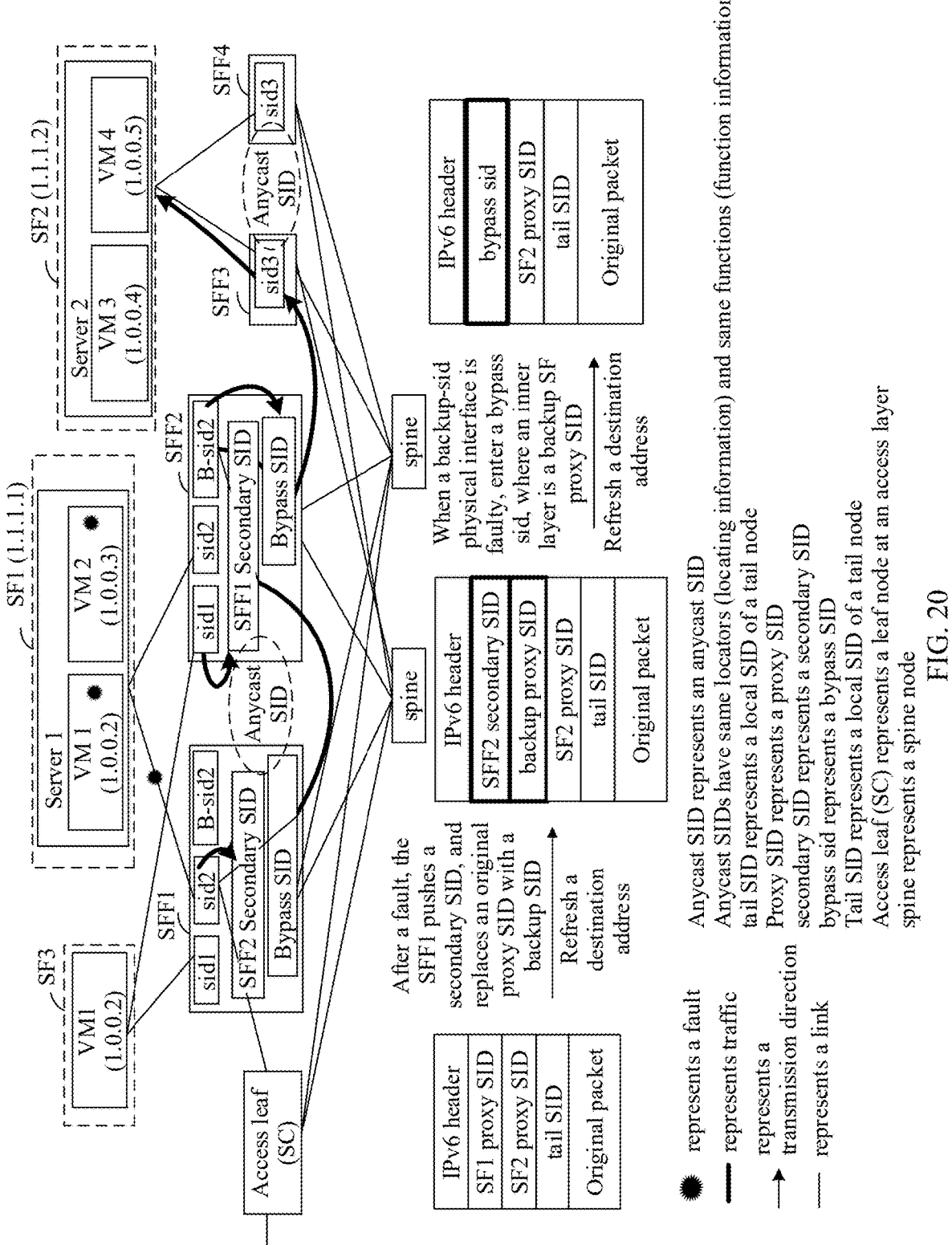
FIG. 20 is a schematic diagram of forwarding a packet in a scenario in which an SF network element in a service chain is faulty according to an embodiment of this application.
Figure 21:
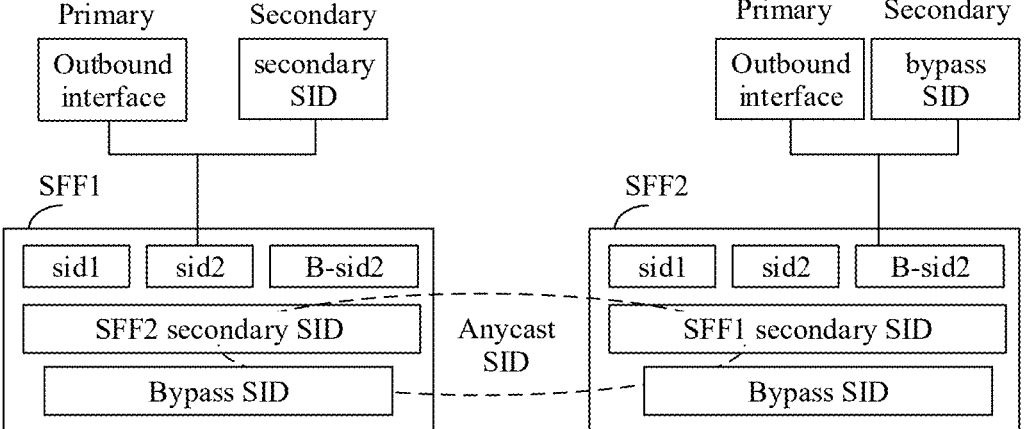
FIG. 21 is a schematic diagram of an SID of an SFF according to an embodiment of this application.

For example, refer to FIG. 20. An iface-out interface bound to an sid2 on the SFF2 is in a physical UP state, and both a VM1 and a VM2 on which the SF1 runs are unreachable. In this case, the SFF2 may determine that the SF1 is faulty.

Manner 2: If a link fault occurs on at least one of an outbound interface corresponding to the backup SID or an outbound interface corresponding to the proxy SID, the fourth SFF detects that the second SF network element is in the faulty state.

Specifically, the manner 2 may be but is not limited to the following manner 2.1 to manner 2.2.

Manner 2.1: The proxy SID and the backup SID are configured on the fourth SFF.

In the manner 2.1, there are two outbound interfaces on the fourth SFF and pointing to the second SF network element. A binding relationship is established between one outbound interface and the proxy SID, and a binding relationship is established between the other outbound interface and the backup SID. If the fourth SFF detects that the outbound interface corresponding to the backup SID is in a down state, and that the outbound interface corresponding to the proxy SID is also in a down state, the fourth SFF may determine that each link between the fourth SFF and the second SF network element is disconnected. Therefore, the fourth SFF may determine that the second SF network element is in the faulty state.

The backup SID on the fourth SFF may be used to prevent traffic between the fourth SFF and the fifth SFF from looping. The backup SID on the fourth SFF may be used to indicate the fourth SFF not to use a third secondary SID to forward the fifth packet. The third secondary SID is a local SID of the fifth SFF. A relationship between the fifth SFF and the fourth SFF may be an anycast relationship. The fifth SFF may be an SFF other than the fourth SFF in a protection group, and the protection group includes a plurality of SFFs accessed by the second SF network element.

Manner 2.2: Only the proxy SID is configured on the fourth SFF, but the backup SID is not configured.

In the manner 2.2, there is an outbound interface on the fourth SFF and pointing to the second SF network element, and a binding relationship is established between the outbound interface and the proxy SID. If the fourth SFF detects that the outbound interface corresponding to the proxy SID is in a down state, the fourth SFF may determine that each link between the fourth SFF and the second SF network element is disconnected. Therefore, the fourth SFF may determine that the second SF network element is in the faulty state.

Step 1903: The fourth SFF sends the sixth packet.

After the sixth packet is sent from the outbound interface of the fourth SFF, the sixth packet is bypassed to the fifth SFF by using the bypass SID.

Step 1904: A fifth SFF in the service chain receives the sixth packet.

Step 1905: The fifth SFF obtains a seventh packet based on the sixth packet, where the seventh packet includes a payload of the sixth packet and does not include a segment list.

Because the fourth SFF updates the destination address field of the packet header to the bypass SID, after querying the local SID table by using the destination address field, the fifth SFF performs an operation corresponding to the bypass SID.

Actions of the fifth SFF may be different according to different implementations of the bypass SID. The following uses a manner 1 and a manner 2 as examples for description.

Manner 1: The bypass SID may be separately defined.

In the manner 1, the action of the fifth SFF may include the following step 1 and step 2.

Step 1: The fifth SFF performs local forwarding processing on the sixth packet based on the bypass SID to obtain an eighth packet.

A destination address field of a packet header of the eighth packet includes a proxy SID corresponding to the third SF network element, and the eighth packet may include the payload of the sixth packet.

Step 2: The fifth SFF obtains the seventh packet based on the eighth packet.

In the manner 1, because the bypass SID is at an outer layer, and the proxy SID is at an inner layer, when receiving the sixth packet, the fifth SFF may first query the local SID table based on the bypass SID, determine that a type of the bypass SID is an End type, and then query an IPv6 routing and forwarding table based on an End-type SID action, to perform local forwarding. Then, the fifth SFF continues to process the packet based on a proxy SID behavior and performs forwarding.

Manner 2: The bypass SID is a proxy SID corresponding to the third SF network element.

In the manner 2, the fifth SFF may directly process the packet based on a proxy SID behavior and perform forwarding.

It should be understood that, in both the manner 1 and the manner 2, the fifth SFF first removes the SRH and then sends the packet to the third SF network element. After the third SF network element returns the packet to the fifth SFF, the fifth SFF re-encapsulates the SRH based on a cache list.

Step 1906: The fifth SFF sends the seventh packet to a third SF network element through an outbound interface corresponding to the proxy SID.

Step 1907: The third SF network element receives the seventh packet, and performs service function processing on the seventh packet.

In the method provided in this embodiment, in an SRV6 static service chain scenario, when an SF network element is faulty, a bypass SID is introduced to update a destination address field of a packet header of a packet to the bypass SID, so that the packet is bypassed to another SF network element by using the bypass SID, for example, to a backup SF network element outside an original path or a next SF network element within the original path, thereby performing service protection by using the another network element, and normally forwarding service traffic, to prevent the traffic from being interrupted due to a single-node fault, and improve service chain reliability.

The foregoing describes the method for providing protection by using the bypass SID in the scenario in which the SF network element is faulty. It should be understood that features that appear in different embodiments in the foregoing embodiments may be combined with each other to generate another case. The following describes method embodiments in the other two cases by using examples.

Figure 22A:
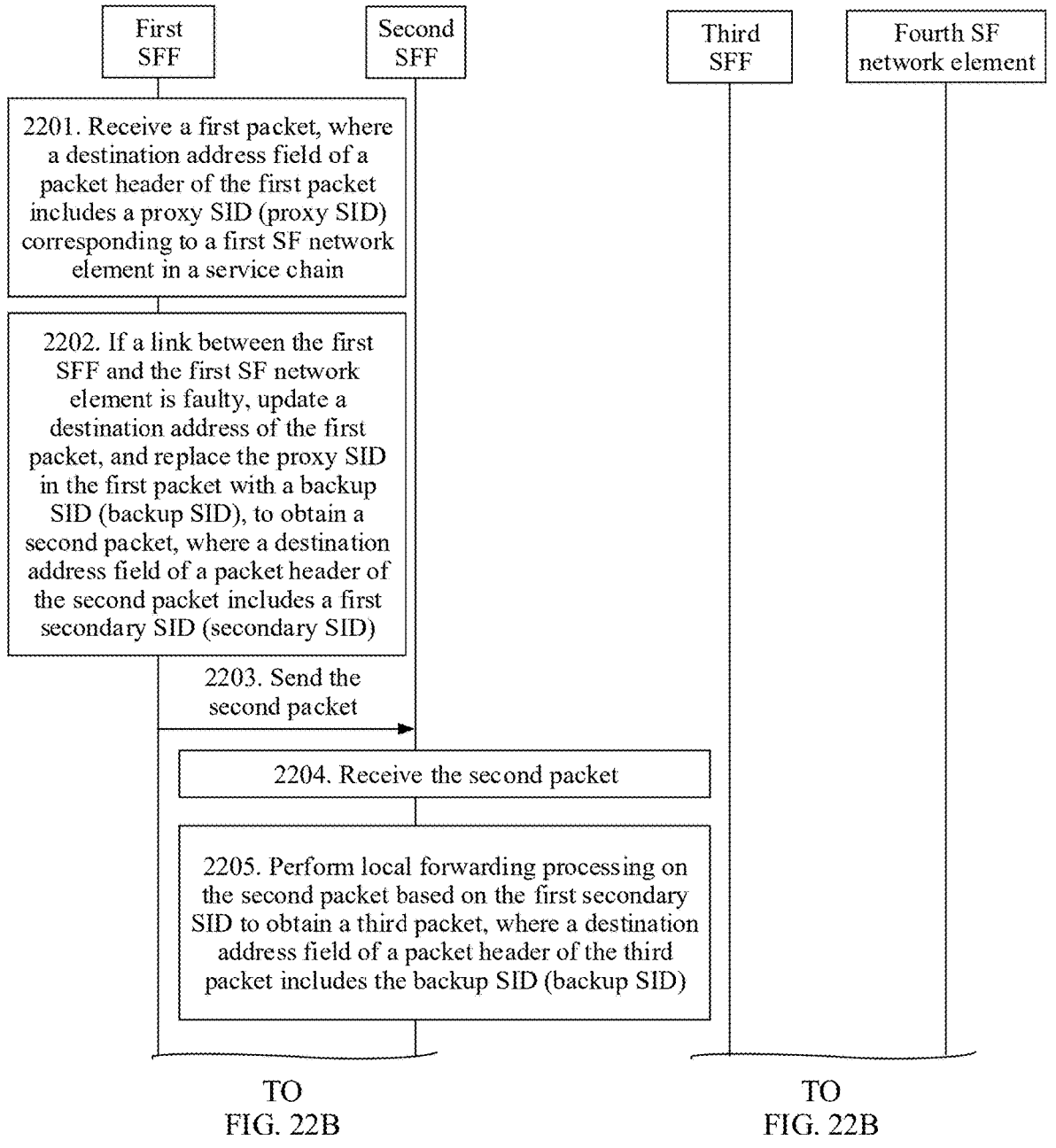

Refer to FIG. 22A and FIG. 22B. A service chain fault protection method may include the following step 2201 to step 2209.

Step 2201: A first SFF in a service chain receives a first packet, where a destination address of a packet header of the first packet includes a proxy SID corresponding to a first SF network element in the service chain.

Step 2202: If a link between the first SFF and the first SF network element is faulty, the first SFF updates the destination address of the first packet, and the first SFF replaces the proxy SID in the first packet with a backup SID, to obtain a second packet, where a destination address of a packet header of the second packet includes a first secondary SID.

Step 2203: The first SFF sends the second packet.

Step 2204: A second SFF in the service chain receives the second packet, where the destination address of the packet header of the second packet includes the first secondary SID.

The first secondary SID is a local SID of the second SFF, where the first secondary SID may be an End-type SID.

Step 2205: The second SFF performs local forwarding processing on the second packet based on the first secondary SID to obtain a third packet, where a destination address of a packet header of the third packet includes the backup SID.

Step 2206: If an outbound interface corresponding to the backup SID is faulty, the second SFF updates the destination address of the third packet to obtain an eighth packet, where a destination address of a packet header of the eighth packet includes a bypass SID.

The backup SID is used to indicate the second SFF not to update a destination address field of the packet header of the second packet to a second secondary SID, and the second secondary SID is a local SID of the first SFF. The second secondary SID may be an End-type SID. When the packet carries the backup SID, it may indicate that the link between the first SFF and the first SF network element is faulty, and the second secondary SID cannot be used to enter a secondary procedure. In this case, the second SFF may determine whether the outbound interface corresponding to the backup SID is in an up state. If the outbound interface corresponding to the backup SID is in the up state, the second SFF may send the packet to the first SF network element through the outbound interface corresponding to the backup SID. If the outbound interface corresponding to the backup SID is also in a down state, the second SFF may enter a bypass SID procedure by performing the following steps.

The bypass SID is a local SID of a third SFF. The bypass SID may be an End-type SID. For example, in a local SID table of the third SFF, a value of FuncType of the bypass SID may be End. The third SFF is an SFF accessed by a fourth SF network element. The fourth SF network element may include the following cases (1) and (2).

(1) The fourth SF network element is a backup SF network element of the first SF network element.

(2) The fourth SF network element is a next SF network element of the first SF network element in the service chain.

Step 2207: The second SFF sends the eighth packet to a third SFF.

Step 2208: The third SFF receives the eighth packet, obtains a ninth packet based on the eighth packet, and sends the ninth packet to a fourth SF network element through an outbound interface corresponding to the proxy SID, where the ninth packet includes a payload of the eighth packet and does not include a segment list.

Step 2209: The fourth SF network element receives the ninth packet, and performs service function processing on the ninth packet.

In the foregoing method embodiment, the second SFF normally forwards service traffic by using the bypass SID. In some other embodiments, the packet may be discarded if no bypass SID is preconfigured on the second SFF. For details, refer to the following method embodiment.

Figure 23:
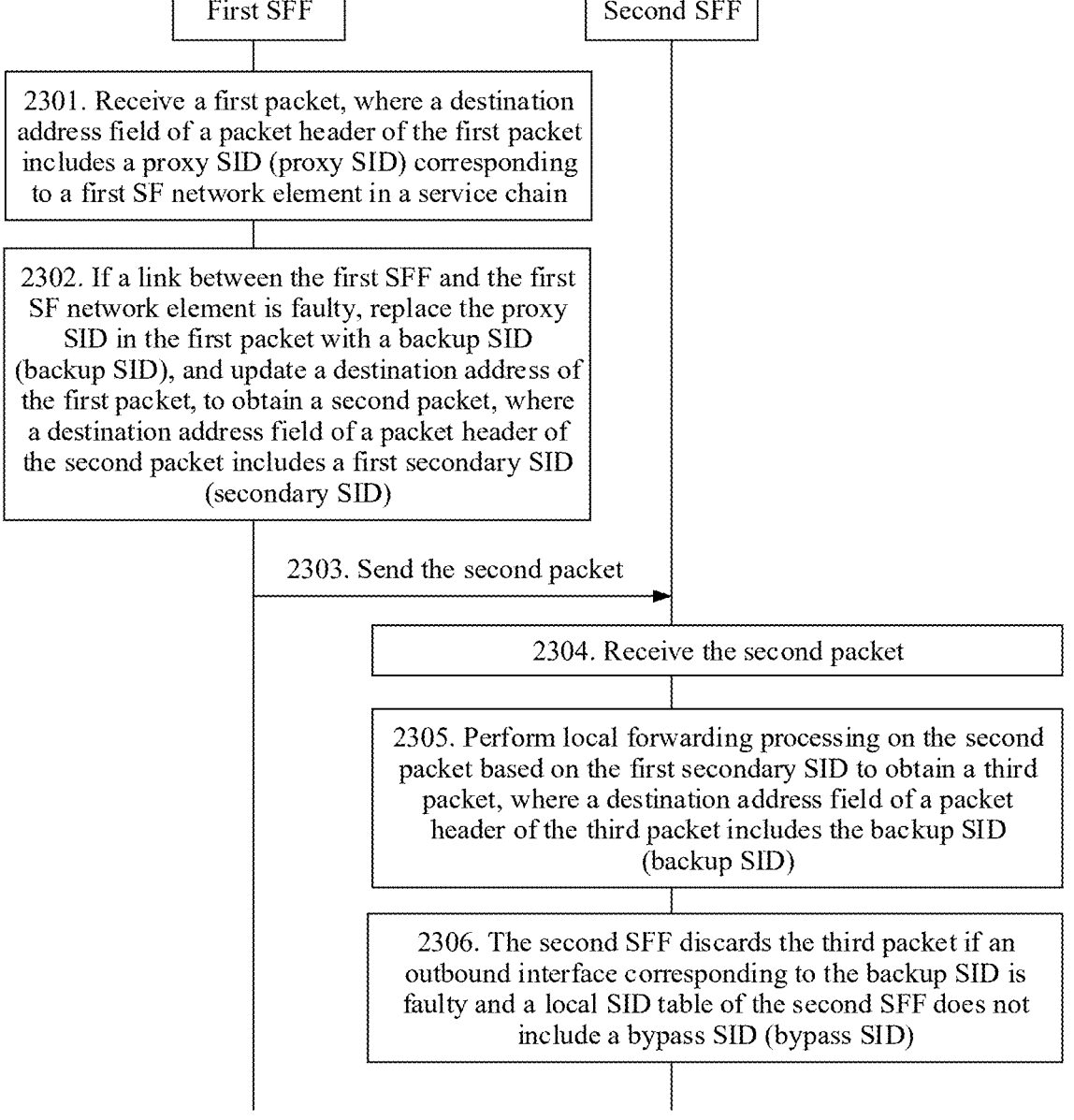
FIG. 23 is a flowchart of a service chain fault protection method according to an embodiment of this application.

Refer to FIG. 23. The method may include the following step 2301 to step 2306.

Step 2301: A first SFF in a service chain receives a first packet, where a destination address field of a packet header of the first packet includes a proxy SID corresponding to a first SF network element in the service chain.

Step 2302: If a link between the first SFF and the first SF network element is faulty, the first SFF updates the destination address field of the first packet, and the first SFF replaces the proxy SID in the first packet with a backup SID, to obtain a second packet, where a destination address field of a packet header of the second packet includes a first secondary SID.

Step 2303: The first SFF sends the second packet.

Step 2304: A second service function forwarder SFF in the service chain receives the second packet, where the destination address field of the packet header of the second packet includes the first secondary SID.

Step 2305: The second SFF performs local forwarding processing on the second packet based on the first secondary SID to obtain a third packet, where a destination address field of a packet header of the third packet includes the backup SID.

The backup SID is used to indicate the second SFF not to update the destination address field of the second packet to a second secondary SID, and the second secondary SID is a local SID of the first SFF. The second secondary SID may be an End-type SID.

Step 2306: If an outbound interface corresponding to the backup SID is faulty and a local SID table of the second SFF does not include a bypass SID, the second SFF discards the third packet.

The foregoing describes the service chain fault protection methods in the embodiments of this application. The following describes an SFF in the embodiments of this application. It should be understood that the SFF has any function of the SFF in the foregoing methods.

Figure 24:
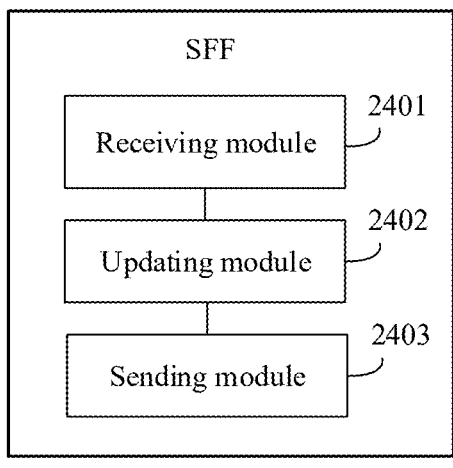
FIG. 24 is a schematic structural diagram of an SFF according to an embodiment of this application.

FIG. 24 is a schematic structural diagram of an SFF according to an embodiment of this application. As shown in FIG. 24, the SFF includes: a receiving module 2401, configured to perform step 1101, step 1601, step 2201, or step 2301; an update module 2402, configured to perform step 1102, step 1602, step 2202, or step 2302; and a sending module 2403, configured to perform step 1103, step 1603, step 2203, or step 2303.

Optionally, the SFF further includes a replacing module, configured to replace a proxy SID with a backup SID.

It should be understood that the SFF provided in the embodiment in FIG. 24 corresponds to the first SFF in the foregoing method embodiments. The modules and the foregoing other operations and/or functions in the embodiment in FIG. 24 are used to implement various steps and methods implemented by the first SFF in the method embodiments. For specific details, refer to the foregoing method embodiments. For brevity, details are not described herein again.

It should be understood that, when the SFF provided in the embodiment in FIG. 24 performs fault protection on a service chain, division into the foregoing functional modules is merely used as an example for description. In actual application, the foregoing functions may be allocated to different functional modules for implementation as required. To be specific, an internal structure of the SFF is divided into different functional modules, to implement all or some of the functions described above. In addition, the SFF provided in the foregoing embodiment and the service chain fault protection method embodiment in the foregoing embodiment in FIG. 11, the embodiment in FIG. 16, the embodiment in FIG. 22A and FIG. 22B, or the embodiment in FIG. 23 are based on a same concept. For details about a specific implementation process of the SFF, refer to the method embodiments. Details are not described herein again.

Figure 25:
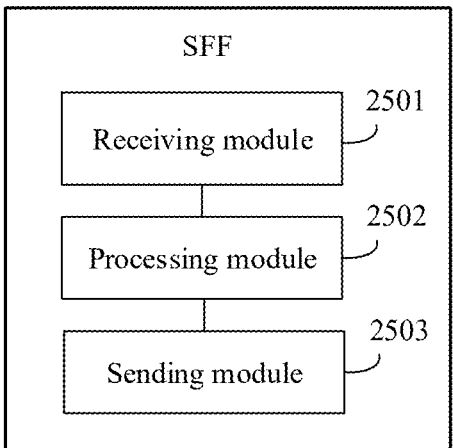
FIG. 25 is a schematic structural diagram of an SFF according to an embodiment of this application.

FIG. 25 is a schematic structural diagram of an SFF according to an embodiment of this application. As shown in FIG. 25, the SFF includes: a receiving module 2501, configured to perform step 1104, step 1604, step 2204, or step 2304; a processing module 2502, configured to perform step 1105 and step 1106, or configured to perform step 1605 and step 1606, or configured to perform step 2205 and step 2206, or configured to perform step 2305; and a sending module 2503, configured to perform step 1107, step 1607, or step 2207.

Optionally, the SFF further includes a discarding module, configured to perform step 2306.

It should be understood that the SFF provided in the embodiment in FIG. 25 corresponds to the first SFF in the foregoing method embodiments. The modules and the foregoing other operations and/or functions in the embodiment in FIG. 25 are used to implement various steps and methods implemented by the second SFF in the method embodiments. For specific details, refer to the foregoing method embodiments. For brevity, details are not described herein again.

It should be understood that, when the SFF provided in the embodiment in FIG. 25 performs fault protection on a service chain, division into the foregoing functional modules is merely used as an example for description. In actual application, the foregoing functions may be allocated to different functional modules for implementation as required. To be specific, an internal structure of the SFF is divided into different functional modules, to implement all or some of the functions described above. In addition, the SFF provided in the foregoing embodiment and the SFF provided in the service chain fault protection method embodiment in the foregoing embodiment in FIG. 11, the embodiment in FIG. 16, the embodiment in FIG. 22A and FIG. 22B, or the embodiment in FIG. 23 are based on a same concept. For details about a specific implementation process of the SFF, refer to the method embodiments. Details are not described herein again.

Figure 26:
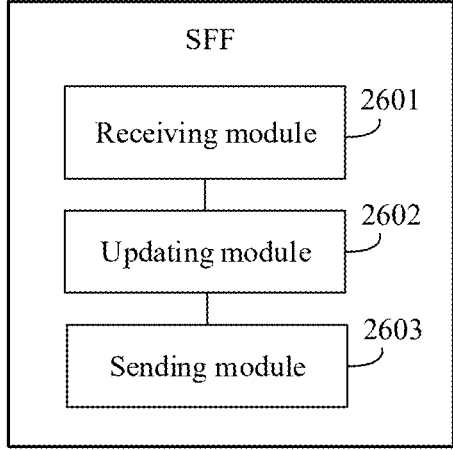
FIG. 26 is a schematic structural diagram of an SFF according to an embodiment of this application.

FIG. 26 is a schematic structural diagram of an SFF according to an embodiment of this application. As shown in FIG. 26, the SFF includes: a receiving module 2601, configured to perform step 1901; an update module 2602, configured to perform step 1902; and a sending module 2603, configured to perform step 1903.

Optionally, the SFF further includes: a detection module, configured to: if an outbound interface corresponding to a proxy SID is in an up state, and each virtual machine on which a second SF network element is located is unreachable, detect that the second SF network element is in a faulty state; or if a link fault occurs on at least one of an outbound interface corresponding to a backup SID or an outbound interface corresponding to a proxy SID, detect that a second SF network element is in a faulty state.

It should be understood that the SFF provided in the embodiment in FIG. 26 corresponds to the third SFF in the foregoing method embodiments. The modules and the foregoing other operations and/or functions in the embodiment in FIG. 26 are used to implement various steps and methods implemented by the third SFF in the method embodiments. For specific details, refer to the foregoing method embodiments. For brevity, details are not described herein again.

It should be understood that, when the SFF provided in the embodiment in FIG. 26 performs fault protection on a service chain, division into the foregoing functional modules is merely used as an example for description. In actual application, the foregoing functions may be allocated to different functional modules for implementation as required. To be specific, an internal structure of the SFF is divided into different functional modules, to implement all or some of the functions described above. In addition, the SFF provided in the foregoing embodiment and the SFF provided in the service chain fault protection method embodiment in the foregoing embodiment in FIG. 19 are based on a same concept. For details about a specific implementation process of the SFF, refer to the method embodiments. Details are not described herein again.

Figure 27:
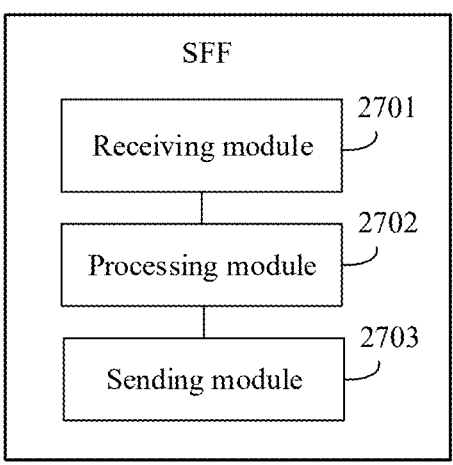
FIG. 27 is a schematic structural diagram of an SFF according to an embodiment of this application.

FIG. 27 is a schematic structural diagram of an SFF according to an embodiment of this application. As shown in FIG. 27, the SFF includes a receiving module 2701, configured to perform step 1904; a processing module 2702, configured to perform step 1905; and a sending module 2703, configured to perform step 1907.

Optionally, the processing module 2702 is configured to: perform local forwarding processing on a sixth packet based on a bypass SID to obtain an eighth packet; and obtain a seventh packet based on the eighth packet.

It should be understood that the SFF provided in the embodiment in FIG. 27 corresponds to the fourth SFF in the foregoing method embodiments. The modules and the foregoing other operations and/or functions in the embodiment in FIG. 27 are used to implement various steps and methods implemented by the fourth SFF in the method embodiments. For specific details, refer to the foregoing method embodiments. For brevity, details are not described herein again.

It should be understood that, when the SFF provided in the embodiment in FIG. 27 performs fault protection on a service chain, division into the foregoing functional modules is merely used as an example for description. In actual application, the foregoing functions may be allocated to different functional modules for implementation as required. To be specific, an internal structure of the SFF is divided into different functional modules, to implement all or some of the functions described above. In addition, the SFF provided in the foregoing embodiment and the SFF provided in the service chain fault protection method embodiment in the foregoing embodiment in FIG. 19 are based on a same concept. For details about a specific implementation process of the SFF, refer to the method embodiments. Details are not described herein again.

The foregoing describes the SFF in the embodiments of this application, and the following describes a possible product form of the SFF.

It should be understood that any product in any form that has the feature of the foregoing SFF falls within the protection scope of this application. It should be further understood that the following description is merely an example, and a product form of the SFF in the embodiments of this application is not limited thereto.

An embodiment of this application provides an SFF. The SFF includes a processor. The processor is configured to execute an instruction, so that the SFF performs the service chain fault protection methods provided in the foregoing method embodiments.

For example, the processor may be a network processor (NP), a central processing unit (CPU), an application-specific integrated circuit (ASIC), or an integrated circuit configured to control program execution in the solutions of this application. The processor may be a single-CPU processor (single-CPU), or may be a multi-CPU processor (multi-CPU). There may be one or more processors.

In some possible embodiments, the SFF may further include a memory.

The memory may be a read-only memory (ROM) or another type of static storage device capable of storing static information and instructions, or a random access memory (RAM) or another type of dynamic storage device capable of storing information and instructions, or may be an electrically erasable programmable read-only memory (EE-PROM), a compact disc read-only memory (CD-ROM) or other compact disc storage, optical disc storage (including a compressed optical disc, a laser disc, an optical disc, a digital versatile optical disc, a blue-ray optical disc, or the like), a magnetic disk storage medium or another magnetic storage device, or any other medium capable of carrying or storing expected program code in a form of an instruction or a data structure and capable of being accessed by a computer. This is not limited thereto.

The memory and the processor may be disposed separately, or the memory and the processor may be integrated together.

In some possible embodiments, the SFF may further include a transceiver.

The transceiver is configured to communicate with another device or a communications network. A network communication manner may be but is not limited to the Ethernet, a radio access network (RAN), a wireless local area network (WLAN), or the like.

In some possible embodiments, the foregoing SFF or SF network element may be implemented as a network device, and a network processor in the network device may perform the steps in the foregoing method embodiments. For example, the network device may be a router, a switch, or a firewall, or certainly may be another network device that supports a packet forwarding function.

Figure 28:
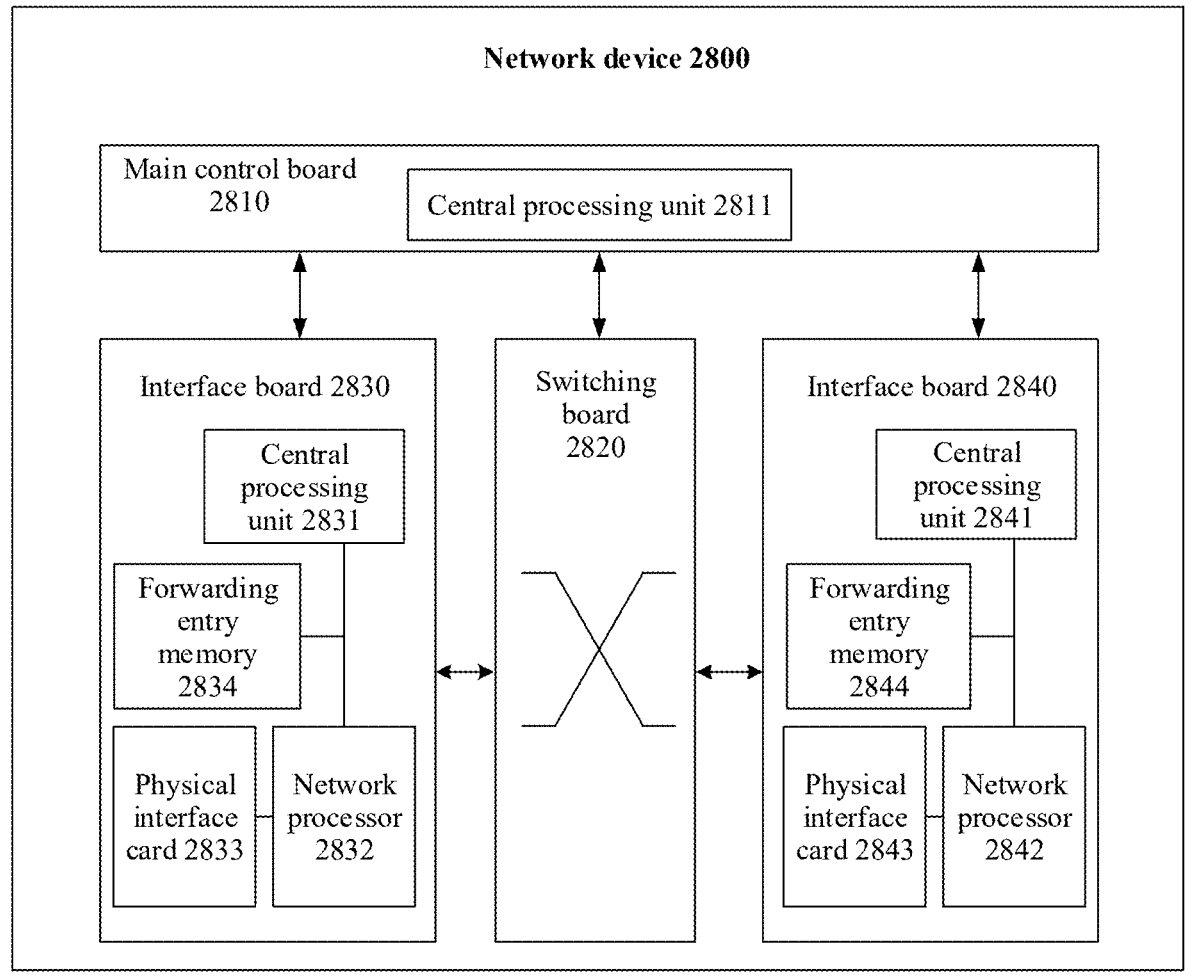
FIG. 28 is a schematic structural diagram of a network device according to an embodiment of this application.

FIG. 28 is a schematic structural diagram of a network device according to an example embodiment of this application. The network device may be configured as an SFF.

A network device 2800 includes a main control board 281o, an interface board 2830, a switching board 2820, and an interface board 284o. The main control board 2810 is configured to complete functions such as system management, device maintenance, and protocol processing. The switching board 2820 is configured to complete data exchange between interface boards (the interface board is also referred to as a line card or a service board). The interface boards 2830 and 284o are configured to provide various service interfaces (for example, an Ethernet interface and a POS interface), and implement data packet forwarding. The main control board 281o, the interface boards 2830 and 2840, and the switching board 2820 are connected to a system backboard through a system bus for interworking. A central processing unit 2831 on the interface board 2830 is configured to control and manage the interface board, and communicate with a central processing unit 2811 on the main control board 2810.

If the network device 2800 is configured as an SFF, a physical interface card 2833 receives a first packet and sends the first packet to a network processor 2832. The network processor 2832 updates a destination address field to obtain a second packet. After completing link layer encapsulation, the network processor 2832 sends, based on information such as an outbound interface, the second packet from the physical interface card 2833, so that the second packet is transmitted to a second SFF.

In an embodiment, the network processor 2832 replaces a proxy SID in the first packet with a backup SID.

If the network device 2800 is configured as a second SFF, a physical interface card 2833 receives a second packet and sends the second packet to a network processor 2832. The network processor 2832 performs local forwarding processing on the second packet based on a first secondary SID, and obtains a fourth packet based on a third packet. After completing link layer encapsulation, the network processor 2832 sends, based on information such as an outbound interface, the fourth packet from the physical interface card 2833, so that the fourth packet is transmitted to a first SF network element.

If the network device 2800 is configured as a fourth SFF, a physical interface card 2833 receives a fifth packet and sends the fifth packet to a network processor 2832. The network processor 2832 updates a destination address field to obtain a sixth packet. After completing link layer encapsulation, the network processor 2832 sends, based on information such as an outbound interface, the sixth packet from the physical interface card 2833, so that the sixth packet is transmitted to a fifth SFF.

If the network device 2800 is configured as a fifth SFF, a physical interface card 2833 receives a sixth packet and sends the sixth packet to a network processor 2832. The network processor 2832 obtains a seventh packet based on the sixth packet. After completing link layer encapsulation, the network processor 2832 sends, based on information such as an outbound interface, the seventh packet from the physical interface card 2833, so that the seventh packet is transmitted to a third SF network element.

It should be understood that an operation performed on the interface board 284o is consistent with an operation performed on the interface board 2830 in this embodiment of this application. For brevity, details are not described again. It should be understood that the network device 2800 in this embodiment may correspond to the SFF in the foregoing method embodiments, and the main control board 2810 and the interface boards 2830 and/or the 284o in the network device 2800 may implement functions of the SFF in the foregoing method embodiments and/or implement various steps. For brevity, details are not described herein again.

It should be noted that, there may be one main control board or a plurality of main control boards. When there are the plurality of main control boards, the main control boards may include an active main control board and a standby main control board. There may be one or more interface boards, and a network device having a stronger data processing capability provides more interface boards. There may also be one or more physical interface cards on the interface board. There may be no switching board or there may be one switching board or a plurality of switching boards. When there are the plurality of switching boards, load sharing and redundancy backup may be implemented together. In a centralized forwarding architecture, the network device may not need the switching board, and the interface board provides a function of processing service data of an entire system. In a distributed forwarding architecture, the network device may have at least one switching board, and data exchange between a plurality of interface boards is performed by using the switching board, to provide large-capacity data exchange and processing capability. Therefore, data access and processing capability of a network device in the distributed architecture is better than that of a device in the centralized architecture. Optionally, the network device in another form may have only one card. To be specific, there is no switching board, and functions of the interface board and the main control board are integrated on the card. In this case, a central processing unit on the interface board and a central processing unit on the main control board may be combined into one central processing unit on the card, to perform functions obtained after the two central processing units are combined. A device in this form (for example, a network device such as a low-end switch or router) has a relatively weak data exchange and processing capability. A specific architecture that is to be used depends on a specific networking deployment scenario. This is not limited herein.

Figure 29:
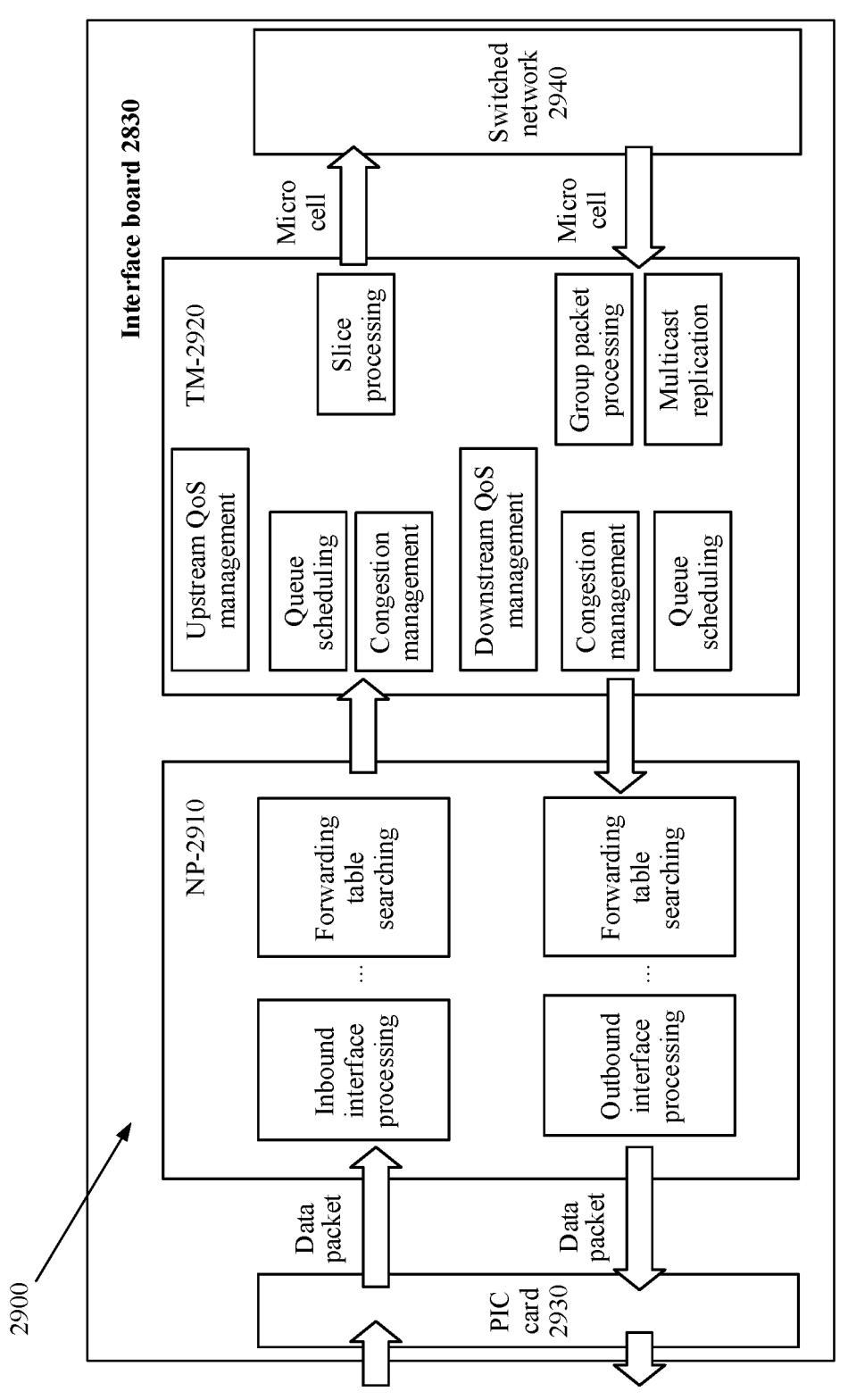
FIG. 29 is a schematic structural diagram of an interface board according to an embodiment of this application.

FIG. 29 is a schematic structural diagram of the interface board 2830 in the network device shown in FIG. 28 according to an embodiment of this application. The network device in which the interface board 2830 is located may be any node in the system architecture embodiment in the foregoing figures, for example, may be an SFF or an SF network element. The interface board 2830 may include a physical interface card (PIC) 2930, a network processor (NP) 2910, and a traffic management module 2920.

The PIC is a physical interface card, configured to implement a physical layer interconnection function. Original traffic enters an interface board of the network device via the PIC, and a processed packet is sent from the PIC card.

The network processor NP 2910 is configured to forward a packet. Specifically, processing of an uplink packet includes: processing the packet on an inbound interface, and searching a forwarding table (for example, refer to related content of the first forwarding table or the second forwarding table in the foregoing embodiment). Processing of a downlink packet includes: searching a forwarding table (for example, refer to related content of the first forwarding table or the second forwarding table in the foregoing embodiment).

The traffic management TM 2920 is configured to implement functions such as QoS, line-rate forwarding, large-buffering, and queue management. Specifically, uplink traffic management includes uplink QoS processing (such as congestion management and queue scheduling) and slice processing. Downlink traffic management includes packet assembly processing, multicast replication, and downlink QoS processing (such as congestion management and queue scheduling).

It may be understood that if the network device has a plurality of interface boards 2830, the plurality of interface boards 2830 may communicate with each other in a switched network 2940.

It should be noted that FIG. 29 shows only an example of a processing procedure or modules inside the NP. A processing sequence of the modules during specific implementation is not limited thereto. In addition, in actual application, another module or processing procedure may be deployed based on a requirement. This is not limited in the embodiments of this application.

In some possible embodiments, the SFF may be implemented as a computing device, and a central processing unit in the computing device may perform the steps in the foregoing method embodiments. For example, the computing device may be a host, a server, a personal computer, or the like. The computing device may be implemented by using a general bus architecture.

Figure 30:
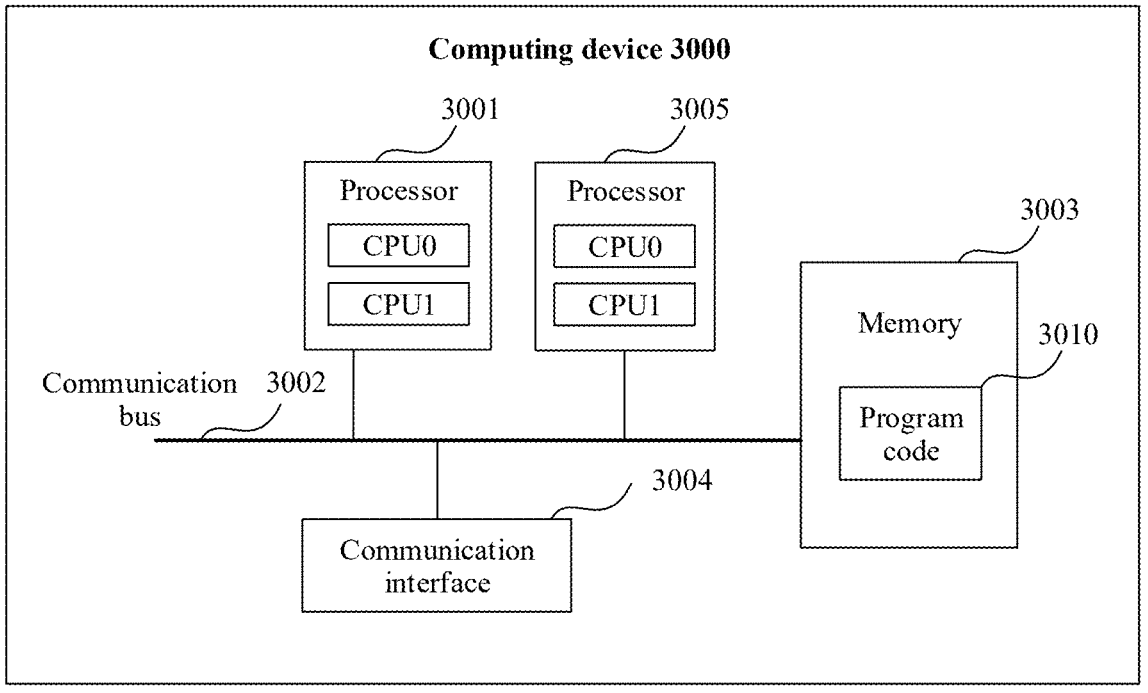

FIG. 30 is a schematic structural diagram of a computing device according to an example embodiment of this application. The computing device may be any device such as an SFF network element or an SF network element in all or some of the content described in the method embodiments. The computing device includes at least one processor 3001, a communications bus 3002, a memory 3003, and at least one communications interface 3004.

The processor 3001 may be a general-purpose central processing unit (CPU), a network processor (NP), a microprocessor, or may be one or more integrated circuits configured to implement the solutions of this application, for example, an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The communications bus 3002 is configured to transmit information between the foregoing components. The communications bus 3002 may be classified into an address bus, a data bus, a control bus, and the like. For ease of representation, only one thick line is used to represent the bus in the figure, but this does not mean that there is only one bus or only one type of bus.

The memory 3003 may be a read-only memory (ROM) or another type of static storage device capable of storing static information and instructions, or may be a random access memory (RAM) or another type of dynamic storage device capable of storing information and instructions, or may be an electrically erasable programmable read-only memory (EE-PROM), a compact disc read-only memory (CD-ROM) or other compact disc storage, optical disc storage (including a compressed optical disc, a laser disc, an optical disc, a digital versatile optical disc, a blue-ray optical disc, or the like), a magnetic disk storage medium or another magnetic storage device, or any other medium capable of carrying or storing expected program code in a form of an instruction or a data structure and capable of being accessed by a computer. This is not limited thereto. The memory 3003 may exist independently, and is connected to the processor 3001 through the communications bus 3002. The memory 3003 may alternatively be integrated with the processor 3001.

The communications interface 3004 is configured to communicate with another device or a communications network by using any apparatus such as a transceiver. The communications interface 3004 includes a wired communications interface, and may further include a wireless communications interface. The wired communications interface may be, for example, an Ethernet interface. The Ethernet interface may be an optical interface, an electrical interface, or a combination thereof. The wireless communications interface may be a wireless local area network (WLAN) interface, a cellular network communications interface, or a combination thereof.

In specific implementation, in an embodiment, the processor 3001 may include one or more CPUs, for example, a CPU 0 and a CPU 1 shown in FIG. 30.

In a specific implementation, in an embodiment, the computing device may include a plurality of processors, for example, the processor 3001 and a processor 3005 shown in FIG. 30. Each of the processors may be a single-core processor (single-CPU) or may be a multi-core processor (multi-CPU). The processor herein may refer to one or more devices, circuits, and/or processing cores configured to process data (for example, a computer program instruction).

During specific implementation, in an embodiment, a computer device may further include an output device and an input device. The output device communicates with the processor 3001, and may display information in a plurality of manners. For example, the output device may be a liquid crystal display (LCD), a light emitting diode (LED) display device, a cathode ray tube (CRT) display device, a projector, or the like. The input device communicates with the processor 3001, and may receive an input of a user in a plurality of manners. For example, the input device may be a mouse, a keyboard, a touchscreen device, or a sensing device.

In some embodiments, the memory 3003 is configured to store program code 3010 for executing the solutions of this application, and the processor 3001 may execute the program code 3010 stored in the memory 3003. In other words, the computing device may implement, by using the processor 3001 and the program code 3010 in the memory 3003, the service chain fault protection methods provided in the method embodiments.

The computing device in the embodiments of this application may correspond to the SFF in the foregoing method embodiments. In addition, the processor 3010, the transceiver 3020, and the like in the computing device may implement the functions and/or steps and methods implemented by the SFF in the foregoing method embodiments. For brevity, details are not described herein again.

In some possible embodiments, the SFF may be implemented as a virtualization device.

For example, the virtualization device may be a virtual machine (VM) on which a program having a packet sending function runs, and the virtual machine is deployed on a hardware device (for example, a physical server). The virtual machine is a complete computer system simulated by software, having complete hardware system functions, and running in a completely isolated environment. The virtual machine can be configured as the SFF. For example, the SFF may be implemented based on a general-purpose physical server in combination with a network functions virtualization (NFV) technology. The SFF is a virtual host, a virtual router, or a virtual switch. By reading this application and referring to the NFV technology, a person skilled in the art may virtualize the SFF having the foregoing functions on the general-purpose physical server. Details are not described herein.

For example, the virtualization device may be a container, and the container is an entity used to provide an isolated virtualization environment. For example, the container may be a docker container. The container can be configured as the SFF. For example, an SFF may be created by using a corresponding image. For example, by using an image of a proxy-container (a container that provides a proxy service), two container instances, namely, a container instance proxy-container 1 and a container instance proxy-container 2, may be created for the proxy-container. The container instance proxy-container 1 is provided as a first SFF, and the container instance proxy-container 2 is provided as a fourth SFF. When a container technology is used, the SFF can run by using a kernel of a physical machine, and a plurality of SFFs can share an operating system of the physical machine. The container technology can isolate different SFFs. A containerized SFF may run in a virtualized environment, for example, may run in a virtual machine, or the containerized SFF may directly run in the physical machine.

For example, the virtualization device may be a pod. The pod is a basic unit of Kubernetes (Kubernetes is an open-source container orchestration engine of Google, K8s for short) for deploying, managing, and orchestrating a containerized application. The pod may include one or more containers. Generally, each container in a same pod is deployed on a same host. Therefore, each container in the same pod may communicate with each other via the host, and may share storage resources and network resources of the host. The pod can be configured as the SFF. For example, specifically, a container as a service (CaaS for short, which is a container-based PaaS service) may be indicated to create a pod, and the pod is provided as the SFF.

Certainly, the SFF may alternatively be another virtualization device, and details are not described herein.

In some possible embodiments, the SFF may alternatively be implemented by a general-purpose processor. For example, a form of the general-purpose processor may be a chip. Specifically, the general-purpose processor for implementing the SFF includes a processing circuit, and an input interface and an output interface that are internally connected to and communicate with the processing circuit. The processing circuit is configured to perform packet generation steps in the foregoing method embodiments through the input interface, the processing circuit is configured to perform receiving steps in the foregoing method embodiments through the input interface, and the processing circuit is configured to perform sending steps in the foregoing method embodiments through the output interface. Optionally, the general-purpose processor may further include a storage medium. The processing circuit is configured to perform, via the storage medium, storage steps in the foregoing method embodiments. The storage medium may store an instruction executed by the processing circuit. The processing circuit is configured to execute the instruction stored in the storage medium, to perform the foregoing method embodiments.

In a possible product form, the SFF in the embodiments of this application may be further implemented by using the following: one or more field-programmable gate arrays (FPGA), a programmable logic device (PLD), a controller, a state machine, gate logic, a discrete hardware component, any other suitable circuit, or any combination of circuits that can perform various functions described in this application.

In some possible embodiments, the SFF may alternatively be implemented by using a computer program product.

Specifically, an embodiment of this application provides a computer program product. When the computer program product runs on a first SFF, the first SFF is enabled to perform the service chain fault protection methods in the foregoing method embodiments. An embodiment of this application further provides a computer program product. When the computer program product runs on a second SFF, the second SFF is enabled to perform the service chain fault protection methods in the foregoing method embodiments. An embodiment of this application provides a computer program product. When the computer program product runs on a fourth SFF, the fourth SFF is enabled to perform the service chain fault protection methods in the foregoing method embodiments. An embodiment of this application further provides a computer program product. When the computer program product runs on a fifth SFF, the fifth SFF is enabled to perform the service chain fault protection methods in the foregoing method embodiments.

It should be understood that the SFFs in the foregoing various product forms have any function of the SFFs in the foregoing method embodiments, and details are not described herein again.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment based on functions. Whether the functions are performed by the hardware or the software depends on particular applications and design constraints of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing described system, apparatuses, and units, refer to a corresponding process in the foregoing method embodiments, and details are not described herein again.

In the several embodiments provided in this application, it should be understood that the disclosed system, apparatuses, and methods may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, and indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments of this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the current technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer program instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer program instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive), or the like.

A person of ordinary skill in the art may understand that all or some of the steps of the embodiments may be implemented by hardware or a program instructing related hardware. The program may be stored in a computer-readable storage medium. The storage medium may be: a read-only memory, a magnetic disk, or an optical disc.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A system comprising:
a first network device, applied to a first service function forwarder (SFF) in a service chain, the first network device comprising:
at least one first processor, and
one or more first memories coupled to the at least one first processor and storing first programming instructions, wherein the at least one first processor is configured to execute the first programming instructions, and executing the first programming instructions causes the first network device to:
receive a first packet, wherein a destination address field of a packet header of the first packet comprises a proxy segment identifier (SID) corresponding to a first service function (SF) network element in the service chain, and the first SFF is accessed by the first SF network element,
when a link between the first SFF and the first SF network element is faulty, update the destination address field of the first packet to obtain a second packet, wherein a destination address field of the second packet comprises a first secondary SID, the first secondary SID is a local SID of a second SFF in the service chain, the second SFF is an SFF, other than the first SFF, in a protection group, the protection group comprises a plurality of SFFs accessed by the first SF network element, and the second packet comprises a payload of the first packet, and
send the second packet; and
a second network device applied to the second SFF in the service chain, the second network device comprising:
at least one second processor, and
one or more second memories coupled to the at least one second processor and storing second programming instructions, wherein the at least one second processor is configured to execute the second programming instructions, and executing the second programming instructions causes the second network device to:
receive the second packet at the second SFF,
perform local forwarding processing on the second packet at the second SFF based on the first secondary SID to obtain a third packet wherein a destination address field of a packet header of the third packet comprises a backup SID,
when an outbound interface corresponding to the backup SID is faulty, update the destination address field of the packet header of the third packet to obtain a fourth packet at the second SFF, wherein a destination address field of a packet header of the fourth packet comprises a bypass SID, and the bypass SID is a local SID of a third SFF, and
send the fourth packet at the second SFF.

2. The system according to claim 1, wherein a type of the first secondary SID is an End type.

3. The system according to claim 1, wherein executing the first programming instructions causes the first network device to:
replace the proxy SID in the first packet with a backup SID, wherein the backup SID indicates to the second SFF not to update the destination address field of the second packet to a second secondary SID, and the second secondary SID is a local SID of the first SFF.

4. The system according to claim 1, wherein the protection group is an anycast group, and proxy SIDs issued by different SFFs in the anycast group are anycast SIDs.

5. The system according to claim 1, wherein executing the second programming instructions further causes the second network device to:

obtain a fifth packet based on the third packet at the second SFF, wherein the fifth packet comprises a payload of the third packet and does not comprise a segment list; and send the fifth packet to the first SF network element in the service chain.

6. A network device, applied to a second service function forwarder (SFF) in a service chain, wherein the network device comprises:

at least one processor; and one or more memories coupled to the at least one processor and storing programming instructions, wherein the at least one processor is configured to execute the programming instructions, and executing the programming instructions causes the network device to:

receive a first packet, wherein a destination address field of a packet header of the first packet comprises a first secondary segment identifier (SID), and the first secondary SID is a local SID of the second SFF;

perform local forwarding processing on the first packet based on the first secondary SID to obtain a second packet, wherein a destination address field of a packet header of the second packet comprises a backup SID;

obtain a third packet based on the second packet, wherein the third packet comprises a payload of the second packet and does not comprise a segment list;

send the third packet to a first service function (SF) network element in the service chain;

when an outbound interface corresponding to the backup SID is faulty, update the destination address field of the second packet to obtain a fourth packet, wherein a destination address field of a packet header of the fourth packet comprises a bypass SID, and the bypass SID is a local SID of a third SFF; and send the fourth packet.

7. The network device according to claim 6, wherein a type of the first secondary SID is an End type.

8. The network device according to claim 6, wherein the destination address field of the packet header of the second packet comprises a proxy SID corresponding to the first SF network element, and wherein executing the programming instructions causes the network device to:

send the third packet to the first SF network element through an outbound interface corresponding to the proxy SID.

9. The network device according to claim 6, wherein the destination address field of the packet header of the second packet comprises a backup SID, the backup SID indicates to the second SFF not to update the destination address field of the first packet to a second secondary SID, and the second secondary SID is a local SID of a first SFF; and wherein executing the programming instructions causes the network device to:

send the third packet to the first SF network element through the outbound interface corresponding to the backup SID.

10. The network device according to claim 6, wherein executing the programming instructions further causes the network device to:

when the outbound interface corresponding to the backup SID is faulty, and a local SID table of the second SFF does not comprise the bypass SID, discard the second packet.

11. The network device according to claim 6, wherein the service chain is implemented in Internet Protocol version 6 for Segment Routing (SRv6).

12. A system, comprising:

a first service function forwarder (SFF) in a service chain; and a second SFF in the service chain;

wherein the first SFF is configured to:

receive a first packet, wherein a destination address field of a packet header of the first packet comprises a proxy segment identifier (SID) corresponding to a first service function (SF) network element in the service chain, and the first SFF is an SFF accessed by the first SF network element, when a link between the first SFF and the first SF network element is faulty, update the destination address field of the first packet to obtain a second packet, wherein a destination address field of the second packet comprises a first secondary SID, the first secondary SID is a local SID of the second SFF, the second SFF is an SFF, other than the first SFF, in a protection group, the protection group comprises a plurality of SFFs accessed by the first SF network element, and the second packet comprises a payload of the first packet, and send the second packet to the second SFF, and wherein the second SFF is configured to:

receive the second packet, perform local forwarding processing on the second packet based on the first secondary SID to obtain a third packet wherein a destination address field of a packet header of the third packet comprises a backup SID, when an outbound interface corresponding to the backup SID is faulty, update a the destination address field of the packet header of the third packet to obtain a fourth packet, wherein a destination address field of a packet header of the fourth packet comprises a bypass SID, and the bypass SID is a local SID of a third SFF, and send the fourth packet.

13. The system according to claim 12, wherein the second SFF is further configured to:

obtain a fifth packet based on the third packet, wherein the fifth packet comprises a payload of the third packet and does not comprise a segment list; and send the fifth packet to the first SF network element in the service chain.

14. The system according to claim 13, wherein the destination address field of the packet header of the third packet comprises a proxy SID corresponding to the first SF network element, and the second SFF is further configured to:

send the fifth packet to the first SF network element through an outbound interface corresponding to the proxy SID.

15. The system according to claim 13, wherein the destination address field of the packet header of the third packet comprises a backup SID, the backup SID indicates to the second SFF not to update the destination address field of the second packet to a second secondary SID, the second secondary SID is a local SID of the first SFF, and the second SFF is further configured to:

send the fifth packet to the first SF network element through the outbound interface corresponding to the backup SID.

16. The system according to claim 12, wherein the second SFF is further configured to:

when the outbound interface corresponding to the backup SID is faulty, and a local SID table of the second SFF does not comprise the bypass SID, discard the third packet.

17. The system according to claim 12, wherein a type of the first secondary SID is an End type.

18. The system according to claim 12, wherein the first SFF is further configured to:

replace the proxy SID in the first packet with a backup SID, wherein the backup SID indicates to the second SFF not to update the destination address field of the second packet to a second secondary SID, and the second secondary SID is a local SID of the first SFF.

19. The system according to claim 12, wherein the protection group is an anycast group, and proxy SIDs issued by different SFFs in the anycast group are anycast SIDs.

20. The system according to claim 12, wherein the service chain is implemented in Internet Protocol version 6 for Segment Routing (SRv6).

* * * * *